United States Patent
Varma et al.

[19]

[11] Patent Number: 5,859,835
[45] Date of Patent: Jan. 12, 1999

[54] TRAFFIC SCHEDULING SYSTEM AND METHOD FOR PACKET-SWITCHED NETWORKS

[75] Inventors: Anujan Varma; Dimitrios Stiliadis, both of Santa Cruz, Calif.

[73] Assignee: The Regents of the University of California, Oakland, Calif.

[21] Appl. No.: 634,904

[22] Filed: Apr. 15, 1996

[51] Int. Cl.$^6$ ........................................................ H04J 3/14
[52] U.S. Cl. ............................................ 370/229; 370/412
[58] Field of Search ..................................... 370/229, 230, 370/237, 389, 392, 394, 395–399, 412, 409, 418, 231, 235, 413–415, 428, 429, 952

[56] References Cited

U.S. PATENT DOCUMENTS

| | | | |
|---|---|---|---|
| 5,253,247 | 10/1993 | Hirose et al. | |
| 5,260,935 | 11/1993 | Turner | 370/394 |
| 5,337,309 | 8/1994 | Fan | 370/389 |
| 5,381,407 | 1/1995 | Chao . | |
| 5,390,184 | 2/1995 | Morris . | |
| 5,394,395 | 2/1995 | Nagai et al. | 370/389 |
| 5,428,616 | 6/1995 | Field et al. | 370/389 |

OTHER PUBLICATIONS

Davin et al., "A Simulation Study of Fair Queueing and Policy Enforcement", Computer Communication Review, vol. 20, pp. 23–29, Oct. 1990.

Demers et al., "Analysis and Simulation of a Fair Queueing Algorithm", Internetworking: Research and Experience, vol. 1, No. 1, pp. 3–26, 1989.

Golestani, S., "A Self–Clocked Fair Queueing Scheme for Broadband Applications", Proceedings of INFOCOM '94, pp. 636–646, IEEE, Apr. 1994.

Zhang, L., "VirtualClock: A New Traffic Control Algorithm for Packet Switches", ACM Transactions on Computer Systems, vol. 9, pp. 101–124, May 1991.

*Primary Examiner*—Ajit Patel
*Attorney, Agent, or Firm*—John P. O'Banion

[57] ABSTRACT

A traffic scheduling system and method for packet-switched communications networks where multiple sessions share an outgoing communications link. Prior to transmission on the outgoing link, packets are assigned a time-stamp and placed into a priority queue in order of ascending time-stamps so that the packet with the smallest time-stamp is placed at the head of the queue. The time-stamp assigned to a particular packet is calculated as the estimated time at which the last bit of the packet is transmitted in an ideal system, using a global variable called the system potential which tracks the progress of work in the scheduling system. The system potential is recalibrated periodically to avoid any long-term unfairness in service offered to the sessions sharing the outgoing link.

37 Claims, 36 Drawing Sheets

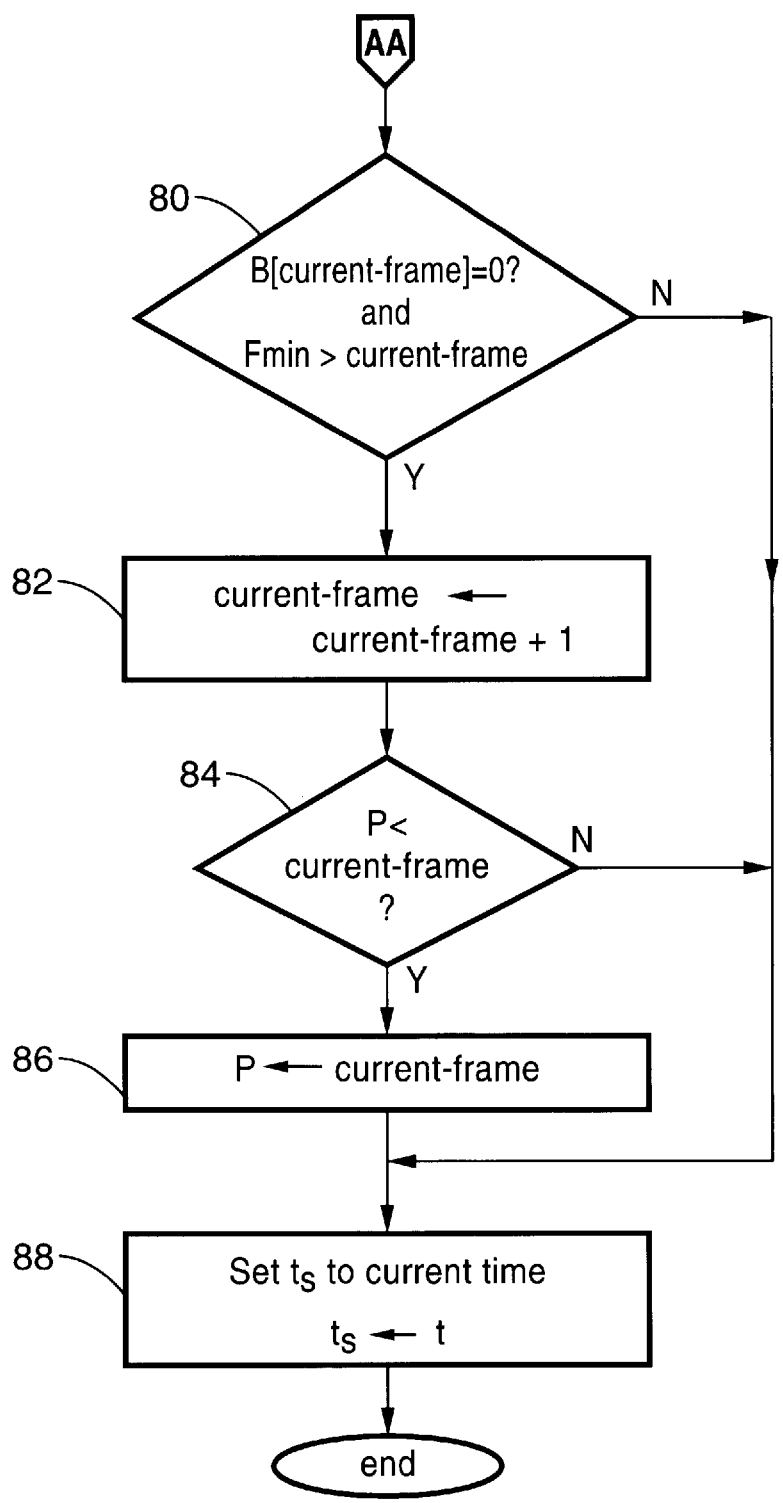
FIG. − 9B

Retrieve Connection Identifier from header of packet
1. $i \leftarrow$ Connection-Identifier of packet;

Calculate current value of system potential.
Let $t$ be the current time and $t_S$ the time when
the packet currently in transmission started its service
2. $temp \leftarrow P + (t - t_S)/F$ Calculate the starting potential of the new packet
3. $SP(i,k) \leftarrow \max(TS(i,k-1), temp)$ Calculate timestamp of packet
4. $TS(i,k) \leftarrow SP(i,k) + length(i,k) / \rho_i$ Check if packet crosses a frame boundary
5. $n1 \leftarrow int(SP(i,k))$; $n2 \leftarrow int(TS(i,k))$ 6. if ($n1 < n2$) then (if finishing potential is in next frame)

7.    $B[n1] \leftarrow B[n1] + 1$(increment counter);

8.    mark packet 9. endif

FIG. – 10

Increase system potential by the transmission time of
the packet just completed
1. $P \leftarrow P + length(j)/F$ Find timestamp of packet for transmission
2. $TS_{min} \leftarrow \min_{i \in B}(TS(i))$ Determine frame of the packet with the minimum timestamp
3. $F_{min} \leftarrow int(TS_{min})$ Perform frame update operation if required
4. if (current packet is marked) then
5.     $B[current\text{-}frame] \leftarrow B[current\text{-}frame]\text{-}1$
6. end if 7. if ($B[current\text{-}frame] = 0$ and $F_{min} > current\text{-}frame$) then
8.     $current\text{-}frame \leftarrow current\text{-}frame + 1$
9.     $P \leftarrow \max(current\text{-}frame, P)$
10. end if Store starting time of transmission of next packet in $t_S$
11. $t_S \leftarrow$ current time
12. Retrieve packet from head of queue and transmit

FIG. – 11

Retrieve Connection Identifier from header of cell
1. $i \leftarrow$ Connection-Identifier of cell Calculate the starting potential of the new packet
2. $SP(i,k) \leftarrow \max(TS(i,k-1), P)$ Calculate timestamp of packet
3. $TS(i,k) \leftarrow SP(i,k) + 1/\rho_i$ Check if packet crosses a frame boundary
4. if $(bit(TS(i,k), b \neq bitSP(i,k), b))$ then (if finishing potential is in next frame)
5.     $n1 \leftarrow$ right-shift $(SP(i,k), b)$;
6.     $B[n1] \leftarrow B[n1] + 1$(increment counter);
7.     mark packet
8. endif

FIG. – 20

Increase system potential by the transmission time of the cell just completed
1. $P \leftarrow P + 1$ Find timestamp of next packet for transmission.
2. $TS_{\min} \leftarrow \min_{i \in B} (TS(i))$ Determine frame of the packet with the minimum timestamp.
3. $F_{\min} \leftarrow \text{right-shift}(TS_{\min})$ Perform frame update operation if required
4. if (current cell is marked) then
5.       $B[current\text{-}frame] \leftarrow B[current\text{-}frame]\text{-}1$
6. end if
7. if ($B[current\text{-}frame] = 0$ and $F_{\min} > current\text{-}frame$) then
8.       $current\text{-}frame \leftarrow current\text{-}frame + 1$
9.       $P \leftarrow \max(P, \text{left-shift}(current\text{-}frame, b))$
10. end if
11. Retrieve cell from head of queue and transmit.

CA : Cell-arrival.
CD : Cell-departure.
CF : Time stamp of arriving cell in current frame.
NF : Time stamp of arriving cell in next frame.
EF : Time stamp of arriving cell in third frame.
FQ : Queue of current frame has cells.
SQ : Queue of next frame has cells.
EQ : Queue of third frame has cells.
FU : Frame update operation.

TRAFFIC SCHEDULING SYSTEM AND METHOD FOR PACKET-SWITCHED NETWORKS

This invention was made with Government support under Grant No. MIP-9257103, awarded by the National Science Foundation. The Government has certain rights in this invention.

BACKGROUND OF THE INVENTION

1. Field of the Invention

This invention pertains generally to traffic scheduling systems for packet-switched communications networks and, more particularly, to a system and method for carrying out such traffic scheduling providing low end-to-end delay bounds, low buffer requirements, and fairness.

2. Description of the Background Art

As computer networks become more and more widespread, methods for controlling traffic efficiently in these networks are becoming more important. Early data networks were based on circuit switching where the peak bandwidth demand of a communication session was allocated to it for the entire duration of the session. When the session traffic was bursty, that is when the peak rate of the session exceeded its average rate, circuit switching resulted in under-utilization of the network resources. Packet switching was developed to overcome this disadvantage, thus improving the network utilization for bursty traffic.

Packet switched networks dynamically allocate bandwidth according to demand. By segmenting the input flow of information into units called "packets," and processing each packet as a self-contained unit, packet switched networks allow scheduling of network resources on a per-packet basis. This enables multiple sessions to share the network resources dynamically by allowing their packets to be interleaved across the communication network.

Along with the introduction of packet switched networks came a desire for Quality of Service (QoS) guarantees. Many future applications of computer networks such as distance education, remote collaboration, and teleconferencing will rely on the ability of the network to provide QoS guarantees. These guarantees are usually in the form of bounds on end-to-end delay of the session, bandwidth, delay jitter (variation in delay), packet loss rate, or a combination of these parameters. Broadband packet networks based on ATM (Asynchronous Transfer Mode) are currently enabling the integration of traffic with a wide range of QoS requirements within a single communication network. QoS guarantees can also be provided in conventional packet networks by the use of proper methods in the packet switches (or routers).

Providing QoS guarantees in a packet network requires the use of traffic scheduling methods in the switches (or routers). The function of a scheduling method is to select, for each outgoing link of the switch, the packet to be transmitted in the next cycle from the available packets belonging to the communication sessions sharing the output link. This selection must be performed such that the QoS guarantees for the individual traffic sessions, such as upper bounds on maximum delay, are satisfied. Implementation of the method may be in hardware or software. Because of the small size of ATM cells, the scheduling method must usually be implemented in hardware in an ATM switch. In a packet network with larger packet-sizes, such as the current Internet, the method can be implemented in software.

Several methods have been proposed for traffic scheduling in packet switches. In general, schedulers can be classified as work-conserving or non-work-conserving. A scheduler is work-conserving if the server is never idle when a packet is buffered in the system. A non-work-conserving server may remain idle even if there are available packets to transmit. A server may, for example, postpone the transmission of a packet when it expects a higher-priority packet to arrive soon, even though it is currently idle. When the transmission time of a packet is short, as is typically the case in an ATM network, however, such a policy is seldom justified. Non-work-conserving methods are also used to control delay jitter (variation in delay) by delaying packets that arrive early. Work-conserving servers always have lower average delays than non-work-conserving servers and are therefore preferred for most applications.

Examples of work-conserving schedulers include Generalized Processor Sharing (GPS), Weighted Fair Queueing, VirtualClock, Delay-Earliest-Due-Date (Delay-EDD), Weighted Round Robin, Deficit Round Robin, and Hierarchical-Round-Robin. Examples of non-work-conserving schedulers include Stop-and-Go queueing, and Jitter-Earliest-Due-Date.

Another classification of traffic schedulers is based on their internal architecture: This classification gives rise to two types of schedulers—sorted-priority and frame-based. Sorted-priority schedulers compute a time-stamp, associated with each packet in the system. Packets are sorted based on their time-stamps, and are transmitted in that order. VirtualClock, Weighted Fair Queueing, and Delay-EDD follow this architecture. To aid in the computation of time-stamps, sorted-priority schedulers usually maintain a global function that keeps track of the progress of work in the system. This global function is often referred to as "virtual time." Two factors determine the implementation complexity of all sorted-priority methods. The first is the complexity of updating the priority list and selecting the packet with the highest priority is at least $O(\log V)$ where $V$ is the number of connections sharing the outgoing link. The second is the complexity of calculating the time-stamp associated with each packet; this factor depends heavily on the method. For example, maintaining the virtual time in Weighted Fair Queueing requires the processing of a maximum of $V$ events during the transmission of a single packet, whereas time-stamps in VirtualClock can be calculated in constant time, that is $O(1)$.

In a frame-based scheduler, a virtual time is not calculated. Frame-based schedulers split time into frames of fixed or variable length. Reservations of sessions are made in terms of the maximum amount of traffic the session is allowed to transmit during a frame period. Hierarchical Round Robin and Stop-and-Go Queueing are frame-based schedulers that use a constant frame size. As a result, the server may remain idle if sessions transmit less traffic than their reservations over the duration of a frame, making them non-work-conserving. In contrast, Weighted Round Robin and Deficit Round Robin schedulers allow the frame size to vary within a maximum. Thus, if the traffic from a session is less than its reservation, a new frame can be started early. Therefore, both Weighted Round Robin and Deficit Round Robin are work-conserving schedulers.

Many different scheduling methods have been proposed to approximate the theoretical scheduling discipline known as Generalized Processor Sharing (GPS). The GPS discipline is defined with respect to a "fluid model," where data transmitted by each session is considered to be infinitely divisible and multiple sources may transmit their data simultaneously through a single physical communication link. This allows tight control of the bandwidth allocated to each session on a link. Unfortunately, GPS is only a hypothetical scheduling discipline. In practice, the packets transmitted by each session cannot be divided further, and data from multiple sessions can be interleaved only at packet boundaries. Thus the GPS discipline cannot be implemented in practice in a packet-switched network. However, the GPS discipline provides a sound theoretical basis for the design of practical scheduling methods. A number of such practical methods have been designed based on GPS. These methods vary in their end-to-end delay bounds (that is, the maximum delays seen by packets from a particular session in the network between its end nodes), the level of fairness achieved in allocating bandwidth to different sessions sharing the same communication link, and the complexity of implementing them in a switch or router. An outline of the GPS scheduling discipline is given below, before describing previous methods based on GPS.

Assume that the GPS discipline is used to schedule traffic on an outgoing link of a switch. The share of bandwidth reserved by session i on the outgoing link is represented by a real number $\phi_i$. Let $B(\tau,t)$ denote the set of sessions that have at least one packet in the switch at all times during the interval $(\tau, t)$. If r is the bandwidth capacity of the outgoing link, the service offered to a connection i denoted by $W_i(\tau,t)$ is proportional to $\phi_i$. That is:

$$W_i(\tau, t) \geq \frac{\phi_i}{\sum_{j \in B(\tau,t)} \phi_j} r(t - \tau).$$

The minimum service that a session can receive in any interval of time is:

$$\frac{\phi_i}{\sum_{j=1}^{V} \phi_j} r(t - \tau),$$

where V is the maximum number of sessions that can be backlogged in the server at the same time. Thus, GPS serves each backlogged session with a minimum rate equal to its reserved rate at each instant; in addition, the excess bandwidth available from sessions not using their reservations is distributed among all the backlogged sessions at each instant in proportion to their individual reservations. This results in perfect isolation, ideal fairness, and low end-to-end session delays. Recall that the end-to-end session delay is the delay experienced by a packet between the time it leaves a source and the time it is received at its destination.

Unfortunately, as indicated above, GPS is only a theoretical system and not directly implementable in practice. Therefore, systems have been designed to approximate the GPS system as closely as possible. An example is a packet-by-packet version of the GPS method, known as PGPS or Weighted Fair Queueing as defined in A. Demers, S. Keshav, and S. Shenker, "Analysis and Simulation of a Fair Queueing Method," *Internetworking: Research and Experience*, Vol. 1, No. 1, pp. 3–26, 1990. Unfortunately, there is a serious shortcoming with the Weighted Fair Queueing method which will be apparent after the following brief discussion of the Weighted Fair Queueing method.

In the Weighted Fair Queueing method, we assume that each traffic session i sharing the output link controlled by the scheduling method is assigned a value $\phi_i$ corresponding to the reserved bandwidth of the session. The values $\phi_i$ are computed such that the reserved bandwidth of session i on the link is given by $$\frac{\phi_i}{\sum_{j=1}^{V} \phi_j},$$

where the denominator computes the sum of the $\phi_i$ values for all the sessions sharing the link.

In the Weighted Fair Queueing method, a GPS fluid-model system is simulated in parallel with the actual packet-by-packet system, in order to identify the set of connections that are backlogged in the GPS system and their service rates. Based on this information, a time-stamp is calculated for each arriving packet, and the packets are inserted into a priority queue based on their time-stamp values. To accomplish the time-stamp calculation, a virtual time v(t) is maintained by the scheduler. This virtual time v(t) is a piece-wise linear function of the real time t, and its slope changes depending on the number of busy sessions and their service rates. More precisely, if $B(\tau,t)$ represents the set of backlogged connections (by "backlogged" we mean that the session has one or more packets buffered in the switch throughout the time interval under consideration) in the scheduler during the interval $(\tau, t)$, the slope of the virtual clock function during the interval $(\tau,t)$ is given by:

$$\frac{1}{\sum_{i \in B(\tau,t)} \phi_i}.$$

On the arrival of a new packet, the virtual time v(t) must first be calculated. Then, the time-stamp $TS_i^k$ associated with the k-th packet of session i is calculated as:

$$TS_i^k \leftarrow \max(TS_i^{k-1}, v(t)) + \frac{L}{\phi_i},$$

where $TS_i^{k-1}$ is the time-stamp of the previous packet of session i, L is the size of the k-th packet, and $\phi_i$ is the share of the bandwidth allocated to session i.

A serious limitation of the Weighted Fair Queueing method is its computational complexity arising from the parallel simulation of the fluid-model GPS scheduler that is required for computation of virtual time v(t). If there is a total of V sessions sharing the outgoing link, a maximum of V events may be triggered in the simulation during the transmission time of a single packet. Thus, the time for completing a scheduling decision is O(V). When the number of sessions sharing the outgoing link is large, this computation time can be prohibitive. In particular, the method is difficult to apply in an ATM switch where the transmission time of a cell is small (approximately 2.7 microseconds with 155.5 Mbits/second link speed).

A method to reduce the complexity of Weighted Fair Queueing, using an approximate implementation of GPS multiplexing, was proposed in J. Davin and A. Heybey, "A Simulation Study of Fair Queueing and Policy Enforcement," *Computer Communications Review*, Vol. 20, pp. 23–29, Oct. 1990, and was later analyzed in S. Golestani, *Proceedings of INFOCOM '94*, pp. 636–646, IEEE, April 1994 under the name "Self-Clocked Fair Queueing" (SCFQ). In this implementation, the virtual time function v(t) is approximated using the time-stamp of the packet currently in service. Let $TS_{current}$ denote the time-stamp of the packet currently in service when a new packet arrives, and let the new packet be the k-th packet of session i. Then, the time-stamp of the new packet is calculated as:

$$TS_i^k \leftarrow \max(TS_{current}, TS_i^{k-1}) + \frac{L}{\phi_i} ,$$

where $TS_i^{k-1}$ is the time-stamp of the previous packet of session i, L is the size of the k-th packet, and $\phi_i$ is the share of the bandwidth reserved by session i. This approach reduces the complexity of the method greatly. However, the price paid is the reduced level of isolation among the sessions, causing the end-to-end delay bounds to grow linearly with the number of sessions that share the outgoing link. This can be a very problematic limitation of this method because the worst-case delay of a session can no longer be controlled just by controlling its reservation, as is possible in Weighted Fair Queueing. The higher end-to-end delay also affects the burstiness of sessions within the network, increasing the buffer requirements. Here, burstiness refers to the behavior of session traffic where its actual rate of arrival during a specified interval of time is larger than its average rate. Thus, a high burstiness generally implies a large number of packets arriving close together in time, with long idle intervals in between.

Another well-known scheduling method is VirtualClock, described in L. Zhang, "VirtualClock: a new traffic control algorithm for Packet switching networks," *ACM Transactions on Computer Systems,* vol. 9, pp. 101–124, May 1991. This method provides the same end-to-end delay and burstiness bounds as those of Weighted Fair Queueing with a simple time-stamp computation method, but the price paid is in terms of fairness. A backlogged session in the Virtual-Clock server can be starved for an arbitrary period of time as a result of excess bandwidth it received from the server when other sessions were idle.

What is needed is a method and apparatus that calculates and maintains a global parameter for keeping track of the progress of the system in a distinct and more accurate manner than the virtual time based methods described above. This global parameter should provide implementation complexity similar to that of Self-Clocked Fair Queueing, but still maintain the delay bounds of Weighted Fair Queueing. What is further needed is a method and apparatus that provides for maximum fairness among all incoming connections to the system.

SUMMARY OF THE INVENTION

The present invention generally comprises a system and method for scheduling the transmission of data packets (or cells) in a network from a plurality of queues associated with individual sessions that share an outgoing communications link. By way of example, and not of limitation, each packet is temporarily stored in a "priority queue" prior to transmission. Prior to being placed into the priority queue, each packet is assigned a "time-stamp". As the packets are placed into the priority queue, they are ordered according to their time-stamp values so that the packet with the smallest time-stamp value is at the head of the queue (next to transmit). The time-stamp assigned to a particular packet is calculated as the time at which the last bit of the packet is transmitted in an ideal system. This time-stamp computation is aided by use of a variable called the "system potential". The system potential is a global variable that is used to track the progress of work in the scheduling system. The system potential is reset to zero when the system is idle (no packets to send on the corresponding outgoing link) and increases with the passage of time thereafter when the system becomes busy (i.e. packets are transmitted). The maintenance of the system potential is facilitated by dividing time into equal-sized intervals, which are called "frames." The length of a frame is the time to transmit F bits at the rate of the outgoing link, where F is a parameter, called "frame size," to be selected by the implementation. The system potential is updated periodically by a "frame update operation" which recalibrates the system potential to the beginning of the next frame. A frame update operation is triggered when all packets with their "starting potentials" in the current frame in progress have been completely transmitted. The starting potential of a packet is the value that is calculated to represent the state of the connection at the time the packet starts transmission in an ideal reference system.

The present invention can be applied to general packet networks where the packets have variable lengths, or to ATM networks where the packets have fixed lengths (referred to as cells). Additionally, the priority queue can be implemented in software where processing time is not critical or, in the case of ATM networks where higher data rates are required, in hardware.

An advantage of the present invention is that calculation of the system potential does not require simulation of the fluid-model system as required in the Weighted Fair Queueing method. The system potential in the present invention may be seen as an estimate of the virtual time in the fluid-model system, but its computation does not require the simulation of that model. In addition, the discrepancy between the system potential and the actual virtual time in the fluid-model system is kept bounded, in contrast to the VirtualClock method where this difference can be unbounded leading to severe short-term unfairness in service received among multiple sessions sharing the outgoing link. The Self-Clocked Fair Queueing method also uses a similar function to estimate the state of the fluid-model system, but the method results in frequent over-estimation of virtual time, causing the worst-case delays of sessions to be much higher than in our method.

An object of the invention is to provide for efficient utilization of a shared outgoing communications link in a network switch.

Another object of the invention is to share an outgoing link of a switch by maintaining a system potential that tracks the progress of work in the system.

Another object of the invention is to periodically update the system potential to reflect the current state of the system.

Another object of the invention is to provide end-to-end delay bounds identical to those of Packet-level Generalized Processor Sharing (PGPS), also known as Weighted Fair Queueing, without the complexity of simulating the fluid model system, as required by PGPS.

Another object of the invention is to provide fairness so that the sessions are not penalized for excess bandwidth they received while other sessions were idle.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 9A and FIG. 9B is a flowchart showing processing steps performed in the frame update operation in accordance with the present invention.

FIG. 10 is an example of pseudocode corresponding to the flowchart shown in FIG. 5.

FIG. 11 is an example of pseudocode corresponding to the flowchart shown in FIG. 8.

FIG. 20 is an example of pseudocode corresponding to the flowchart shown in FIG. 15.

FIG. 21 is an example of pseudocode corresponding to the flowchart shown in FIG. 18.

FIG. 32A and FIG. 29B is a flowchart showing steps for selecting a cell with the minimum time-stamp in the priority queue shown in FIG. 30.

DESCRIPTION OF THE PREFERRED EMBODIMENTS

Figure 1:
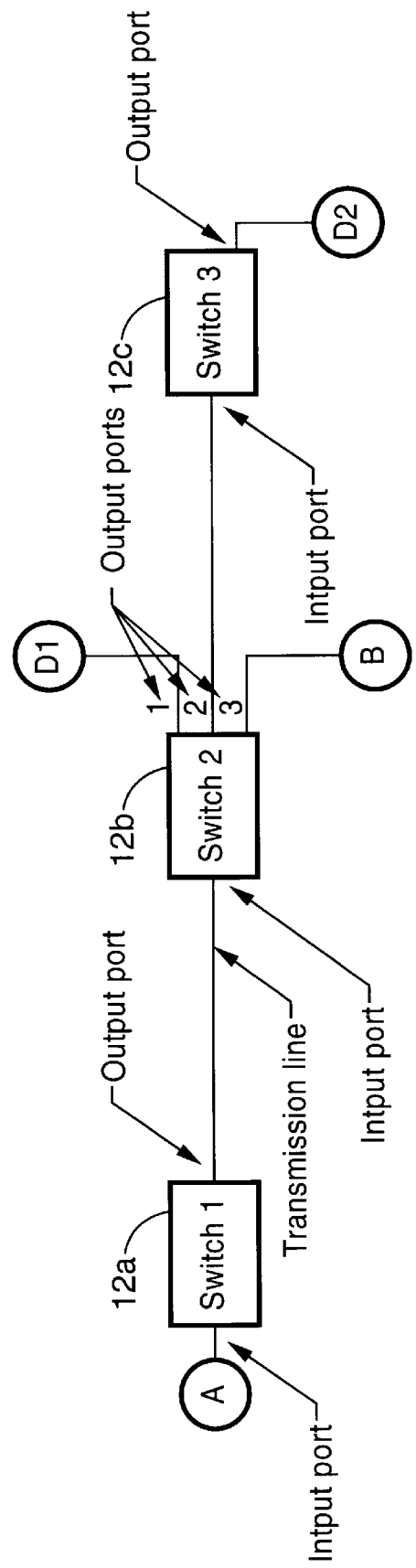
FIG. 1 is a functional block diagram of a communications network model.

Referring also to the drawings, where like reference numerals denote like parts, a detailed description of the present invention follows. It will be appreciated that the apparatus of the invention may vary as to configuration and as to details of the parts, and that the method of the invention may vary as to the particular steps and their sequence, without departing from the basic concepts as disclosed herein.

1. Definitions.

While those skilled in the art may readily understand the meaning of various terms used herein, certain terms have been developed for the purpose of describing elements of the present invention. Those terms, among others, are defined below for additional clarity.

A "packet" is a variable-length protocol data unit generated by any protocol. A "cell" is a special case of a packet defined in the Asynchronous Transfer Mode (ATM) protocol standards, with a fixed length of 53 bytes (out of which 5 bytes form the header and 48 bytes the payload). Unless stated otherwise, the term "packet" in the following definitions is used in a general sense to mean both variable-size packets and fixed-size ATM cells.

A "session" or "connection" refers to an application between two nodes in a network that communicates through a specified path in the network.

The "header" of a packet or cell is a set of pre-defined fields containing identifying information about its contents.

Packets or cells belonging to an application session are identified by a unique identifier, called a "connection identifier" carried in the header of the packet or cell.

A "flip-flop" is a device with two stable states, denoted by "0" and "1".

A "counter" is a variable that can assume one of N distinct integer values, 0 through N−1, and that can be incremented or decremented by a specified amount.

A "modulo-N" operation is an arithmetic operation in which the result is the remainder obtained by dividing the specific operand by the integer N.

"Pseudocode" denotes a combination of programming language constructs and natural language used to express a computer program in simpler terms than conventional program languages.

The theoretical basis for our scheduling method is an ideal "fluid-model system" where data transmitted by each session is considered to be infinitely divisible and multiple sources may transmit their data simultaneously through a single physical communication link, much like multiple fluid streams flowing in a pipe. This allows the allocation of bandwidth to the sessions sharing the link to be varied from instant to instant. By "ideal system", we refer to such a fluid-model scheduling system where the reserved rates of the sessions sharing the link are exactly identical to those in the actual system, and where packets arrive exactly as in the actual system. Note that such a fluid-model system is not implementable practice, but serves as a reference model in the design of our scheduling method. Thus, our scheduling method may be seen as attempting to approximate this reference system as closely as possible.

"System potential" refers to a global variable maintained by the scheduling method that is used to track the progress of work in the scheduling system. The maintenance of the system potential is facilitated by dividing time into equal-sized intervals, which are called "frames." The length of a frame is the time to transmit F bits at the rate of the outgoing link, where F is a parameter, called "frame size," to be selected by the implementation. If the current value of the system potential is between k×F and (k+1)×F, for some integer k, we say that the k-th frame is in progress in the scheduling system. The system potential is updated through "frame update operations".

Similar to the system potential, a function called "connection potential" is used to represent the state of each session in the ideal system. There is a separate connection potential function associated with each session sharing the outgoing link where the scheduling method is applied. The connection potential is meant to represent the accumulated service that a connection should have received in the ideal system. The connection potential functions are not explicitly computed or maintained in our scheduling method, but serve as a reference for tracking the state of each session in the actual system. However, the concept of connection potential is used to compute two parameters for each arriving packet in the actual system. The first one is the "starting potential" of the packet, that represents the value of the connection potential reached when the first bit of the packet starts transmission in the ideal system. The second is the "time-stamp" that denotes the value of the connection potential at the time when the last bit of the packet ends transmission in the ideal system. Thus, the starting potential and time-stamp may be seen as estimates of the connection potential in the ideal system at the beginning and end, respectively, of transmission of the packet. It should be noted that the actual steps involved in computing the starting potential and time-stamp do not require a simulation of the ideal system. We make references to the ideal system only because it serves as the theoretical foundation on which the scheduling method is based.

A "frame update operation" is an update of the system potential to the beginning of the next frame, and represents a recalibration of the system potential. A frame update operation is triggered when all packets with their "starting potentials" in the current frame in progress have been completely transmitted. A "frame boundary" denotes the point of distinction between two adjacent frames. A packet is said to "cross a frame boundary" if its "starting potential" and "time-stamp" belongs to two distinct frames (e.g., adjacent frames).

A "time-stamp" is a value computed in accordance with the present invention for each packet on its arrival into the system, to determine the order in which the packets are to be transmitted. Packets are always transmitted from the system in the order of increasing time-stamp values. The time-stamp is also referred to as the "finishing potential" of the packet. In the implementation of the invention for networks with variable packet sizes, the values of the system potential, time-stamps, and starting potentials are represented as floating-point numbers. The integer part of this representation provides the frame number to which the corresponding value belongs. In the implementation of the invention for ATM networks, the frame size F is chosen as a power of 2, and the values of the system potential, time-stamps and starting potentials are all represented as integers. The frame number corresponding to a value is then obtained by logically shifting the value to the right by $\log_2 F$ bits to the right.

A "priority queue" is a data structure for storing the packets in such a way that the following operations can be performed efficiently: (i) selection and retrieval of the packet with the minimum time-stamp value, and (ii) insertion of a packet with an arbitrary time-stamp value. Conceptually, the priority queue may be regarded as a queue of packets which have been sorted in increasing order of their time-stamp values.

"Marking a packet" refers to setting an indicator, such as a flag, associated with the packet which distinguishes the packet from others. The scheduling method marks a packet on its arrival if its starting potential and time-stamp are found to belong to two different frames.

"Post transmission procedures" refers to the steps performed when a packet completes transmission in the system. These include, but are not limited to, (i) increasing the system potential by a transmission time of a packet just transmitted, and (ii) performing a frame update operation if required.

"Normalized" means to configure a variable into a specific unit. For example, when determining the current system potential, a time offset $(t-t_s)$ is normalized by dividing it by F in order to place the offset into the same units as the frame size.

The "service rate" of a session is the minimum bandwidth reserved by the session on the outgoing link where the scheduling method is employed.

It will be appreciated that the foregoing definitions are generally applicable to all of the embodiments of the invention described herein. There are, however, certain additional definitions applicable only to specific embodiments. For example, in the priority queue implementation for an ATM network, the time-stamps are represented as integers, modulo 4F. Therefore, at any time, the possible time-stamps values of queued cells fall in the range 0 through 4F-1. A distinct flip-flop is used to indicate if a cell with the corresponding time-stamp value is queued in the system; that is, flip-flop j is set to "1" if a cell with time-stamp value j (modulo 4F) is queued in the system, and "0" otherwise. The states of these flip-flops are referred to as "slots." Thus, there is an array of 4F slots in the system, numbered 0 through 4F-1. A "slot" can be in of two states; empty and full. An "empty slot" signifies that there are no cells queued with the corresponding time-stamp value, while a "full slot" indicates that one or more cells are queued with the corresponding time-stamp value. These states correspond to the flip-flop states of "0" and "1", respectively. For each full slot j, a list is maintained for all the cells with time-stamp value equal to j (modulo 4F). The first cell in this list is located by storing its address in a "head pointer." The head pointers corresponding to the 4F slots together form the "head pointer array." In addition to this, a second list is maintained, one per connection, of cells belonging to a particular connection in the order in which they arrived. When a new cell arrives in the system, it is added to the tail of the list corresponding to the connection to which the cell belongs. To locate the tail of this list, a "tail pointer'" is maintained, one for each connection, that points to the most-recently arrived cell of the said connection. These tail pointers together form the "tail pointer array."

Figure 33:
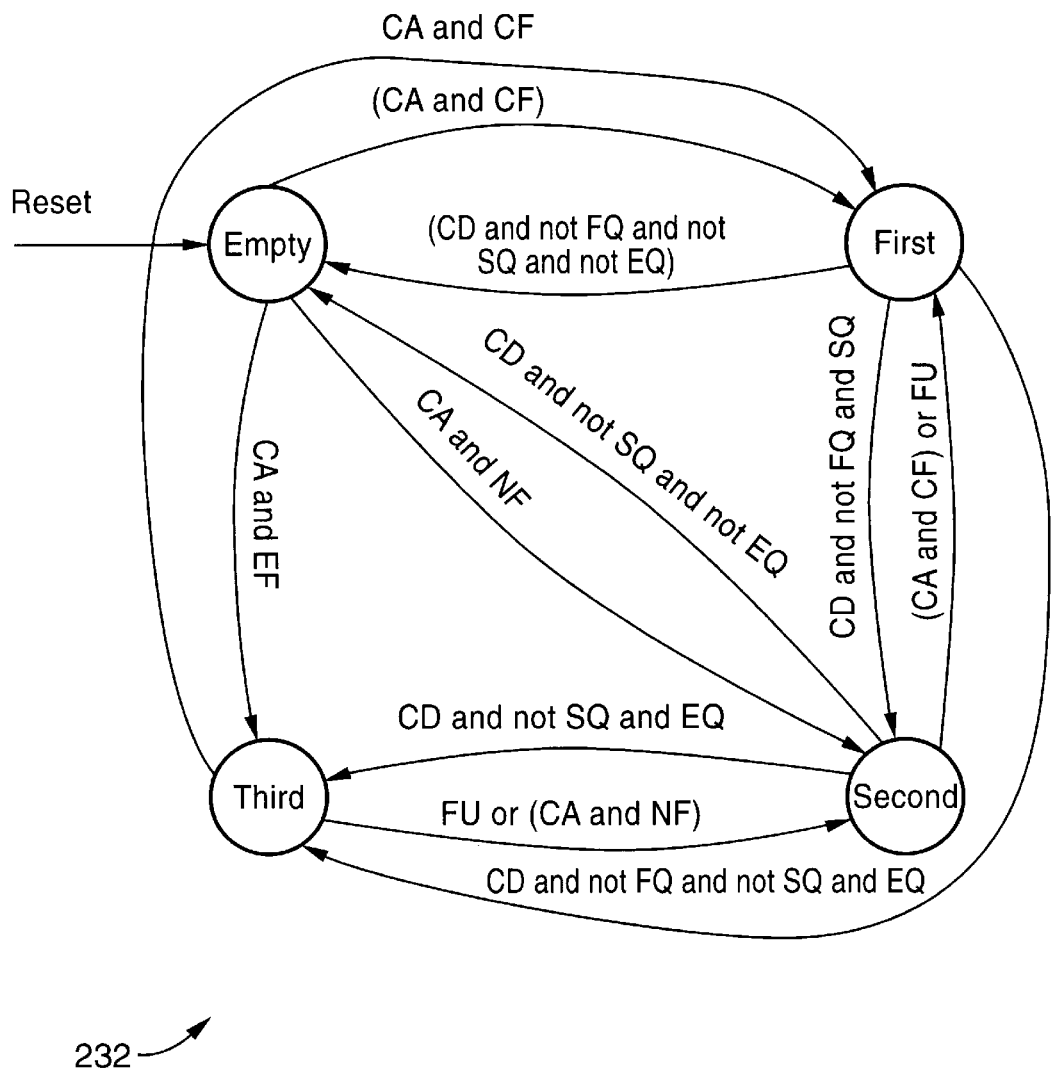
FIG. 33 is a state transition diagram corresponding to the slot updating step in the flowchart shown in FIG. 31.

With regard to the alternative implementation of the priority queue, a slot can be one of four valid states which are named as "Empty", "First", "Second" and "Third". Transitions among these states are effected by a state machine as shown in FIG. 33.

2. Environment of the Invention.

Referring first to FIG. 1, there is shown a simplified example of a communications network 10 in which the present invention can be implemented. In communications network 10, a set of switches (or routers) 12a,b,c are connected in tandem to provide a network interconnecting various host computers depicted as either the source or the destination. A communication path from source A to destination B, would traverse the path from an input port for switch 12a, through switch 12a to its output port, and then through a transmission line connection between switches 12a and 12b into an input port of switch 12b. After going through switch 12b to one of its output ports (Port 1, 2 or 3), it would reach destination B (or D1) through another transmission line. Or, the path could be routed through a transmission line to switch 12c, pass through switch 12c to an output port, and arrive at destination D2 through another transmission line.

Figure 2:
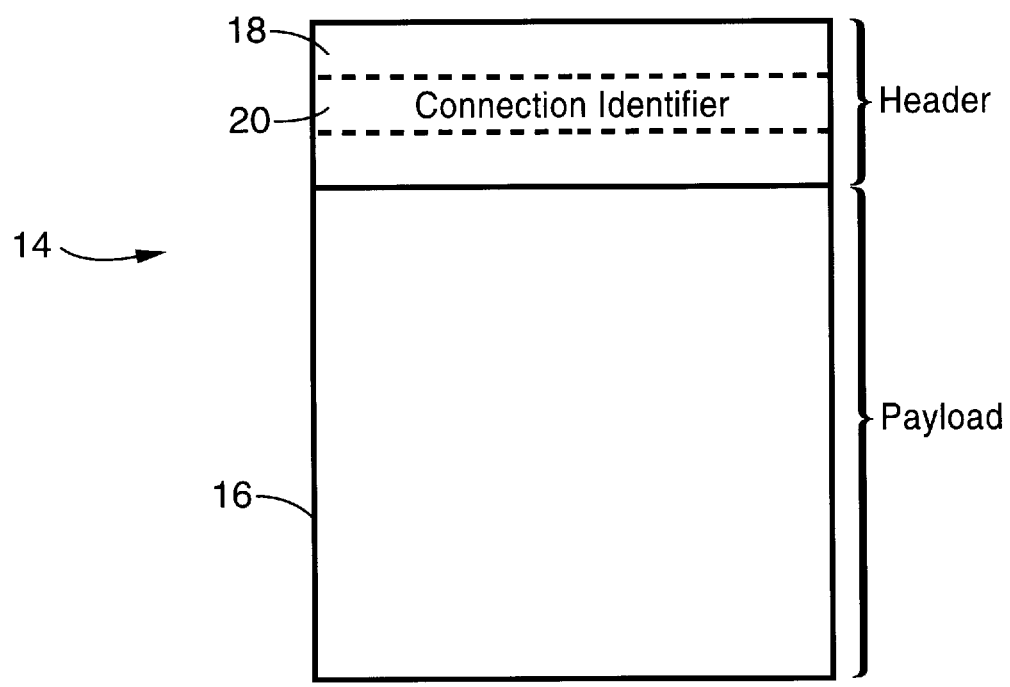
FIG. 2 is a data structure diagram showing the format of a sample data packet.

Communication between hosts through the network is in terms of packets wherein the packets are transmitted by protocol entities residing in the hosts. Each packet, in addition to its payload, carries a header for communicating to the switches en-route, information necessary to route the packet to the destination. In the discussion herein, the term "packet" is used in the general sense as referring to a variable-length protocol data unit generated by any protocol. An example of a packet 14 is shown in FIG. 2 as having a payload portion 16 and a header portion 18. A "cell" is a special case of a packet defined in the Asynchronous Transfer Mode (ATM) protocol standards, with a fixed length of 53 bytes (out of which 5 bytes form the header and 48 bytes represent the payload).

The traffic scheduling method disclosed herein applies to both general packets and fixed-size ATM cells. However, a special embodiment is disclosed for ATM networks. There are two reasons for using such a special embodiment of our method for ATM networks: First, the ATM cell has a fixed length; consequently, certain computations in our scheduling method are simplified because it is not necessary to take into account the packet length as is required while handling general variable-length packets. Second, because of the small length of the ATM cell, scheduling decisions must be performed in a short time, making a hardware implementation attractive over an implementation consisting of a processor executing software instructions due to the fast operational speed of hardware. Therefore, the preferred embodiment for ATM networks is exclusively based on hardware elements for fast execution of the method. However, it should be noted that other embodiments of our method may employ software or combine hardware and software elements in ways other than the illustrative embodiments in this disclosure.

The method of the present invention applies to connection-oriented communications networks, which are networks where all packets belonging to a given session set up by an application between two nodes is always performed through the same path in the network. Packets belonging to an application session are identified by a unique identifier. That is, all packets that belong to the same application and transfer information between two nodes have a unique value in a designated field of the header, identifying them as belonging to that application session. This unique identifier must be carried in the header of every packet and may be unique throughout the network; alternatively, a switch on the path of the session may translate the identifier value of each packet of the session into a different one before forwarding to the next switch. In the latter case, the receiving switch and the sending switch agree upon the new value of the identifier to be used. Thus, in either case, each switch on the path is able to identify the packets belonging to a given session by examination of the identifier value.

In order for the above requirement to be satisfied, a field is necessary in the packet header that will determine this identifier which we will refer to herein as a "connection identifier" (CI). In the packet shown in FIG. 2, the packet header 18 contains such a connection identifier 20. Note, however, that in different forms of packet networks, different fields may be used for this purpose. For example, in an Asynchronous Transfer Mode (ATM) network, two separate fields, Virtual Path Identifier (VPI) and Virtual Channel Identifier (VCI), of the ATM cell are designated for this purpose. These two fields, either separately or together depending on context, can be used to identify the session. Similarly, in a Frame Relay network, the Data Link Connection Identifier (DLCI) field of a frame serves the same function. As another example, the Flow ID field in the packets transmitted by Internet Protocol Version 6 also provides the same information.

Figure 3:
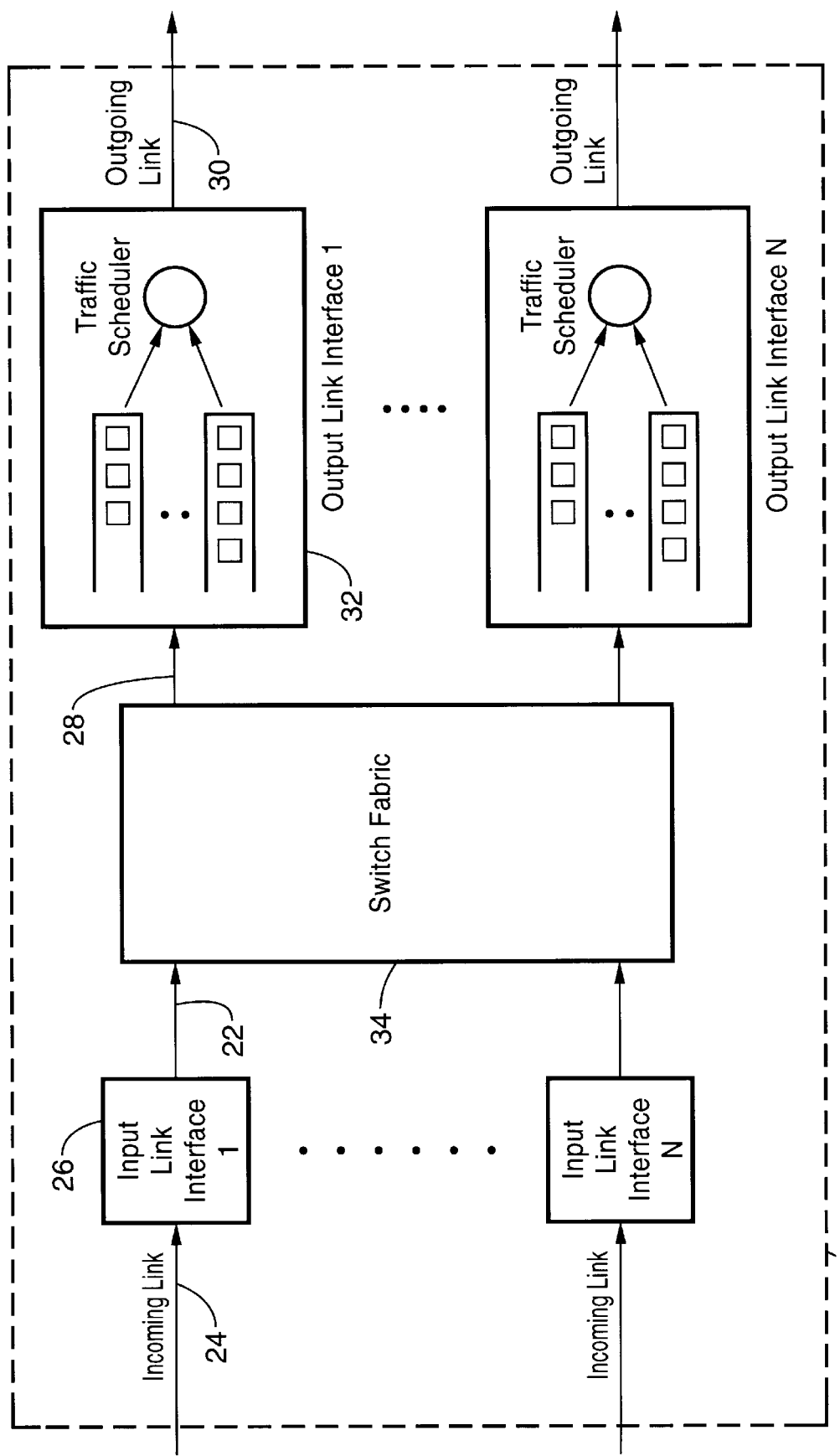
FIG. 3 is a functional block diagram of an output-buffered switching system in accordance with the present invention.

Referring now to FIG. 3, we show a specific implementation of the traffic scheduling system of the present invention in the context of an output buffered switch 12a. By "output-buffered" we mean a packet switch that has its buffering and traffic scheduling mechanism in the output ports. Such a switch generally comprises: (i) a plurality of input ports 22 (1 through N), interfaced to the input links 24 (1 through N) by input link interface modules 26 (1 through N); and (ii) a plurality of output ports 28 (1 through N) interfaced to the outgoing links 30 (1 through N) through a set of output link interface modules 32 (1 through N). The incoming data links 24 feed incoming data packets through input ports 22 to the switch fabric 34. The switch fabric 34 routes the packets arriving at input ports 22 to the appropriate output ports 28. From the output ports 28, the packets are sent to the corresponding output link interface modules 32, wherein the method of the present invention may be executed.

As previously indicated, a separate instance of the traffic-scheduling method is used to control the order in which packets are transmitted on each outgoing link of the switch. Accordingly, it will be understood that each of the output link interface modules will be configured to include an instance of the traffic scheduling method in the same manner as depicted in FIG. 3 for the output link interface module associated with Port 1 (FIG. 1) and will carry out the same buffering and processing functions described above for that illustrative output link interface module.

When a packet arrives at an output link interface module, a time-stamp is computed. This time-stamp computation is aided by a variable maintained by the method of the present invention called the system potential. The manner in which the system potential is updated is in accordance with the invention is described in detail below. After the time-stamp is computed, the packets are inserted into a priority queue, and packets are transmitted from the queue in increasing order of their time-stamps.

Variations of the method may split implementation of the traffic-scheduling method in different parts of the switch. For example, in one implementation, the time-stamp calculation method may be performed in the Input link interface modules. Information concerning the system potential associated with each outgoing link is provided through a communication path between the output link interface modules and the Input link interface modules. Operations concerning the time-stamp calculation or the method for updating the system potential may be performed by different processors or one central processor.

The traffic scheduling method of our invention will also be applicable to multicast connections—i.e., a common source transmitting the same information to multiple destinations. To illustrate, consider as an example the multicast transmission from source A to the destinations D1 and D2 (FIG. 1). Packets from switch 12b are transmitted to both output Ports 1 and 2 (FIG. 1). A specific portion of the bandwidth is reserved for that connection in both ports. Two separate instances of the traffic scheduling method are used to determine the order of transmission of packets in the output Ports 1 and 2 (FIG. 1), regardless of whether they come from a multicast or a unicast source.

Note that when a connection is set up in the network, a bandwidth of $p_i$ is reserved for each session i in each link on the path of the session in the network. The traffic scheduling method must guarantee that, when the source is transmitting with a rate at least equal to $p_i$, bandwidth of at least $p_i$ is allocated to that connection. Practical systems may require $p_i$ to be specified as a multiple of some basic rate, such as 64,000 bits/second.

3. Implementation for General Packet Networks with Variable Packet Lengths.

We will now present our traffic scheduling method and system in the context of general packet networks where packets may be of arbitrary length. We will then proceed to show an embodiment tailored for ATM networks in the next section, where the information is transmitted in terms of fixed-length cells.

A key part of our invention is the method of maintaining a system potential. The system potential is reset to zero when the system is idle (no packets to send on the corresponding outgoing link) and increases with the passage of time thereafter when the system becomes busy (i.e. packets are transmitted). The manner in which the system potential is increased is described below. The maintenance of the system potential is facilitated by dividing time into equal-sized intervals, which we call frames. The nominal length of a frame is the time to transmit F bits at the rate of the outgoing link, where F is a parameter to be selected by the implementation. Without loss of generality, we can assume that the time to transmit one bit on the outgoing link is one unit of time. Therefore, all variables that represent time in the following description of the scheduling system are assumed to be maintained in terms of this basic unit. Those skilled in the art can easily modify the description for other units of time, such as the cycle time of a clock from which all system timings are derived.

Thus, the time to transmit F bits is also F. Bandwidth reservations for individual sessions are made in terms of the frame size: Specifically, if session i requires a fraction $r_i$ of the output link bandwidth to be reserved for it, this corresponds to $\phi_i = F \times r_i$ bits within a frame. This is equivalent to reserving $\phi_i$ bits worth of bandwidth during each frame of size F. The reserved bandwidth of session i, defined as pi before, is then given by $$p_i = r_i \times r$$

where r is the bandwidth of the outgoing link. However, it should be noted that, since only whole packets can be transmitted on the outgoing link, and since the length of each session-i packet may not be a multiple of $\phi_i$, the bandwidth guarantee is not meant to hold within each frame, but over a period much longer than the duration of a single frame. To ensure that the longest packet transmitted by the session can be allowed within a frame, the method requires selecting the frame size F such that $\phi_i$ is not smaller than the maximum packet size of session i, for every session sharing the outgoing link.

We assume that the system potential is represented as a floating-point number consisting of an integer part and a fractional part. The integer part corresponds to the frame number, that is the index of the frame to which the value belongs to, and the fractional part represents the time offset from the beginning of that frame. On the completion of transmission of each packet, the fractional part is increased by the transmission time of that packet, normalized to the frame size, to account for the elapsed real time. In addition, the system potential is periodically updated to the next frame by a frame update operation. The frame update operation updates the system potential to correspond to the next frame. A frame update operation is triggered when the time-stamps of all packets queued exceed a threshold value. Specifically, the k-th frame update operation is performed when the time-stamps of all packets exceed the threshold value of $k \times F$, in a manner to be described later.

The traffic scheduling method consists of three functional parts.

1. The method and system that determine how the system potential value is calculated for each outgoing link, as outlined above.
2. The method and system that determine how the time-stamps are calculated using the value of the system potential.
3. The method and system to buffer (store) the packets and select the packet with minimum time-stamp for transmission.

These functional parts are embodied in the following description of the scheduling system.

The processing performed in the system can be divided into two distinct procedures which operate in parallel to each other. By parallel it is meant that the two procedures operate independently and, at times, simultaneously with each other. There are variables that are shared by the two procedures, but the steps that occur within each procedure operate independent from each other. These two procedures can be explained by referring to the block diagram of the output link interface module 32 shown in FIG. 4.

Figure 4:
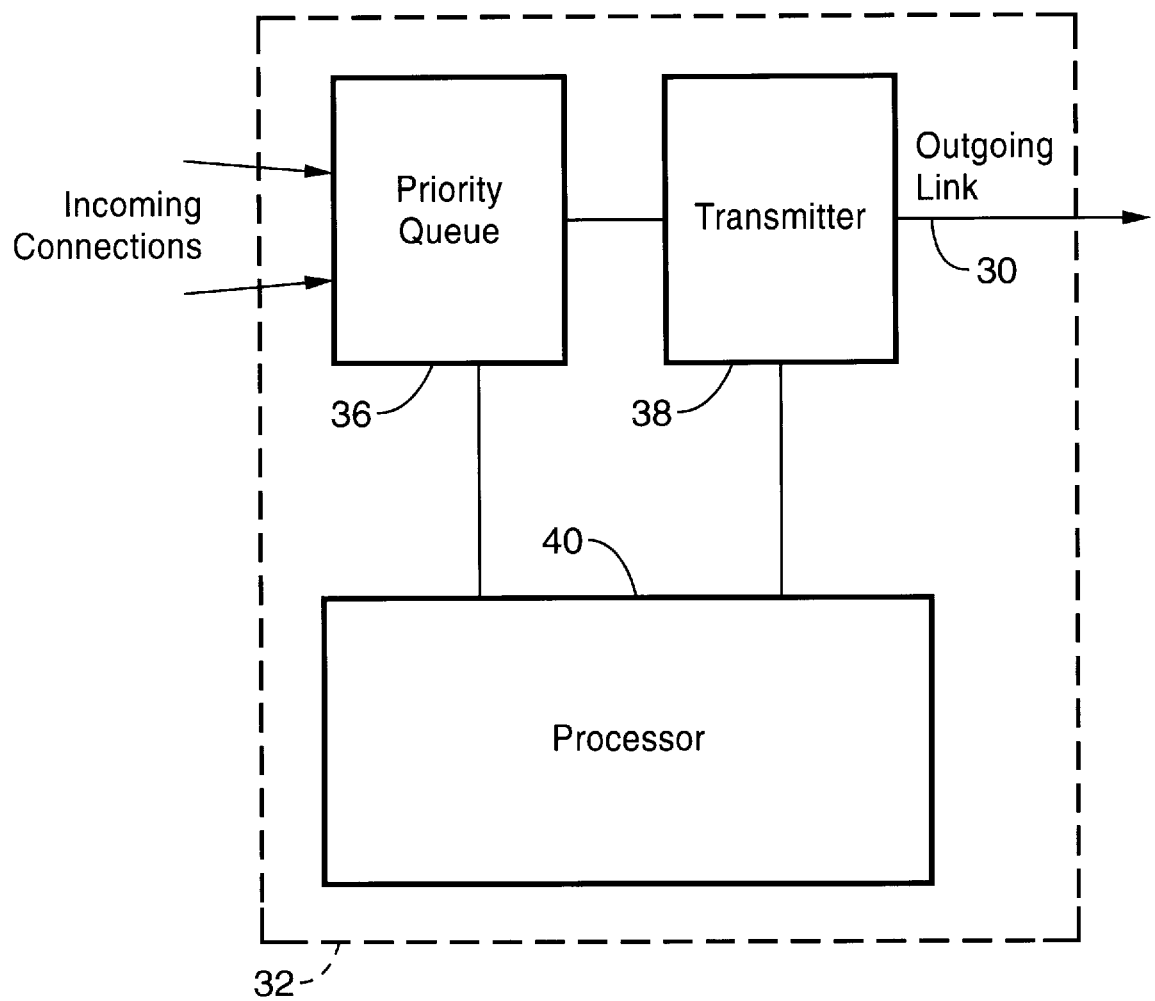
FIG. 4 is functional block diagram of an output link interface module employed in the switching system shown in FIG. 3.

The first procedure, executed by the system shown in FIG. 4, includes those steps that are executed when a data packet is received at the Output link interface module 32 from the switch fabric 34 (FIG. 3). The principal operation performed in this method is the computation of a time-stamp for each arriving packet. The time-stamp is meant to estimate the value of the connection potential function in the ideal system, associated with the session that transmitted the packet. The current value of the system potential is used in this computation of the time-stamp. After the time-stamp is computed, the packet is inserted into a priority queue 36; packets are stored in the priority queue in increasing order of their time-stamps, so that the packet with the smallest time-stamp appears at the head of the priority queue.

The second procedure, executed by the system shown in FIG. 4, includes those steps that are executed when a data packet complete its transmission in the transmitter 38. These include the steps in selecting the next packet for transmission, transmitting the packet by sending it to the transmitter 38, and updating the system potential. Selection of the next data packet is accomplished by choosing the packet that currently appears at the head of the priority queue, whose time-stamp is the minimum among all the packets queued for transmission on the outgoing link.

Implementation of either of the two procedures may be in hardware or software, or a combination of both. Although both procedures are shown illustratively as being performed by a processor 40, the procedures may be executed by a variety of other means such as state machines implemented in hardware. Several factors such as the transmission speed of the outgoing link and the size of the data packets, will determine the type of implementation. The steps executed in the two procedures outlined above are elaborated in the flowcharts of FIG. 5 and FIG. 8, respectively.

Figure 5:
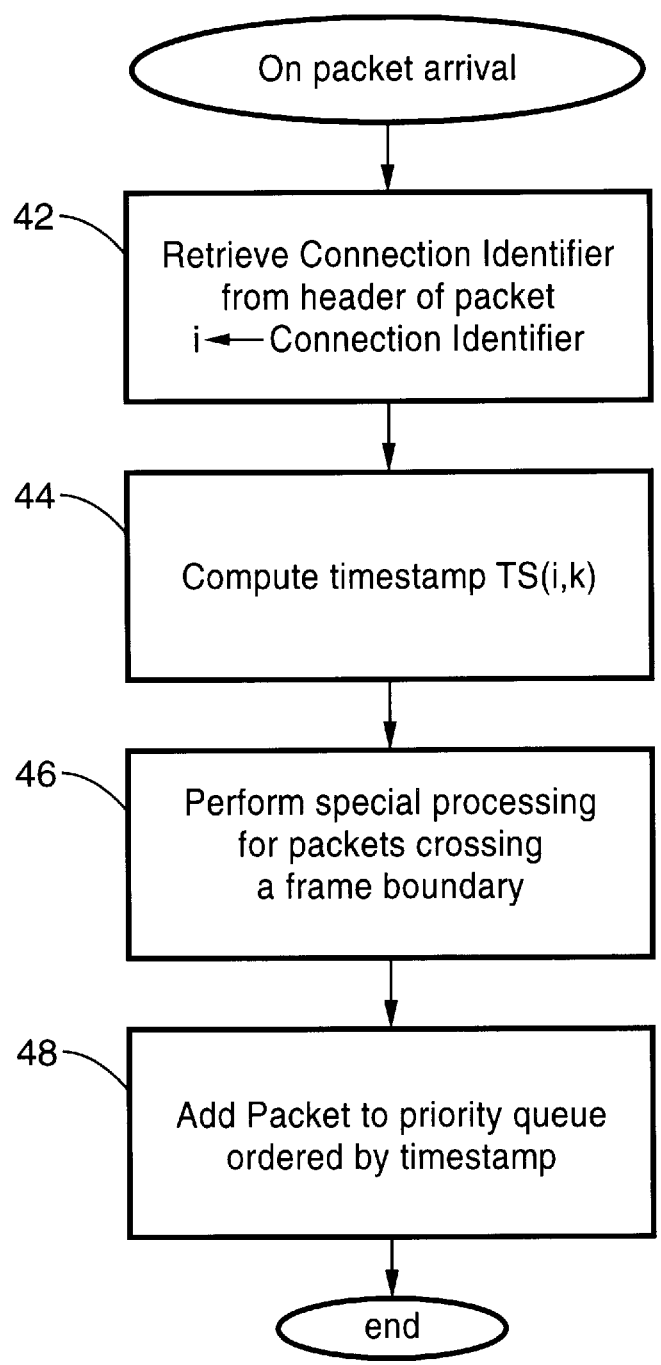
FIG. 5 is a flowchart showing processing steps performed when a new packet arrives at the output link interface module.

With that basic description of the overall procedures of the present invention, a more detailed description will now be provided. The steps in the flowchart of FIG. 5 are executed when a new packet arrives at an output link interface module 32. In Step 42, the connection identifier is retrieved from the header of the packet to identify the session that the packet belongs to, say i. In Step 44, a time-stamp is computed for the packet. In Step 46, those packets that cross a frame boundary are identified and processed. Finally, in Step 48, the packet is inserted into the priority queue according to its computed time-stamp such that packets in the queue appear in the order of increasing time-stamp values. The processing steps embodied in Steps 44 and 46 of the flowchart of FIG. 5 are elaborated in the flowcharts of FIG. 6 and FIG. 7, respectively.

Figure 6:
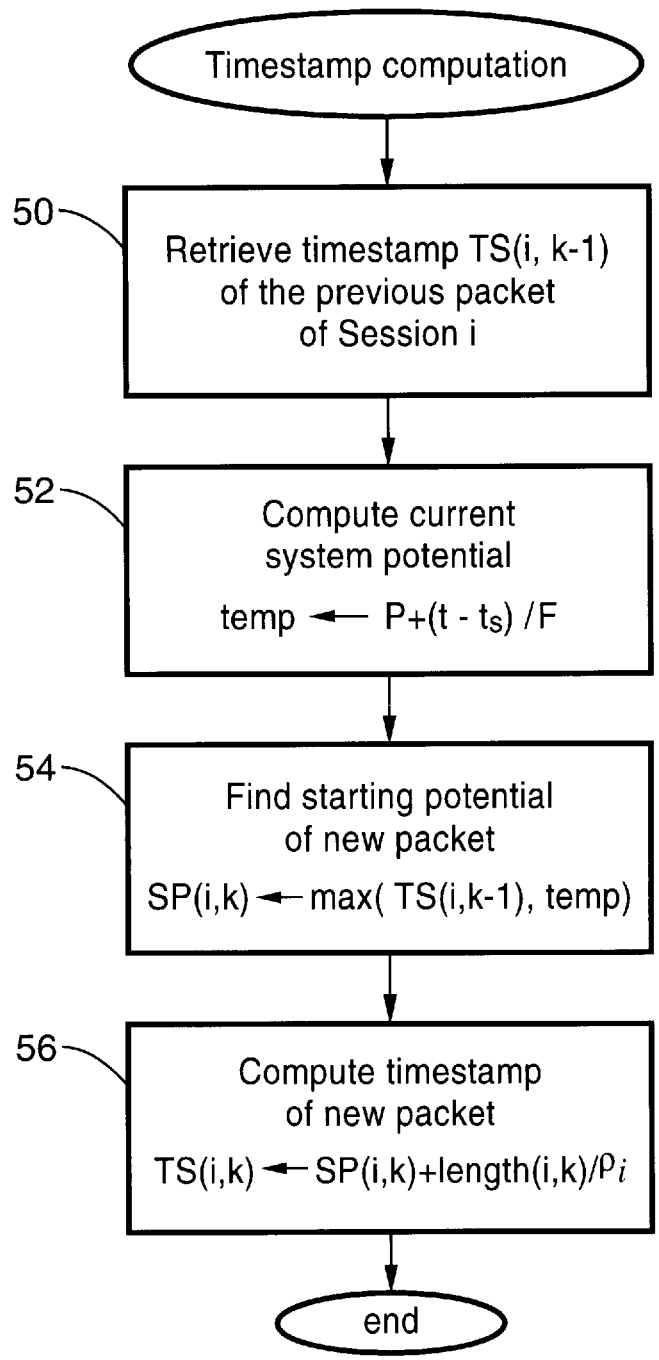
FIG. 6 is a flowchart showing processing steps for time-stamp computation in accordance with the present invention.

The flowchart in FIG. 6 describes how the time-stamp for the arriving packet is calculated at Step 44. The time-stamp of the packet is intended to estimate the value of the connection potential function in the ideal system associated with the session that transmitted the packet, at the instant when the packet finishes service (transmission), assuming its service rate on the outgoing link is the reserved rate $p_i$. However, it should be noted that this is only an estimate, and the actual value of connection potential reached in the ideal system upon completion of the packet may be different because of several reasons. First, packets are transmitted as integral units one after the other on the link. Second, the session i that the packet belongs to may receive a higher service rate than $p_i$ when one or more of the other sessions that reserved bandwidth on the link are temporarily idle. Finally, the system potential function maintained by the method is only an approximation.

At Step 50, the process retrieves the time-stamp of the previous packet which has arrived from the same session, designated by TS(i,k−1), where TS stands for time-stamp, i represents the session, and k−1 indicates the previous packet. To facilitate this, the time-stamp of the most recently arrived packet from each session is maintained in the system. When a time-stamp is computed for a newly arrived packet, its value becomes the current value of TS(i,k−1). When a connection is first set up, the value of TS(i,k−1) is taken as zero for computing the time-stamp of the first packet. Similarly, when the system becomes idle, all the stored time-stamp values TS(i,k−1) are reset to zero.

Next, at Step 52, the current system potential is computed. The variable P maintains the system potential. As described earlier, P is a floating-point number with two parts—the integer part representing the current frame number, and the fractional part representing the elapsed real time since the last frame update. Since P is updated only on completion of the transmission of every packet, and the arrival of the new packet may not coincide with the completion of transmission of another packet, the system potential at the time of arrival of the new packet is calculated in the variable temp by adding to P the elapsed real time since the current packet in transmission started its service, normalized to the size of the frame. By normalized, it is meant that the real-time offset will be divided by the frame size in order to place it in the same units as the system potential. Furthermore, recall that if the system is idle, that is no packets are currently being transmitted, the system potential will be zero. Therefore, the value temp is calculated according to the following formula:

$$\text{temp} = P + (t - t_s)/F$$

where t is the current time and $t_s$ is the time at which the packet currently being transmitted started its service. This value of the system potential is then used in the computation of the time-stamp as described in the following paragraphs.

Then, at Step 54, the starting potential of the packet is computed. The starting potential is an estimate of the value of the connection potential function in the ideal system, associated with the session that transmitted the packet, reached at the instant when the packet starts transmission in the ideal system. The time-stamp of the packet is then computed from this starting potential. This starting potential, represented by the variable SP(i,k), is calculated as the maximum of two values: (i) the time-stamp of the previous packet arrived for session i, designated as TS(i,k−1), and (ii) the system potential computed in Step 52. The time-stamp of the new packet, denoted as TS(i,k), is then computed in Step 56 as:

$$TS(i,k) = SP(i,k) + \text{length}(i,k)/p_i$$

where length(i,k) is the length of the new packet and $p_i$ is the reserved bandwidth of session i. Thus, TS(i,k) represents the value of the connection potential associated with session i in the ideal system, reached when the current packet completes transmission, assuming the connection potential when the packet starts transmission is SP(i,k).

The time-stamp thus computed has the same representation as the system potential. That is, it consists of an integer part corresponding to a frame number, and a fractional part representing an offset within the frame.

Figure 7:
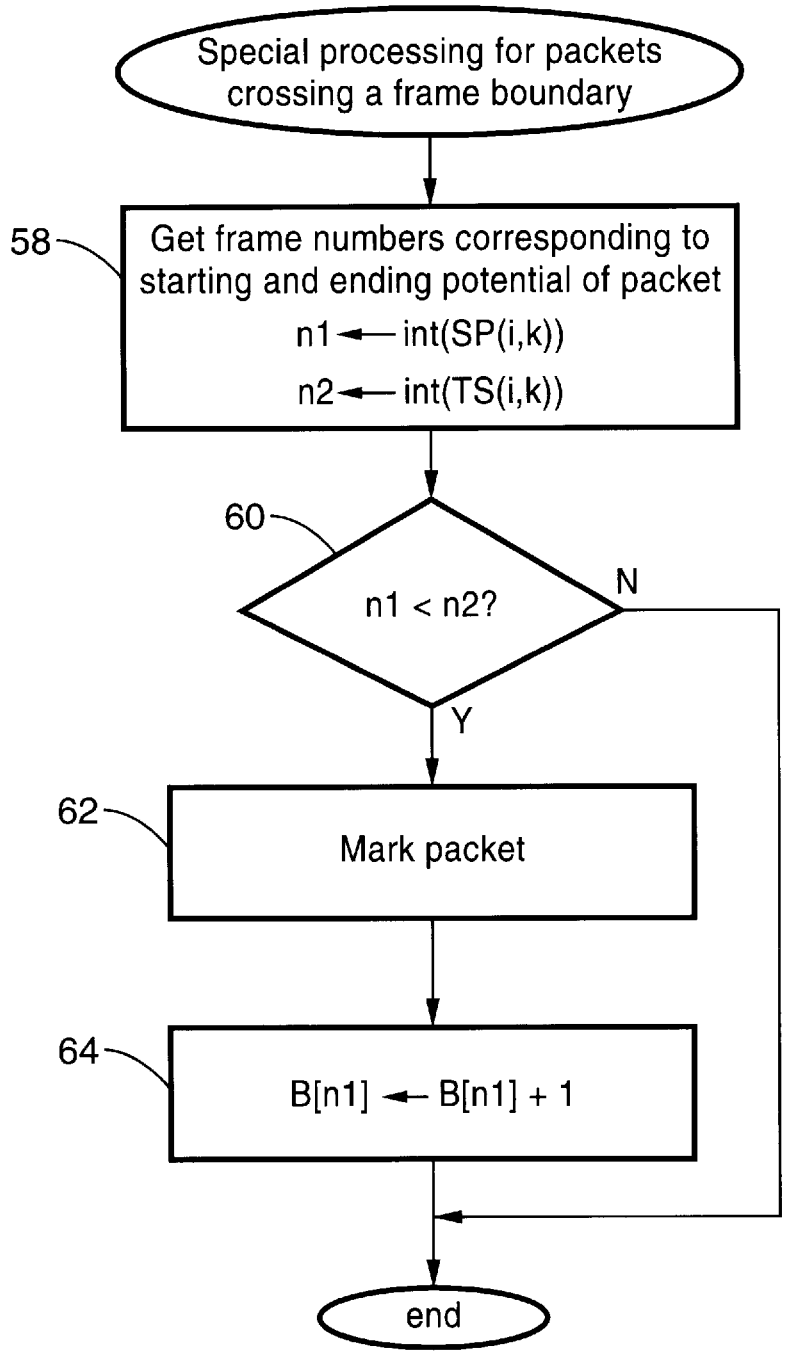
FIG. 7 is a flowchart showing processing steps performed to check if a packet has crossed a frame boundary, and to mark such packets in accordance with the present invention.

The flowchart in FIG. 7 describes how we determine if the new packet crosses the boundary of a frame and perform some special processing steps for such packets crossing a frame boundary in Step 46 (FIG. 5). The packet is seen as crossing a frame boundary if its starting potential SP(i,k) and its time-stamp TS(i,k) belong to different frames. More specifically, if the integer part of the time-stamp TS(i,k) is larger than the integer part of the starting potential SP(i,k), the packet is considered as crossing a frame boundary. Therefore, at Step 58 the frame numbers corresponding to the starting and ending potential of the packets are acquired. In the flowchart, int(SP(i,k)) is meant to denote the integer part of the floating-point number SP(i,k) and int(TS(i,k)) the corresponding integer part of TS(i,k). A packet is regarded as crossing a frame boundary when the integer parts of its starting potential and finishing potential (time-stamp) are distinct as determined at Step 60. Such packets are marked at Step 62 by setting a flag that is stored with the packet in the queue, so that the marked packets can be distinguished from others when they reach the head of the queue and are processed for transmission. To perform a frame update operation, it is necessary to ensure that all the packets with starting potentials in the current frame have already been transmitted. To accomplish this objective, a counter is incremented when the packet is determined to be crossing a frame boundary. One such counter is maintained with every frame whose status is kept in the system. The resulting array of counters is represented as B, indexed by the frame number with which it is associated. At Step 64, the frame number corresponding to the starting potential of the marked packet is used to select the counter for incrementing. Later, when the packet is processed for transmission, the corresponding counter would be decremented; the counter reaching zero can be used as an indication that all packets with starting potential in the current frame have already been transmitted. Knowledge of this condition is necessary to perform the frame update operation, as will be explained later.

As described in the previous paragraph, the array of counters B is used to count the number of connections that have packets with starting potential in each frame. Although an infinite number of frames may need to be serviced, in practice the number of distinct frames in which the potentials of queued packets can fall into is limited by the buffer size allocated to the sessions. Thus, if $b_i$ denotes the buffer size allocated to session i, the size of the array B can be limited to:

$$M = \max_{1 \leq i \leq V}(b_i/\phi_i).$$

In the above expression, if $(b_i/\phi_i)$ is not a whole integer, it is rounded up to the nearest integer. If M is rounded up to the nearest power of 2, then the array can be addressed with the $\log_2 M$ least significant bits of the current frame number. Obviously, instead of the array, a linked-list implementation of the counters can be used as well.

The second functional part of the traffic scheduling system is the processing that is performed when the current packet being transmitted completes its transmission. The steps that are performed in this part are outlined in the flowchart of FIG. 8. In Step 66, the first step is to increase the system potential by adding to the variable P, the transmission time of the packet that just completed its transmission, normalized to the frame size F. This is accomplished by the update equation:

$$P \leftarrow P + \text{length}(j)/F$$

where length(j) is the length of the packet (in bits) that just completed transmission. It should be noted here that the time to transmit length(j) bits of the packet is also length(j) units, since our basic unit of time is the transmission time of one bit.

Next, at Step 68, a frame update operation is performed, if required. This step involves a number of constituent steps, which are further elaborated in the flowchart of FIG. 9A and FIG. 9B. Finally, at Step 70 the next packet for transmission from the head of the priority queue is selected. Since the queue is maintained in order of the time-stamps, the packet that is selected is always the one whose time-stamp value is the minimum among all packets queued for the outgoing link.

Figure 9A:
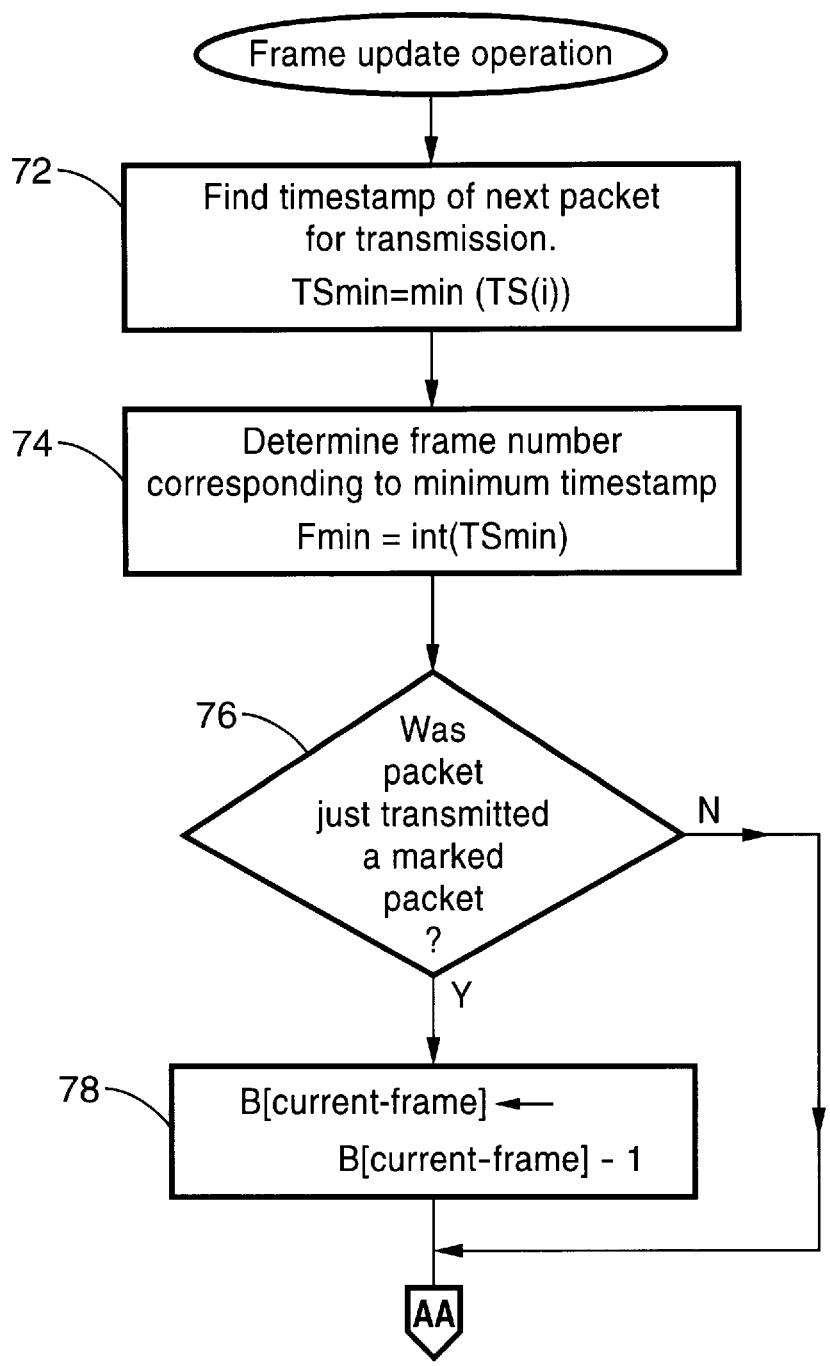

Referring now to FIG. 9A and FIG. 9B, the frame update operation is performed as follows. A variable current-frame keeps track of the current frame in progress. This variable is reset to zero when there are no packets in the system, and is increased by one during each frame-update operation. The condition that enables a frame update operation is that all packets in the system with their starting potentials in the current frame have already been transmitted. A series of tests is performed to check this condition. At Step 72 the value of the time-stamp of the next data packet to be transmitted is obtained from the head of the priority queue, TSmin. At Step 74 the frame number Fmin corresponding to this time-stamp value is then computed by taking its integer part, that is Fmin=int(TSmin). A test is then performed at Step 76 to check if the data packet that just completed transmission was a marked packet. A marked packet must have its starting potential in the current frame and the finishing potential (time-stamp) in the next frame. If the packet was a marked one, the counter B corresponding to the current frame is decremented at Step 78. Recall that this counter was incremented for each such marked packet in Step 64 (FIG. 7).

In Step 80, tests are performed to determine (i) if the counter B for the current frame has reached zero, and (ii) if the frame number corresponding to the minimum time-stamp value, computed in Step 74, is greater than the current frame number. If both conditions are true, then there can be no packets with their starting potentials in the current frame, and a frame update operation can be performed at Steps 82 through 86. If either test fails, Steps 82 through 86 are skipped and Step 88 is executed.

Figure 8:
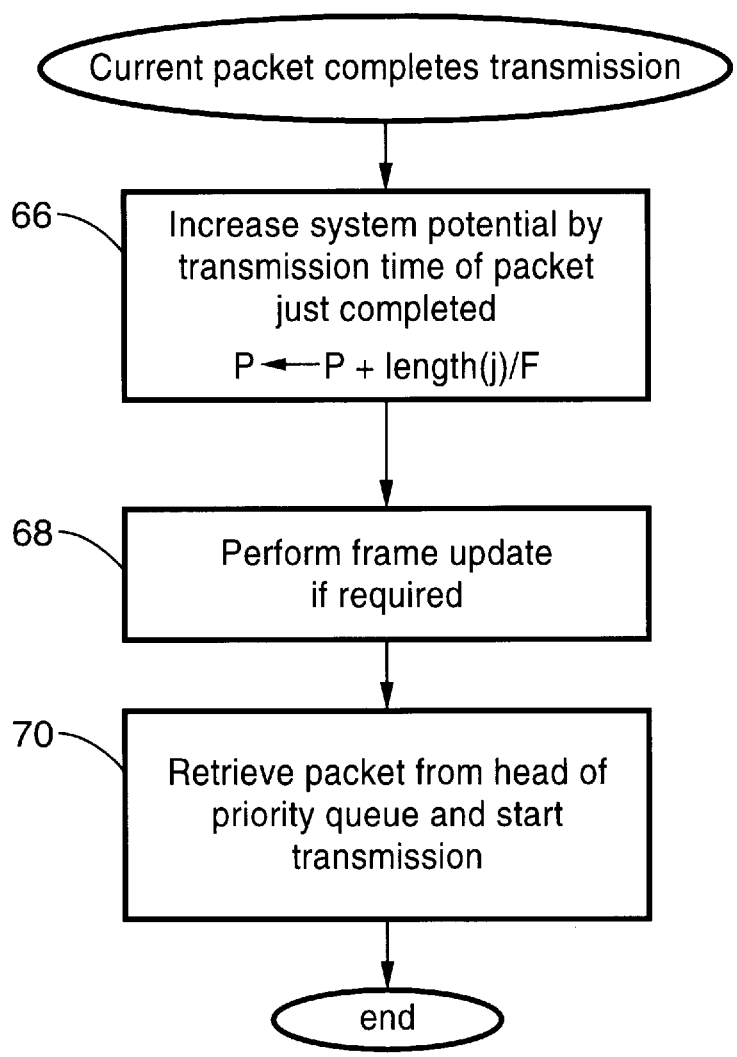
FIG. 8 is a flowchart showing processing steps performed when a packet completes transmission in accordance with the present invention.

Steps 82 through 86 perform the frame update operation as follows. First the current-frame variable is incremented at Step 82. In addition, if the integer part of the system potential P is not already equal to the updated value of current-frame, the system potential is also updated to the value of current-frame. This is accomplished by testing the system potential against the value of the current frame at Step 84, and updating the system potential in Step 86. Note that the assignment in Step 86 makes the integer part of the system potential P equal to the frame number of the new frame in progress and the fractional part equal zero. Finally, at Step 88, the value of the current time is stored in the variable $t_s$ so as to aid in the computation of the system potential in Step 52 (FIG. 6). The operations in the flowcharts of FIG. 5 and FIG. 8 are presented in pseudocode format in FIG. 10 and FIG. 11, respectively.

The frame update operation as outlined in the previous paragraphs is required to achieve low end-to-end delays for the application sessions whose packets are being scheduled by the traffic scheduling method. Formal proofs on the delay behavior of the method are provided in D. Stiliadis and A. Varma, "Frame Based Fair Queueing: A New Traffic Scheduling Method for Packet Switched Networks," Tech. Rep. UCSC-CRL-95-38, U.C. Santa Cruz, Dept. of Computer Engineering, July 1995.

Figure 12A:
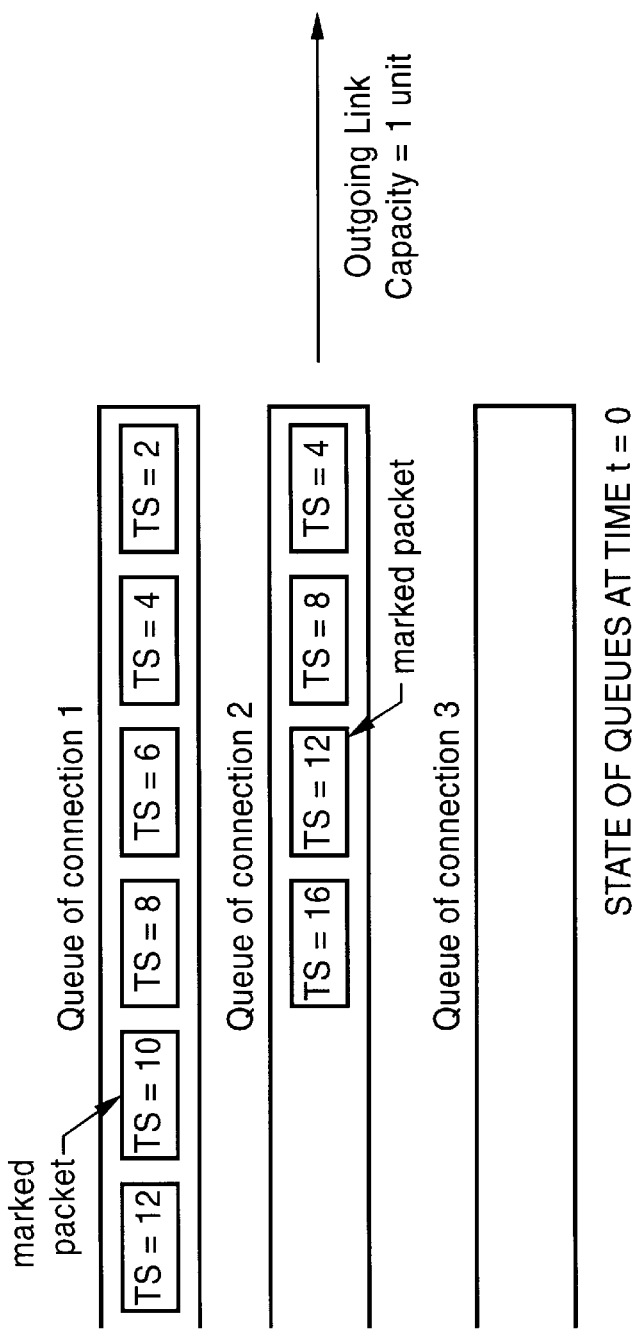
FIG. 12A and FIG. 12B illustrate an example of a transmission sequence according to the present invention.

An example is now presented to illustrate the operation, and, in particular, to demonstrate the need for the frame update operation. Consider the scheduling system of FIG. 12A where three connections share an outgoing link of a switch whose total bandwidth capacity is one unit. Assume, for the sake of illustration, that each of the Connections 1, 2, and 3 have respectively reserved 50%, 25% and 25% of the bandwidth of the outgoing link. Assume further that the system was idle at time t=0, so that the system potential is zero at time t=0.

Now consider the following sequence of events: At time t=0, a total of 6 packets arrive in the queue of Connection 1, and a total of 4 packets arrive in the queue of Connection 2. Let each of these packets be of the same length, equal to one unit. Also assume that Connection 3 remains idle, so that its queue remains empty.

Let us consider the sequence of events in the scheduling system. Proceeding through the flowchart of FIG. 6, a time-stamp is computed for each arriving packet. The time-stamp of the first arriving packet of Connection 1 is computed as:

$TS(1,1)=0+1/50\%=2.$

Similarly, the time-stamps of the following packets of Connection 1 will be computed as 4, 6, 8, 10 and 12, in that order.

The time-stamp of the first arriving packet of Connection 2 is computed as:

$TS(2,1)=0+1/25\%=4.$

Similarly, the following packets of Connection 2 will be computed as 8, 12, and 16, respectively.

Figure 12B:
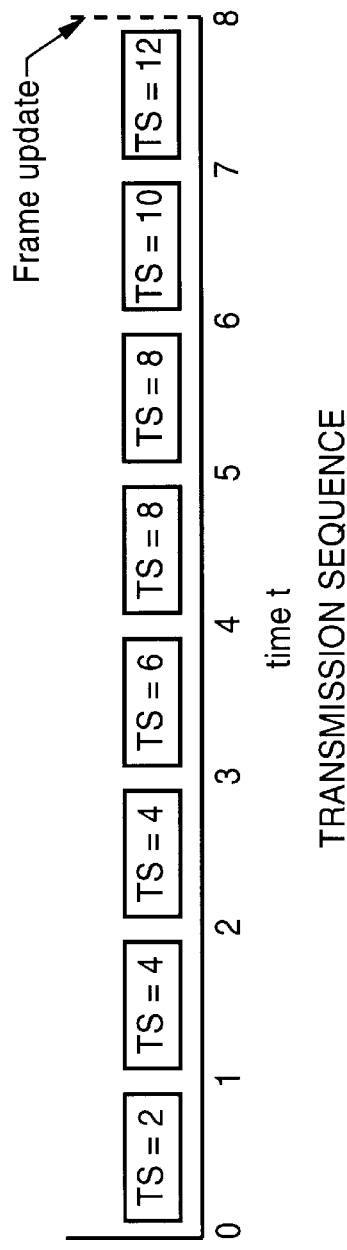

The packets of Connections 1 and 2 are then inserted into the priority queue in the order of their time-stamps and are transmitted in that order. FIG. 12B shows the order in which the above packets are transmitted by the scheduling system. Note that, since Connection 3 is idle, Connection 1 effectively receives a bandwidth allocation $0.5/(0.5+0.25)=66.67\%$ of the link capacity and Connection 2 receives the remaining 33.33%.

Since each packet is of length 1-unit, the system potential will be increased by 1-unit at the end of the transmission of each packet. Thus, at time t=8, the system would have completed transmission of a total of eight packets (five from Connection 1 and three from Connection 2). The value of the system potential at this time would also be equal to 8. However, the smallest time-stamp value of packets remaining in the queue is now 12, and the smallest starting potential is 10. If a packet from Connection 3 were to arrive in its queue at this time, its time-stamp would be computed, based on the system potential of 8, as:

$TS(3,1)=8+1/25\%=12.$

Note that this causes the packet of Connection 3 to be transmitted immediately. In an ideal system, the system potential would have been equal to the smallest starting potential of the active connection that is 10 in this example; the corresponding value of the time-stamp of the newly arrived packet of Connection 3 would have been:

$10+1/25\%=14.$

This effect causes Connection 3 to receive more service in the short term as compared to Connections 1 and 2. The system potential update is designed to correct this unfairness. Assuming, for the sake of illustration, that the frame size was chosen as F=10 in our scheduling method, the fifth packet of Connection 1 and the third packet of connection 2 would be marked since their starting potentials belong to the first frame and the finishing potentials (time-stamps) belong to the second frame. Therefore, when the transmission of the last marked packet is completed at time t=8, a frame update will be performed, increasing the system potential to 10. Thus, the first packet of Connection 3 arriving at time t=8, now will see a system potential of 10 and its time-stamp would be computed at 14, thus correcting for any unfairness that might otherwise occur.

Consider an additional example involving two connections A and B each having 50% of the transmission bandwidth. Let us further assume that B is idle, or not providing any data packets for transmission. A is then allowed to continuously transmit data packets. If A sends 100 packets each of unit length 1, the time-stamp of the 101st data packet will then be 200 because A is only allowed 50% of the bandwidth. However, the system potential will only have increased by 100 because only 100 data packets have been sent. Then consider that B is now ready to send packets; the first packet from B will have a time-stamp of 102 and will be allowed to transmit next. This will result in unfairness to A, however, because A must wait until the system potential is raised to 200 before it can send another data packet (remember that the next packet to be sent from connection A has a time-stamp of 200). This means that B will be allowed to transmit 50 packets before A can resume transmitting. This is unfair because A did nothing wrong by using B's bandwidth while B was idle. Therefore, the frame update, or system potential calibration, in effect, raises the system potential to 200 so that connections A and B can equally transmit data packets when B finally begins providing data packets.

4. Simplified Implementation for ATM Networks.

Although the method and system described above for general packet networks can be also used in the context of ATM networks where packets are transmitted in terms of fixed cell sizes, a simplified version is now presented that will allow implementation entirely using hardware elements. In this regard, it is important to note that a software implementation will be slower than a hardware implementation due to the small size and large number of cells to be transmitted. In ATM networks the available time for completing a scheduling decision is very short. At SONET OC-3 speeds the transmission time of a cell is less than 2.7 $\mu$s. For higher speeds the available processing time is even less. This forces a hardware implementation. Therefore, the scheduling method must be implementable without floating-point operations that may require complex hardware and/or large delays.

Time is again split into frames, with a maximum frame size of F. F is assumed to be a power of 2, or $F=2^b$. The unit of time is now chosen as the time required to transmit an entire ATM cell through the outgoing link. Therefore, F is the time required to transmit F ATM cells through the outgoing link. Bandwidth reservations of sessions are assumed to be in terms of number of ATM cells per frame. That is, each session i reserves a bandwidth equal to $\phi_i$ ATM cells within a frame of size F. The fraction of the link bandwidth reserved for session i is then $r_i$, where $r_i$ is given by $r_i = \phi/F$. This means that no more than $\phi_i$ cells may be transmitted from connection i during one frame. The reserved bandwidth of session i, defined as $p_i$ before, is then given by $p_i = r_i \times r = (\phi_i/F)r$ where r is the bandwidth of the outgoing link. We further assume that the value of $1/p_i$ is an integer. If all sessions were busy during a frame period, then by the end of the frame each session would have sent exactly $\phi_i$ cells, thus satisfying its bandwidth reservation, and the size of the frame would be F. However, if some sessions were idle during a frame, then all of the active connections would have completed sending their cells belonging to the current frame in less than F units of time, causing a new frame to be started early. Similar to the previous method, a frame update operation is defined for this purpose, to be explained later.

The system potential function in this embodiment is maintained as an integer (in contrast to the floating-point representation employed in the previous embodiment). The system potential P is now defined as the current frame number multiplied by the maximum frame size, plus the real time that passed since the start of the current frame in progress. Since the frame size F is a power of 2, the multiplication operation in this computation can be performed as a shift operation of the frame number by $b=\log_2 F$ bits to the left. As before, the system potential is reset to zero when the system is idle and is increased monotonically thereafter as detailed below.

Figure 13:
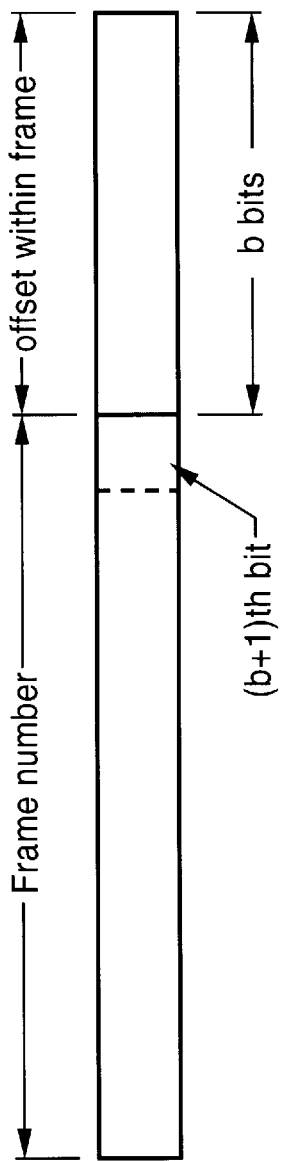
FIG. 13 is a data structure diagram illustrating the format of the system potential and time-stamp for ATM networks in accordance with the present invention.

The value of the system potential P can be thought of as consisting of two fields as shown in FIG. 13 which shows the format of the system potential and time-stamp for ATM networks. The least significant b bits indicate the time that passed since the beginning of the current frame and the remaining most significant bits indicate the current frame number. A time-stamp is computed by the scheduling method for every arriving cell. The format of these time-stamps is also the same as that of the system potential. That is, the b least significant bits of the time-stamp indicate the time relative to the beginning of the frame in which the ending potential of the cell falls, and the remaining most significant bits indicate the frame number of the corresponding frame. The latter represents the frame during which the cell must depart the system.

Figure 14:
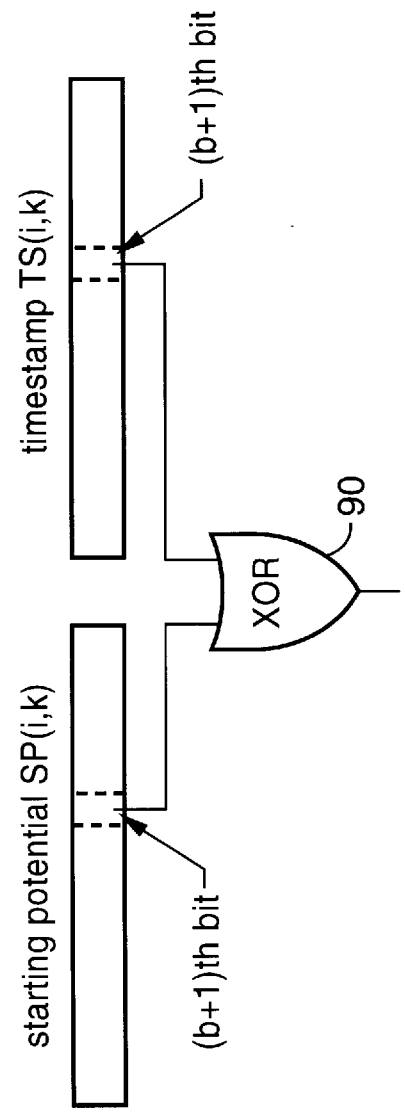
FIG. 14 is a sample logic diagram for detecting ATM cells crossing a frame boundary in accordance with the present invention.

As in the general case, a cell is defined as crossing a frame boundary if the finishing potential of that cell belongs in a different frame than its starting potential. Such cells are marked while adding to the priority queue. Cells crossing a frame boundary are detected when, during the time-stamp calculation, the (b+1)th bit of the time-stamp flips. This can be checked in hardware by comparing the (b+1)th bit of the time-stamp of the cell with the corresponding bit of its starting potential, as illustrated in FIG. 14. The output of the exclusive-OR gate 90 is activated when the two bits have different values, thus signifying that the corresponding cell is crossing a frame boundary.

As in the case of the embodiment for general packet networks described in Section 3 above, the processing performed by the scheduling system in an ATM switch can be divided into two parts: (i) a part that is performed when a new cell arrives at the output link interface module connected to the outgoing link where the cell is destined to, and (ii) a part that is executed when the transmission of a cell has been completed. These two parts are described separately in the following paragraphs.

Figure 15:
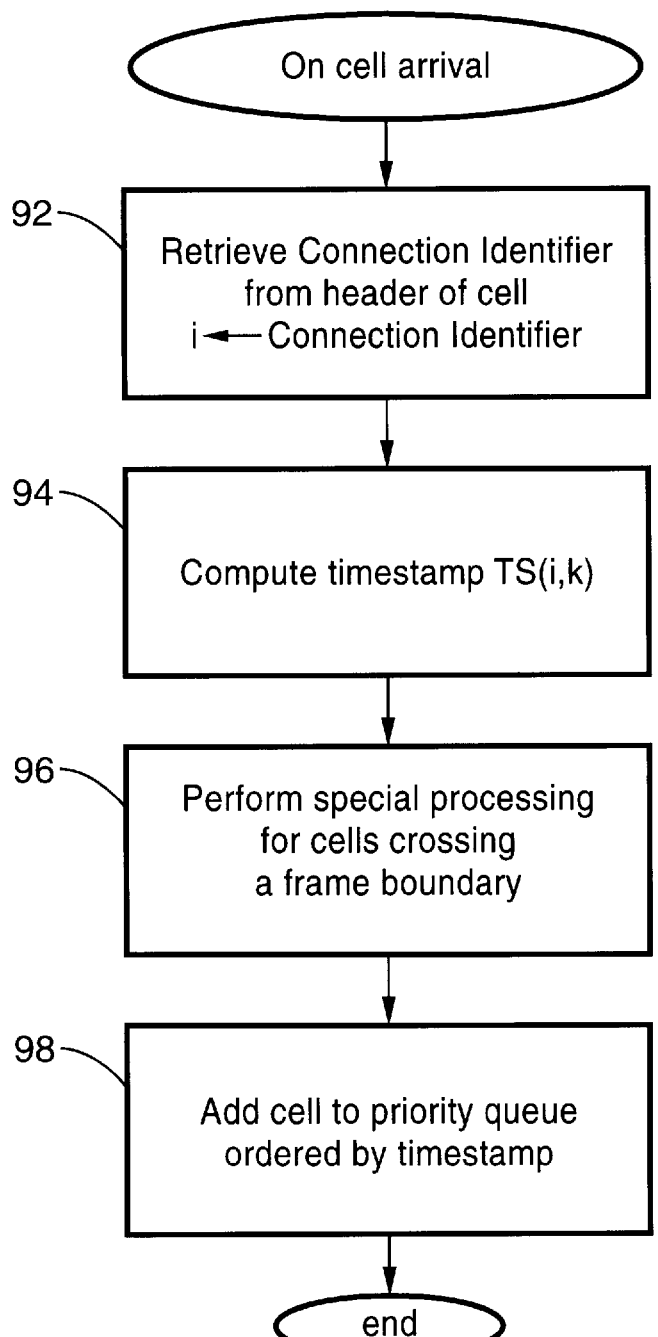
FIG. 15 is an alternative embodiment of the flowchart of FIG. 5 showing processing steps performed when a new cell arrives at the output link interface module in an ATM switch.

The steps in the flowchart of FIG. 15 are executed when a new cell arrives at the output link interface module. Since the transmission time of an ATM cell is very short, in this case we assume that incoming cells are processed only at the boundaries of cell transmissions, so that calculation of the system potential need not take into account the partial service received by the cell currently being transmitted. In Step 92, the Connection Identifier is retrieved from the header of the cell to identify the session that the packet belongs to, say i. The Connection Identifier in this case is obtained from the values in the Virtual Channel identifier (VCI) and/or Virtual Path Identifier (VPI) fields of the header of the ATM cell. In Step 94, a time-stamp TS(i,k) is computed for the cell. This is further elaborated in the flowchart of FIG. 16. In Step 96, special processing steps are performed to identify and process cells that cross a frame boundary. These steps are also elaborated further in the flowchart of FIG. 17. Finally, in Step 98, the cell is inserted into the priority queue according to its computed time-stamp such that cells in the queue will be transmitted in the order of increasing time-stamp values.

Figure 16:
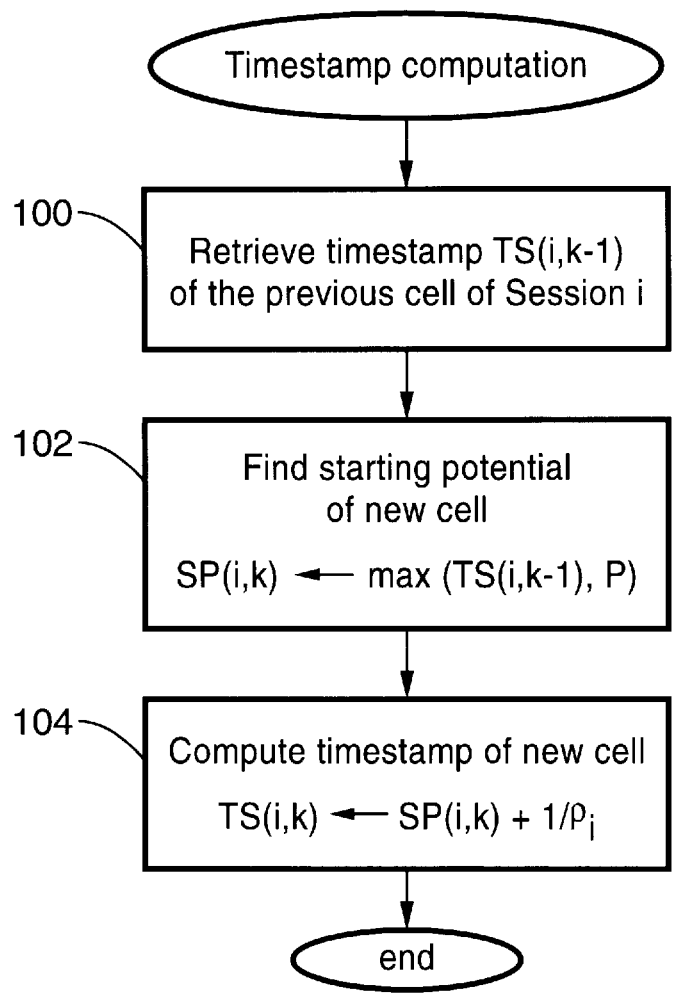
FIG. 16 is an alternative embodiment of the flowchart of FIG. 6 showing processing steps for time-stamp computation in an ATM switch.

As indicated above, the specific steps involved in the time-stamp computation of Step 94 are elaborated in the flowchart of FIG. 16. At Step 100, the time-stamp of the previous cell is retrieved. The starting potential is then calculated at Step 102 as in the general case by finding the maximum of the current system potential and the time-stamp of the previous cell of that connection. Note that the current system potential is taken simply as the current value of the variable P, which is a simplification from the general case where the partial service received by the packet currently in transmission was taken into account in the computation. The time-stamp of the cell is then calculated in Step 104 by adding the $1/p_i$ to the starting potential.

The third task performed is to determine if the new cell crosses the boundary of a frame and perform special processing steps for such cells. These steps are elaborated in the flowchart of FIG. 17, which are similar to those in FIG. 7 for general packet networks, except that some computations are simplified, taking advantage of the fact that integers are used for representation of the time-stamps. As before, the cell is determined as crossing a frame boundary if its starting potential SP(i,k) and its time-stamp TS(i,k) belong to different frames. This test in Step 106 can be performed by the simple logic of FIG. 14, that is, by testing if the (b+1)th bit of the starting potential is different from the corresponding bit of the time-stamp. Such cells are marked by setting a flag that is stored with the cell in the queue at Step 108. In addition, a counter is incremented when the cell is determined to be crossing a frame boundary. One such counter is maintained with every frame whose status is kept in the system. These counters, represented by an array B, have the same function as that in the case of general packet networks. Step 110 uses the frame number corresponding to the starting potential of the marked cell to locate the counter in the array B. This frame number is found by shifting the starting potential value SP(i,k) by b bits logically to the right.

Figure 18:
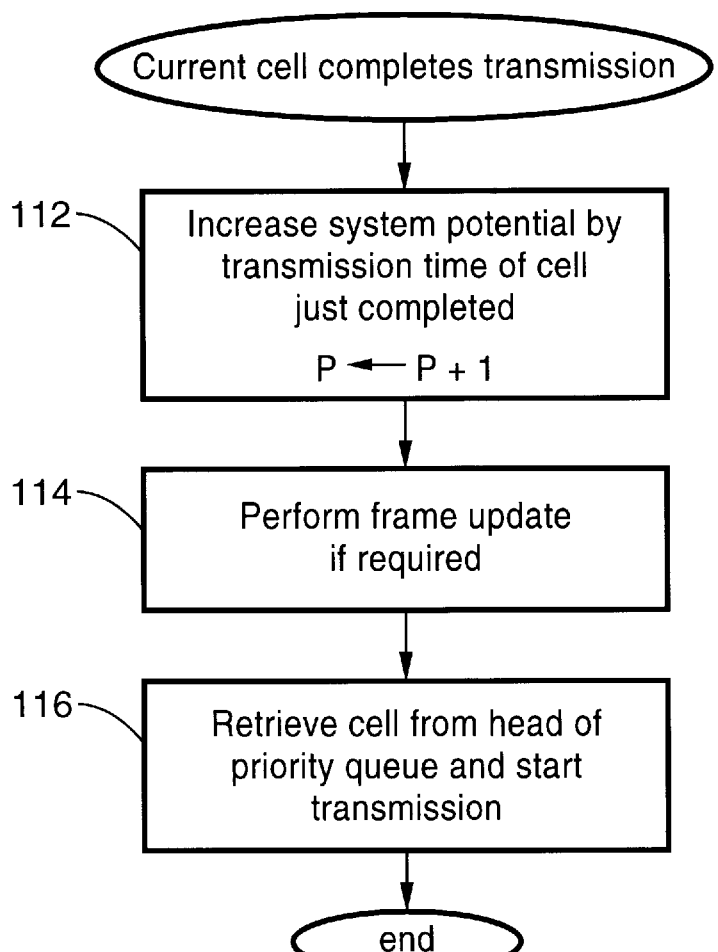
FIG. 18 is an alternative embodiment of the flowchart of FIG. 8 showing processing steps performed when a cell completes transmission in an ATM switch.
Figure 19A:
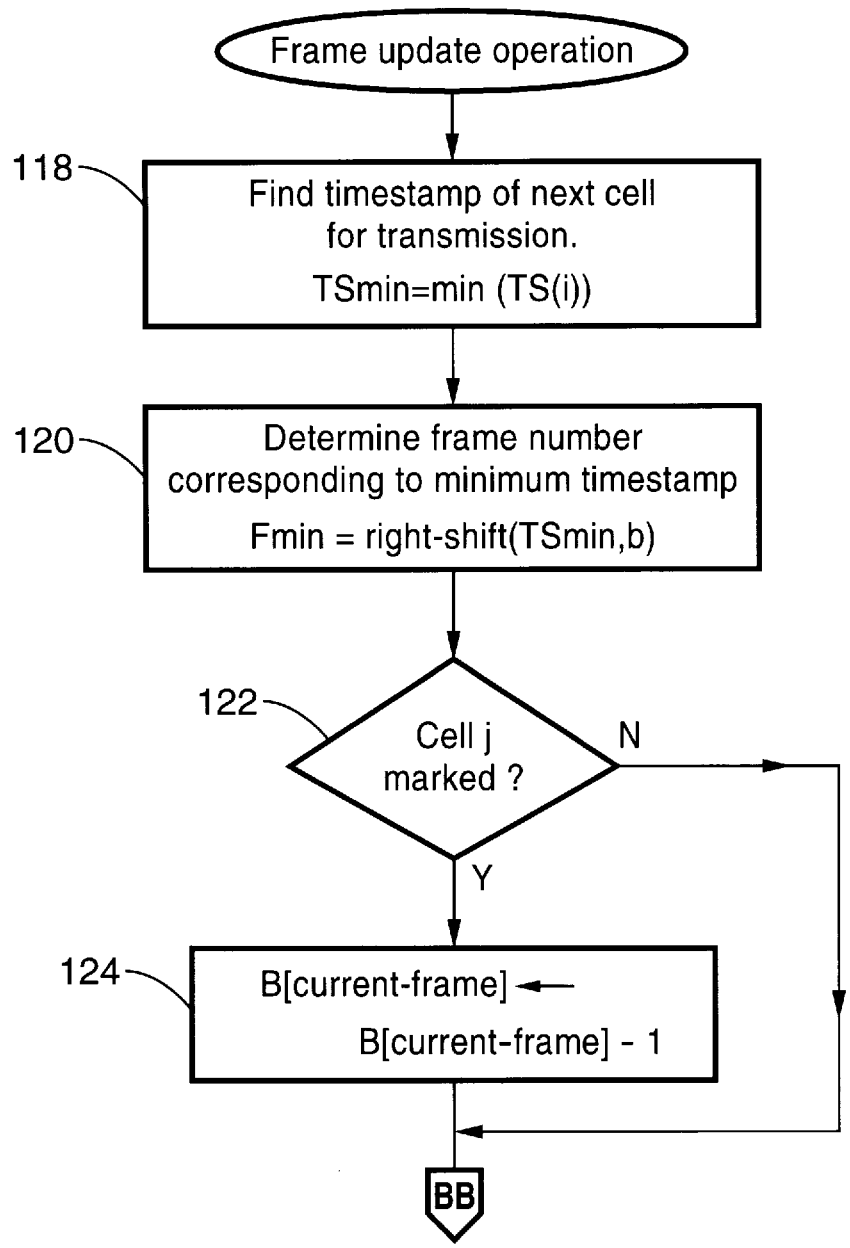
FIG. 19A and FIG. 19B is an alternative embodiment of the flowchart of FIG. 9A and FIG. 9B showing processing steps in the frame update operation in an ATM switch.
Figure 19B:
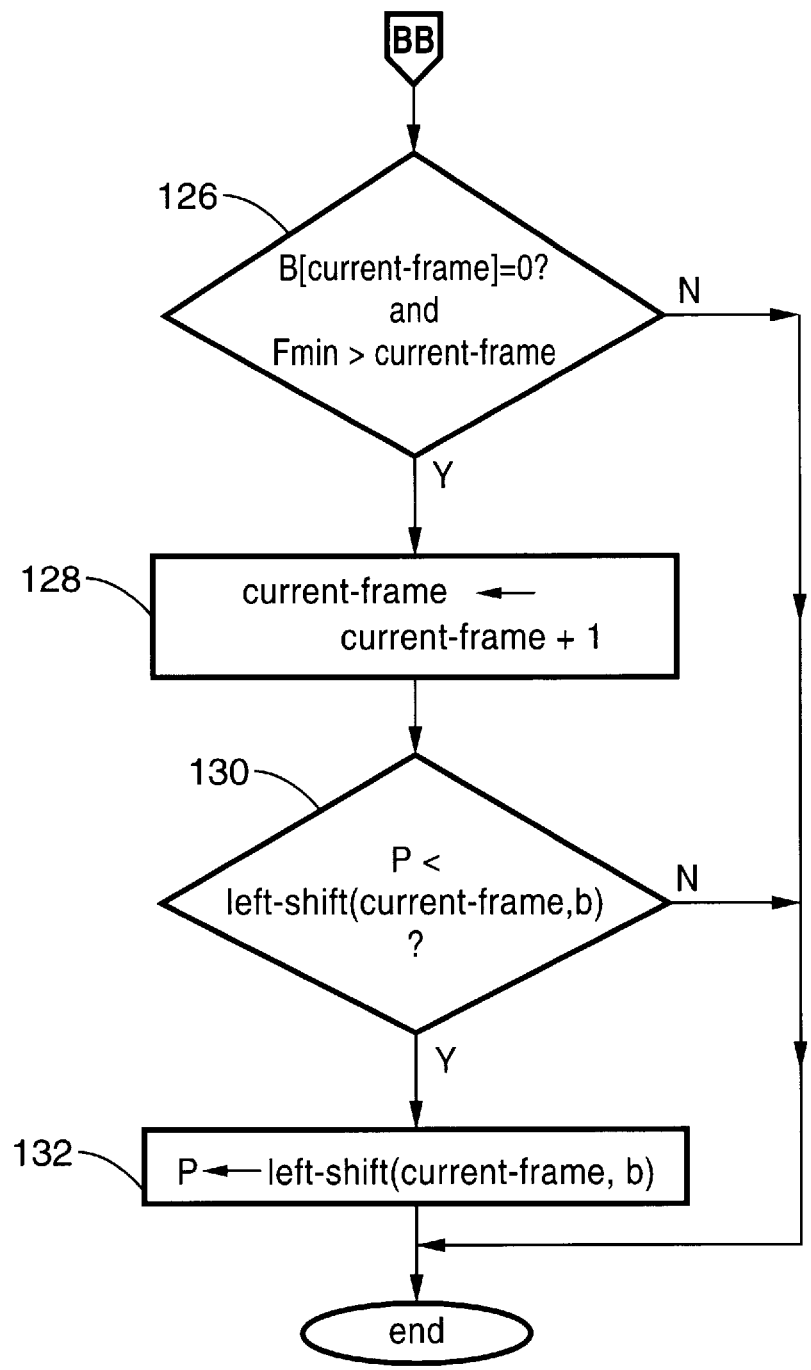

The second functional part of the traffic scheduling system, namely the processing that is performed when the current cell being transmitted completes its transmission, is outlined in the flowchart of FIG. 18. The processing performed is similar to that in the case of general packet networks, except that some computations are simplified, again taking advantage of the fact that integers are used for representation of the system potential and time-stamps. This allows floating-point multiplications to be replaced by shift operations. On the departure of a cell, the system potential value is updated by adding the transmission time of the cell, that is 1-unit, at Step 112. At Step 114, a frame update operation is performed; the processing involved in this step is elaborated in the flowchart of FIG. 19A and FIG. 19B. Finally, at Step 116 the last step is to select the next cell for transmission from the head of the priority queue.

Figure 17:
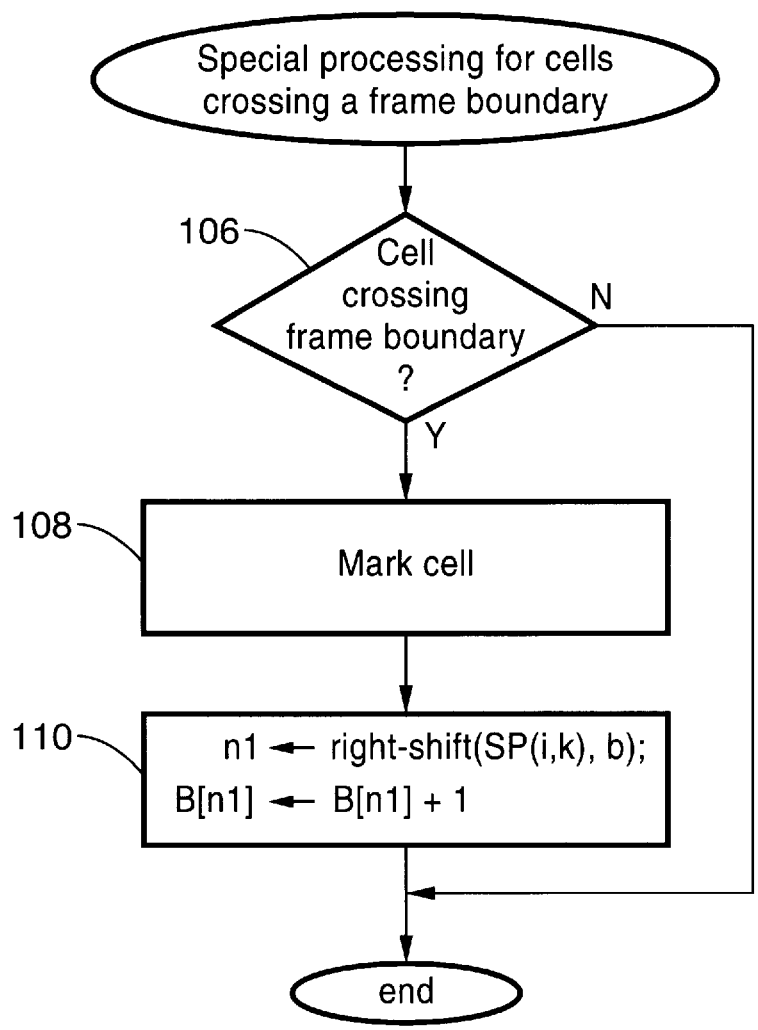
FIG. 17 is an alternative embodiment of the flowchart of FIG. 7 showing processing steps performed to check if a cell has crossed a frame boundary, and to mark such cells in an ATM switch.

As indicated above, the processing steps involved in the frame update operation are explained in detail in the flowchart of FIG. 19. The variable current-frame keeps track of the current frame in progress. This variable is reset to zero when there are no cells in the system, and is increased by one during each frame-update operation. The condition that enables a frame update operation is that all cells in the system with their starting potentials in the current frame have already been transmitted. A series of tests is performed to check this condition: First, at Step 118, the time-stamp of the next cell to be transmitted, TSmin, is retrieved from the head of the priority queue. The frame number corresponding to this time-stamp, Fmin, is then determined at Step 120. This frame number is obtained simply by logically shifting the time-stamp value of the cell by b bits to the right, where $b=\log_2 F$. A test is then performed at Step 122 to check if the cell that was just transmitted was a marked cell. If so, then the counter B corresponding to the current frame is decremented at Step 124. Recall that this counter was incremented for each such marked cell in Step 110 (FIG. 17).

In Step 126, tests are performed (i) for the counter value B corresponding to the current frame reaching zero, and (ii) for the frame number corresponding to the cell with the minimum time-stamp value, computed in Step 120, exceeding the current frame number. If both conditions are true, a frame update operation is then performed at Steps 128 through 132. The failure of either test in Step 126 indicates the presence of queued cells with their starting potentials in the current frame, and no further processing is performed in that case.

If the conditions checked in Step 126 are both true, a frame update operation can now be performed, since all cells with their starting potentials within the current frame have already left the system. Steps 128 through 132 perform the frame update operation as follows. First, at Step 128, the frame number in the variable current-frame is incremented. Next, if the system potential P is determined to be less than the starting potential of the updated value of current-frame at Step 130, the system potential is also updated at Step 132. Note that the starting potential of the current-frame is obtained in Step 130 by shifting its value to the left by b bits. The assignment step in Step 132 updates the system potential by setting its least significant b bits (corresponding to the offset within the frame) to zero, and the remaining most significant bits (corresponding to the frame number) to the value of current-frame.

The operations in the flowcharts of FIG. 15 and FIG. 18 are presented in pseudocode format in FIG. 20 and FIG. 21, respectively.

5. Priority Queue Implementation for ATM Networks.

As can be seen at this point, an essential function to be provided in both illustrative embodiments discussed earlier is that of maintaining a priority queue of data packets (or ATM cells), ordered by their time-stamps. Such a queue can be maintained in random-access memory by the use of an appropriate data structure, such as a heap. Operations for inserting and removing cells can be accomplished by the use of any well-known method, illustrative examples of which can be found in A. V. Aho, J. E. Hopcraft, and J. D. Ullman, *Data Structures and Algorithms*, Addison Wesley, 1987.

When the operations of insertions and deletions are performed by software, the number of processing steps needed for each insertion or for each deletion is typically $O(\log_2 V)$, where V is the number of sessions sharing the outgoing link. This processing time may be unacceptable in a high-speed ATM network, where the time available to process cells may be very short. In this section, therefore, we present an illustrative preferred embodiment of a hardware implementation of the priority queue, to be used in conjunction with our scheduling method for ATM networks involving ATM cells, outlined in the flowcharts of FIG. 15 through FIG. 19A and FIG. 19B.

The implementation of a priority queue utilizes a set of 4F flip-flops with some associated processing logic to implement basic operations on the priority queue. A second embodiment of this basic method is then described where the amount of storage is reduced from 4F flip-flops to 2F flip-flops, but with some additional complexity in the processing logic.

More specifically, the method of implementing the priority queue is based on the fact that, in the ATM implementation, each frame can be divided into F individual "slots," each corresponding to a unique value taken by the time-stamp representation. A given slot, say j, may be in one of two states:

1. There is no cell currently queued in the system with a time-stamp value of j. In this case, we say that the slot j is empty.
2. There is at least one cell currently in the system with a time-stamp value of j. We designate this state as full.

Thus, to implement a priority queue with integer time-stamps, it is sufficient to maintain a separate list for each slot. That is, the list corresponding to slot j includes cells whose time-stamp value is j. Selecting cells in the order of time-stamp values can be accomplished simply by scanning each time the slots in order and transmitting the cell associated with the first slot in the full state. Slots in the empty state are skipped during the scanning. In addition, it should be noted that the cells associated with a given slot can be transmitted in any arbitrary order, since they all have the same time-stamp value. Thus, the list of cells associated with each slot can be maintained in any order, for example, first-in-first-out, last-in-first-out, or any other order that facilitates a simple implementation.

Maintaining the state of each slot has the potential disadvantage that a large number of memory elements may be needed to store the states, since the time-stamps of cells present in the queue at a particular instant of time may potentially fall into many different frames. However, by the use of some processing steps, it is necessary to maintain the states of slots within only a small number of frames (a minimum of three) to implement the priority queue. This is the basic idea behind the following method of maintaining the priority queue.

Figure 22:
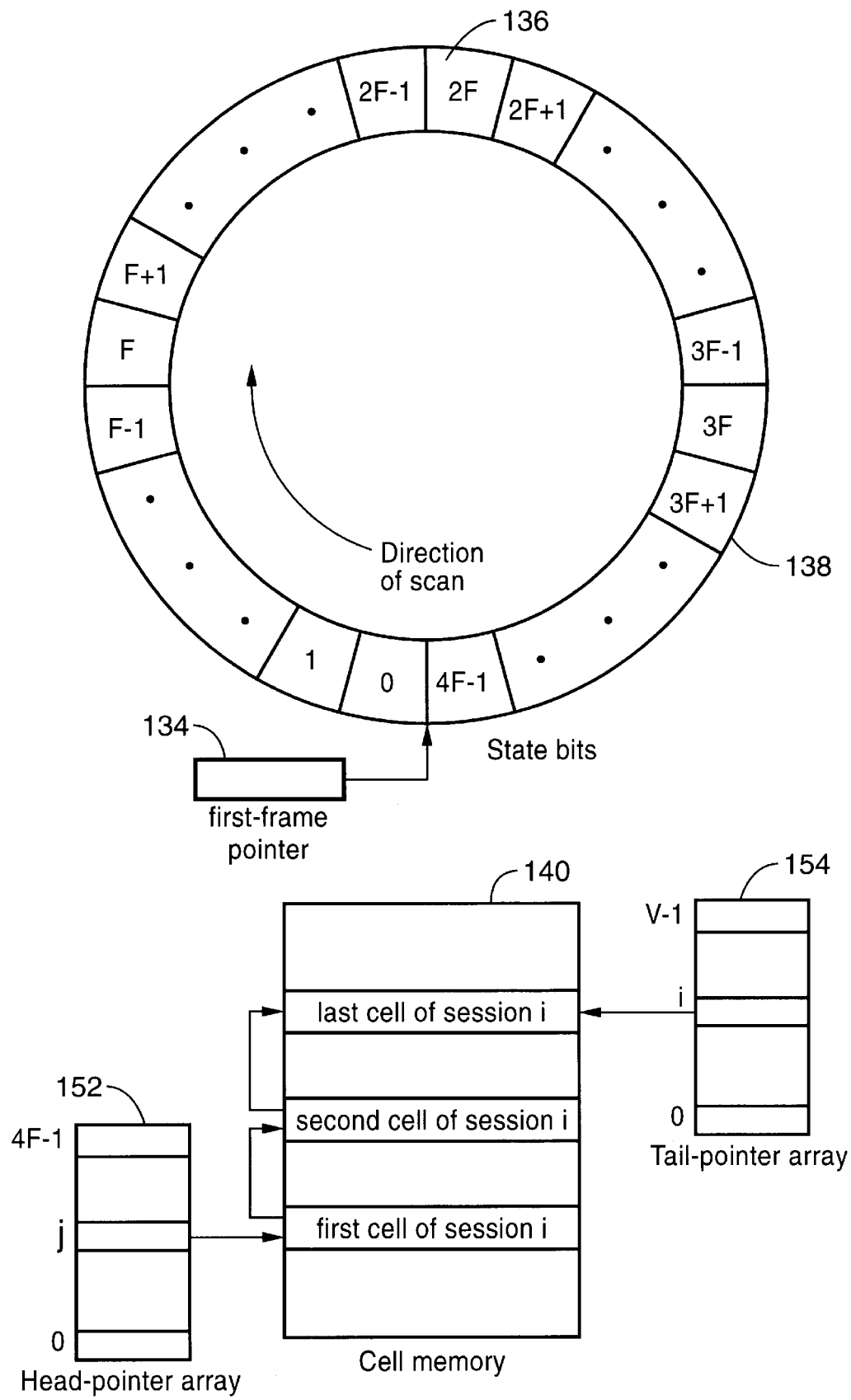
FIG. 22 is a functional block diagram of hardware elements implementing the priority queue in an ATM switch in accordance with the present invention.

The basic system for implementing the priority queue is shown in FIG. 22. The system maintains the state of slots in four frames (the current frame in progress and three following ones) in a set of 4F flip-flops (or storage elements), organized in groups of F slots, thus representing four frames. A memory-element or flip-flop is associated with each slot. We will call the memory element as the state of the corresponding slot. The flip-flops are shown around a circle in the figure, as they are conceptually organized as a circular queue and scanned in the clockwise direction. A pointer 134, referred to as first-frame, points to the beginning of the current frame in progress in the scheduling system, and therefore provides the starting point for scanning the state bits 136 in a circular array of flip-flops 138. The state bits are labeled as 0 through (4F−1) in the figure. The first-frame pointer 134 is initially set to point to bit 0. During a frame update operation when the frame is updated (i.e. FIG. 19A and FIG. 19B), the first-frame pointer 134 is moved cyclically to the beginning of the next frame by adding F to it, modulo 4F.

Figure 23:
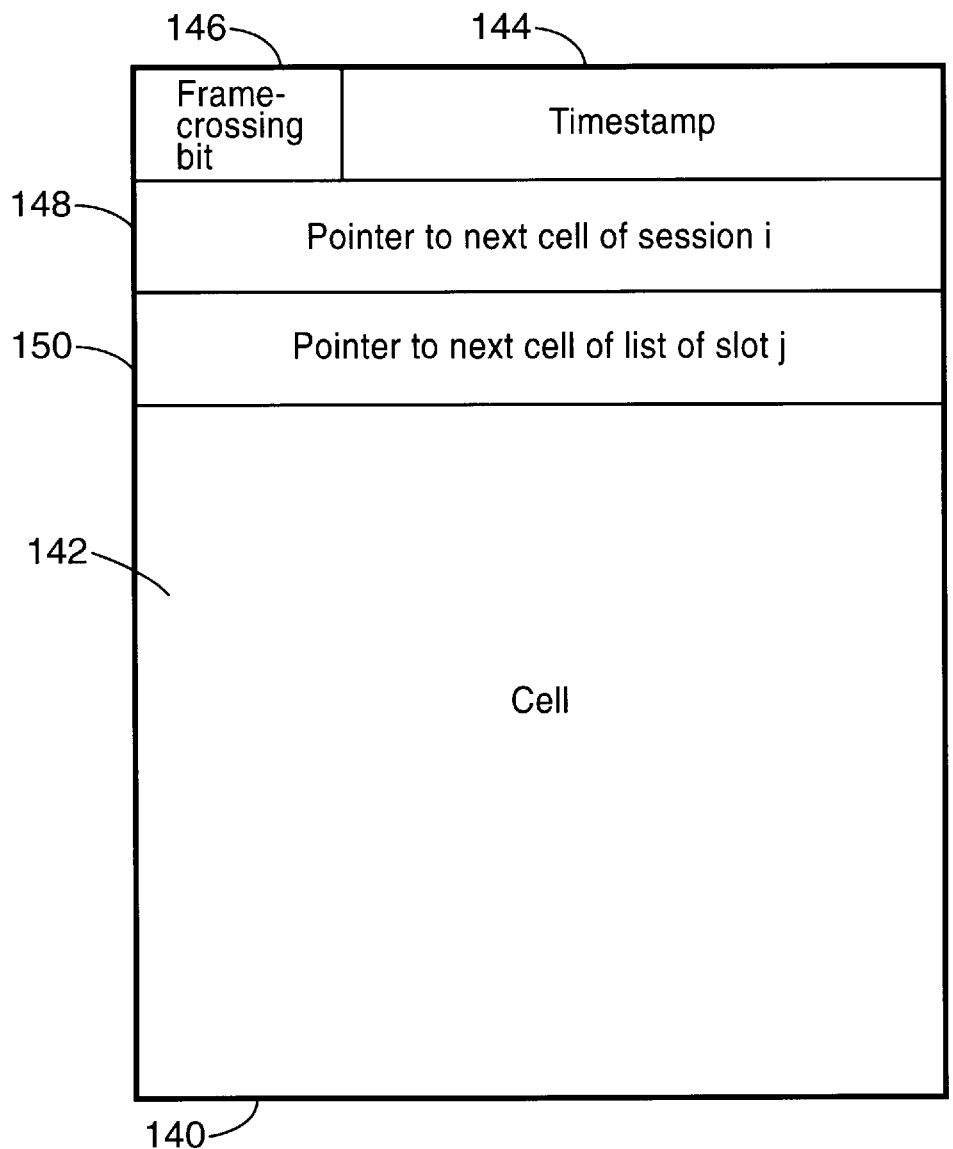
FIG. 23 illustrates the structure of data fields stored in the cell memory shown in FIG. 22.

The ATM cells buffered in the system reside in the cell memory 140 shown. A number of fields are stored alongside each cell 142 to facilitate the scheduling operations. Fields essential to this method of implementation of the priority queue are shown in FIG. 23. The fields and their associated functions are explained below:

1. The time-stamp field 144 stores the time-stamp of the cell computed as per the flowchart of FIG. 16.
2. The frame crossing bit 146 that is set to mark a cell crossing a frame boundary as mentioned in Step 108 (FIG. 17).
3. A pointer 148 to the cell-memory location where the next cell of the same session is queued. This pointer enables a linked-list to be maintained, consisting of all the cells of a given session, in the order in which they arrived.
4. A second pointer 150 to the cell-memory location where a cell with the same value of the time-stamp (modulo 4F) is stored. This pointer enables all the cells with the same value of time-stamp (modulo 4F) to be linked together.

It should be noted that, instead of storing the above fields alongside the cell in cell-memory, they could also be stored in a separate control memory as a separate data structure and linked to the cell in cell-memory. This particular method of storage has the advantage that cell data can be accessed in parallel with the information contained in the above fields.

Each of the state bits in the circular array can be in one of two states: empty or full. If the state of a slot is empty, there are no cells queued with a time-stamp value corresponding to that slot. If the state is full, however, there is at least one cell with a time-stamp value corresponding to the slot. Since there may be more than one such cell in the system with a time-stamp value corresponding to the slot, a list of such cells needs to be maintained. This is accomplished with an array of pointers, designated as head-pointer array 152. This array consists of a total of 4F pointers, and each has a one-to-one correspondence with one of the state bits. The pointer at location j of the array points to a location in cell memory where a cell with time-stamp value j (modulo 4F) is stored (if there are no cells in the system with this time-stamp value, a NULL pointer is stored). Thus, when the state of a particular slot j is determined to be full, the corresponding pointer from the head-pointer array provides access to the list of cells with time-stamp j (modulo 4F). As explained earlier, this list may be maintained in any order, such a first-in-first-out, or last-in-first-out.

The array of pointers labeled as tail-pointer array 154 is used to identify the locations of the last cell received from each session. Thus, if there is a total of V sessions sharing the outgoing link, there are V pointers stored in this array. The pointer at location i of the array points to the location in cell memory where the last cell received from session i is stored. When a new cell is received, this pointer is used to add the new cell to the end of the list of cells maintained for the session to which the cell belongs.

Figure 24:
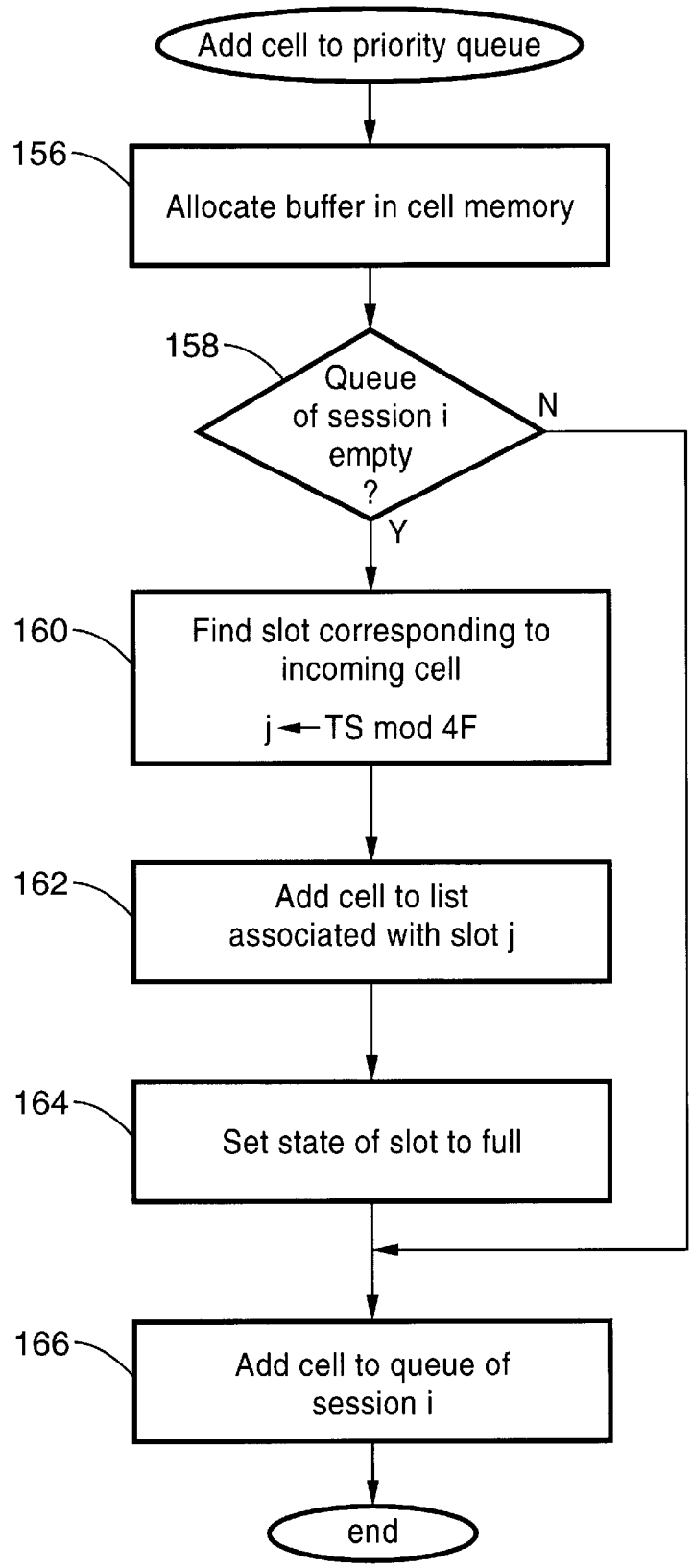
FIG. 24 is a flowchart showing processing steps for adding a cell to the priority queue shown in FIG. 22.

Having described the hardware elements in FIG. 22, we now proceed to describe the processing steps that are performed for adding a new cell to the priority queue, and for removing a cell from the head of the queue for transmission. These processing steps can be performed either by a processor executing software instructions or by the use of state machines. The processing steps that are performed while adding a new cell to the priority queue are shown in FIG. 24, and will be described next. It should be noted that these steps together form the processing Step 98 shown in FIG. 15.

Referring to FIG. 24, at Step 156 the first step in adding a new cell to the priority queue is to allocate a buffer in the cell memory. This can be achieved by maintaining a list of empty buffers in the cell memory, from which one is allocated to the newly-arrived cell. At Step 158, a test is then performed to determine if any cell from the same session is currently queued in the system. Assuming that the new cell belongs to a session i, this test is easily performed by examination of the i-th element of the tail-pointer array, which points to the last cell of session i. If this element is found to be NULL, the new cell is determined to be the only cell from session i currently in the system.

If one or more previous cells from session i are queued in the system, the only processing step needed is to add the new cell to the queue of session i. This is accomplished by storing the new cell in its allocated location in cell memory and updating pointer values. The pointer update operations consist of first setting the pointer field 148 of the last cell of session i currently stored in the system to point to the newly arrived cell, and then updating the i-th element of the tail-pointer array to point to the new cell. These operations are embodied in Step 166.

If no previous cells from session i are currently queued in the system, the additional processing steps of Steps 160 through 164 must be performed. These steps are required to ensure that the first cell in each session's queue is included in one of the lists attached to the 4F slots, so that it is a candidate for selection of the cell with the smallest time-stamp value. The newly arrived cell is added to the list of cells with the same time-stamp value (modulo 4F) as follows: First, at Step 160 the slot number corresponding to the time-stamp value of the new cell is found in the variable j by performing a modulo-4F operation. Since F is a power of 2, that is $F=2^b$, this operation is equivalent to using the least significant (b+2) bits from the time-stamp as the slot number. At Step 162, the new cell is then added to the list of cells currently maintained for that slot. For illustration, let j be the value embodied in the least significant (b+2) bits of the time-stamp of a newly arrived cell. The cell is then added to the list associated with slot j at its head. This can be achieved in a constant number of processing steps by setting the j-th element of the head-pointer array to point to the location of the new cell in cell memory, and the pointer 150 (FIG. 23) associated with the new cell to the previous value of the head-pointer j. This adds the new cell the head of the list associated with slot j. Alternately, the new cell can be added to the tail of the list if a separate array of pointers is maintained, each pointer j pointing to the last cell in the list of cells associated with slot j. It should be noted that this choice has no effect on the delay guarantees provided by the scheduling method.

At Step 164, the final step sets the state bit for slot i to the full state, indicating that one or more cells are queued with a time-stamp value corresponding to that slot number.

Figure 25:
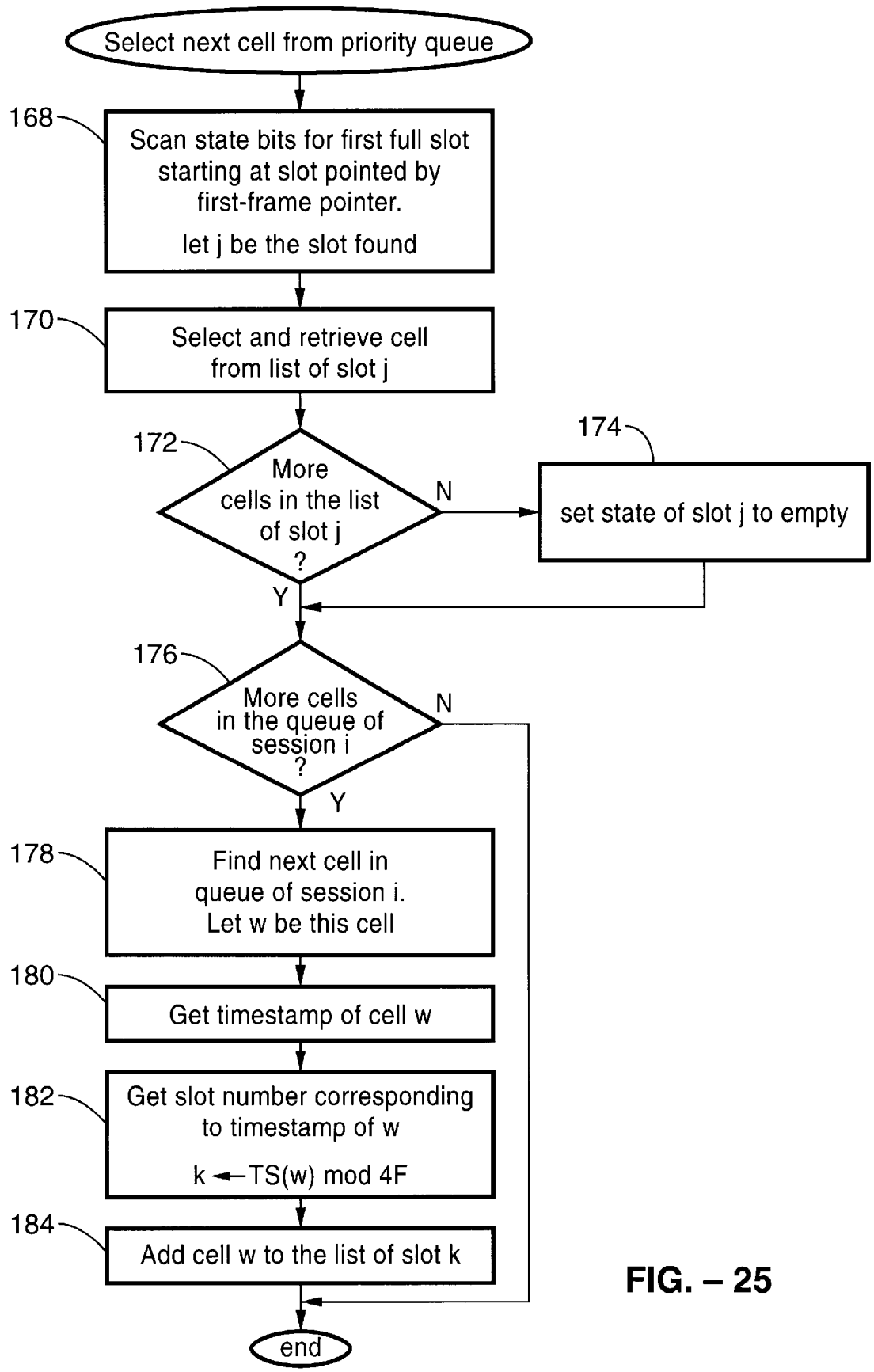
FIG. 25 is a flowchart showing processing steps for selecting and transmitting a cell from the priority queue shown in FIG. 22.

The second operation that needs to be supported by the priority queue is the selection of the cell with lowest time-stamp value, as stated in Step 116 of the flowchart of FIG. 18. FIG. 25 shows the processing steps performed for selection of the cell with the smallest time-stamp value for transmission and updating the state of the queue after removing the selected cell from the system. The selection process is performed by scanning the state bits, starting from the slot pointed by the first-frame pointer and proceeding cyclically through the array of state bits at Step 168. The first slot found in full state corresponds to the minimum time-stamp value currently in the system, and is selected at Step 170. It can be shown that, starting from the slot pointed by the start-frame pointer, a full slot can be found by scanning the state of at most 2F slots, unless the system is empty. This is because, from the definition of the scheduling method, the time-stamps of cells that are eligible for transmission must belong to either the current frame in progress or the next.

Assume, for illustration, that the first slot found to be full is j. The next cell is selected for transmission from the list of cells associated with slot j. This can be accomplished by choosing the cell pointed by the j-th element of the head-pointer array, removing the cell from the cell memory, and updating the j-th element of the head-pointer to the next cell in the list. This next cell is obtained from the pointer field 150 of FIG. 23 of the selected cell. It should be noted that, instead of the cell pointed by the j-th element of the head-pointer array, any cell that is part of the list starting at this cell may be selected for transmission, since all such cells have the same time-stamp value.

After removing the selected cell, Steps 172 through 184 update the state of the system. First, Steps 172 and 174 are used to set the state of slot j to empty if the selected cell was the only one in the list corresponding to slot j (that is, no other cells are queued in the system with the same time-stamp value).

It was mentioned earlier that the cell at the head of the queue of each session must be maintained as part of the list of cells associated with one of the 4F slots, so that it would be considered as a candidate during the selection process.

Therefore, when the cell at the head of the queue of a session is removed for transmission, the next cell in its queue (if any), must be added to one of the lists associated with the slots. This is the objective of Steps 176 through 184. Assume, for illustration, that the cell currently selected belongs to a session i. While removing the currently selected cell from cell memory, its pointer field 148 (FIG. 23) is used to determine the location in cell memory of the next queued cell of session i. If this pointer is NULL, no further action is required. Otherwise, the time-stamp of this cell now appearing at the head of the queue is read and the corresponding slot number is determined by performing a modulo-4F operation. Let k be the slot number so obtained. The cell is then added to the list associated with the slot k in the same manner as explained in Step 162 of the flowchart in FIG. 24.

An additional step when the embodiment of FIG. 22 is used to implement the priority queue, is to update the first-frame pointer when a frame-update operation is performed. Referring to the flowchart of FIG. 19A and FIG. 19B, where the frame update operation was described, an update of the first-frame pointer must be performed as part of Step 128. This update operations moves the pointer cyclically by F slots, thus pointing to the next frame. The modulo addition is easily implemented by limiting carry propagation to the least significant ($\log_2 F+2$) bits of the pointer.

Figure 26:
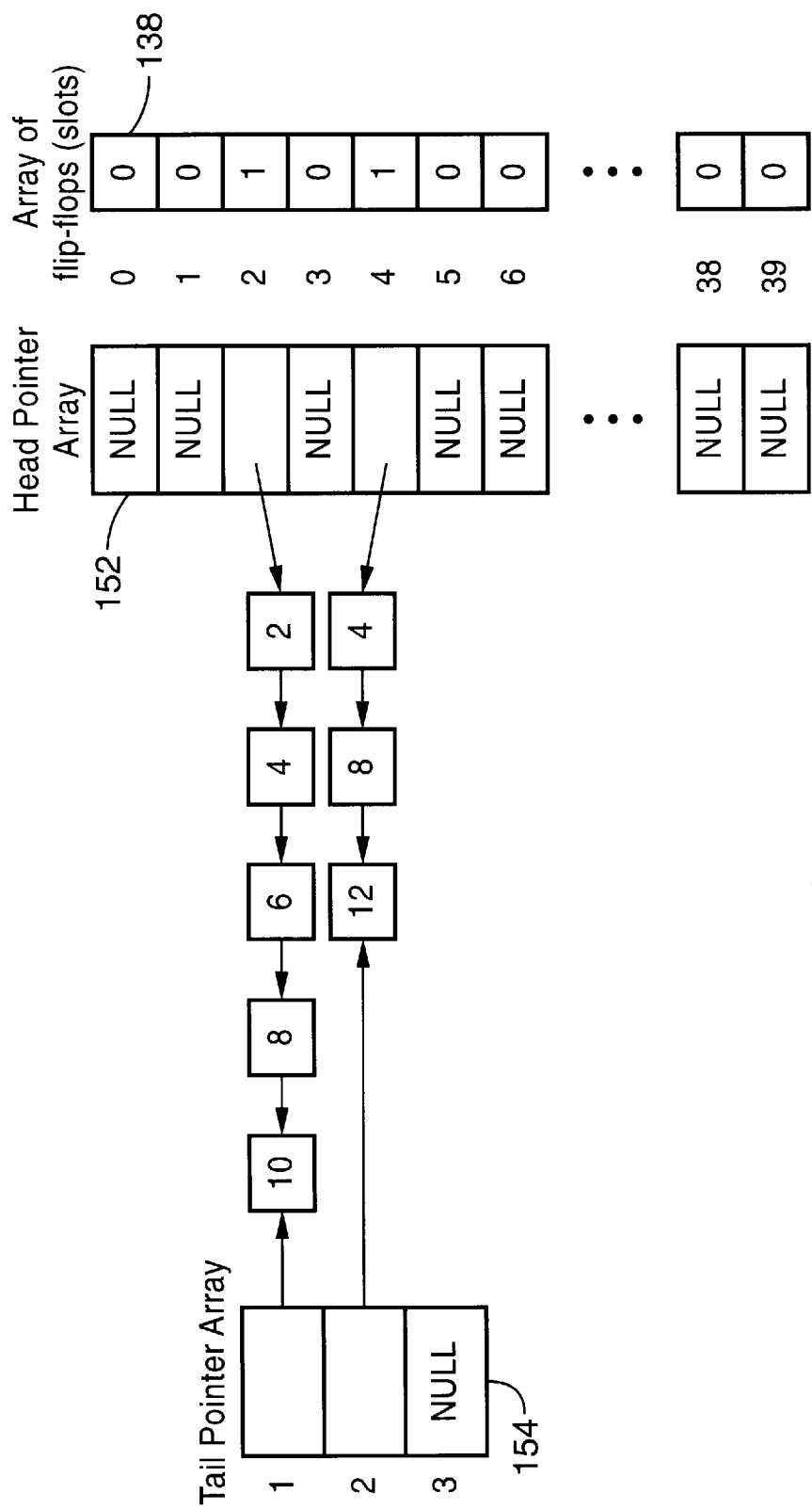
FIG. 26 illustrates an example operation of a hardware implementation of the priority queue shown in FIG. 22 at time t=0.

The operations involved in this priority queue implementation, described in the flowcharts of FIG. 24 and FIG. 25, are now illustrated with an example. Referring to FIG. 26, we show the state of an example system at time t=0. We assume that the frame size is set to F=10. Thus, as was described earlier, the head-pointer array must have at least 4×F=40 elements. There are three connections sharing the same outgoing link, whose bandwidth capacity is 1 unit. Connection 1 has reserved 50% of the bandwidth of the outgoing link, whereas Connections 2 and 3 have each reserved 25% of the bandwidth. The tail-pointer array 154 has one pointer associated with each connection. We assume that the system was idle before time 0. At time t=0, five packets arrive in the queue of Connection 1 and three packets arrive in the queue of Connection 2, as shown in FIG. 26. The queue of Connection 3 remains empty. Assume that each of the arrive packets is of length 1 unit.

In FIG. 26, the tail-pointer corresponding to Connection 1 is pointing to the last packet that arrived from that connection. The same holds true for the tail-point associated with Connection 2. Notice, however, that the tail-pointer associated with Connection 3 is NULL. The first packet in the queue of Connection 1 has a time-stamp of 2. Therefore element number 2 of the head-pointer array is pointing to that packet. Similarly, element number 4 of the head-pointer array is pointing to the first packet of Connection 2. The states of the array of flip-flops 138 (conceptually thought of as slots) are also shown in FIG. 26. Only the flip-flops in positions 2 and 4 are set to 1 (i.e. full), whereas all other flip-flops are set to 0 (i.e. empty).

Figure 27:
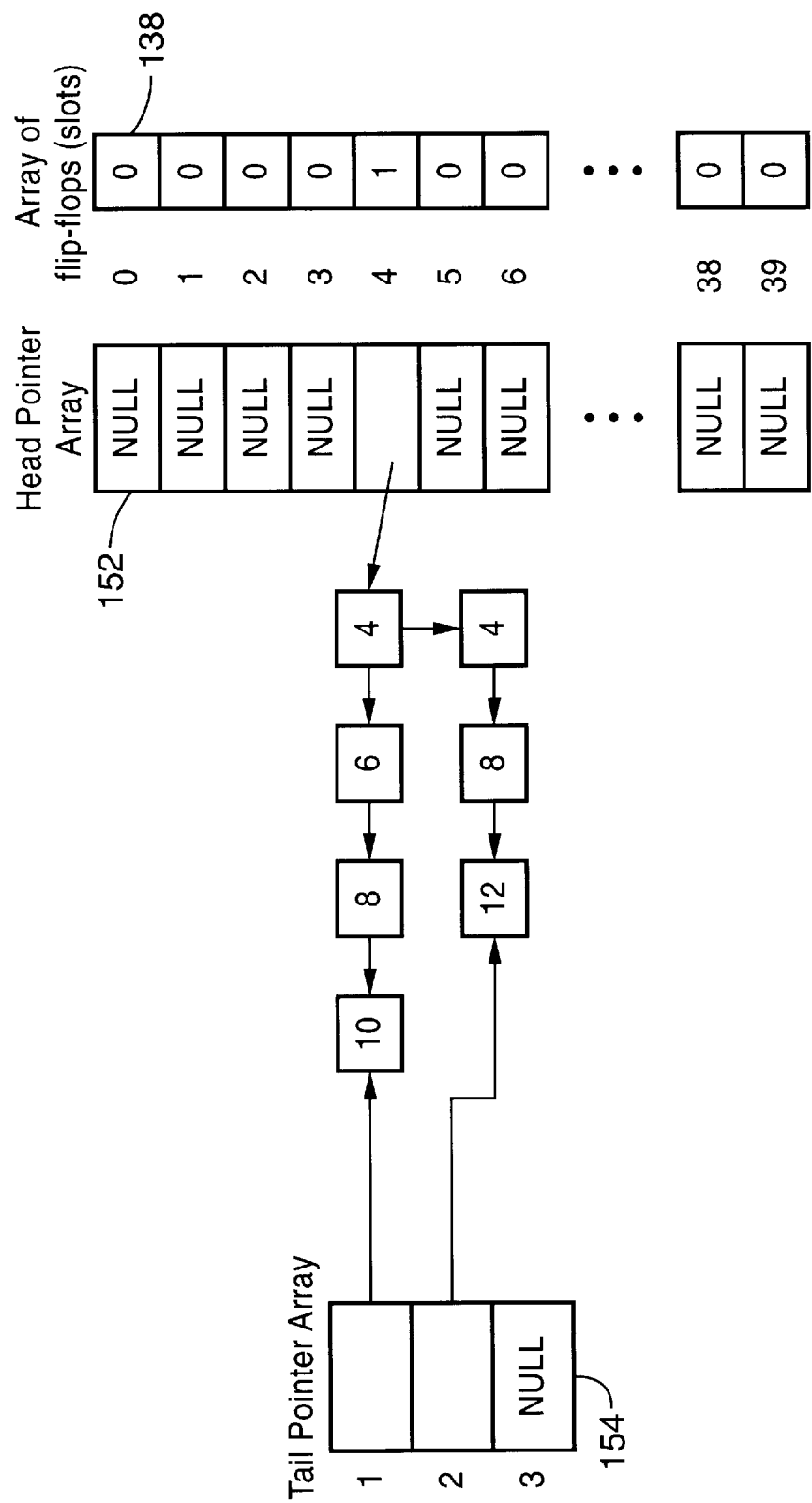
FIG. 27 illustrates an example operation of a hardware implementation of the priority queue shown in FIG. 22 at time t=1.
Figure 28:
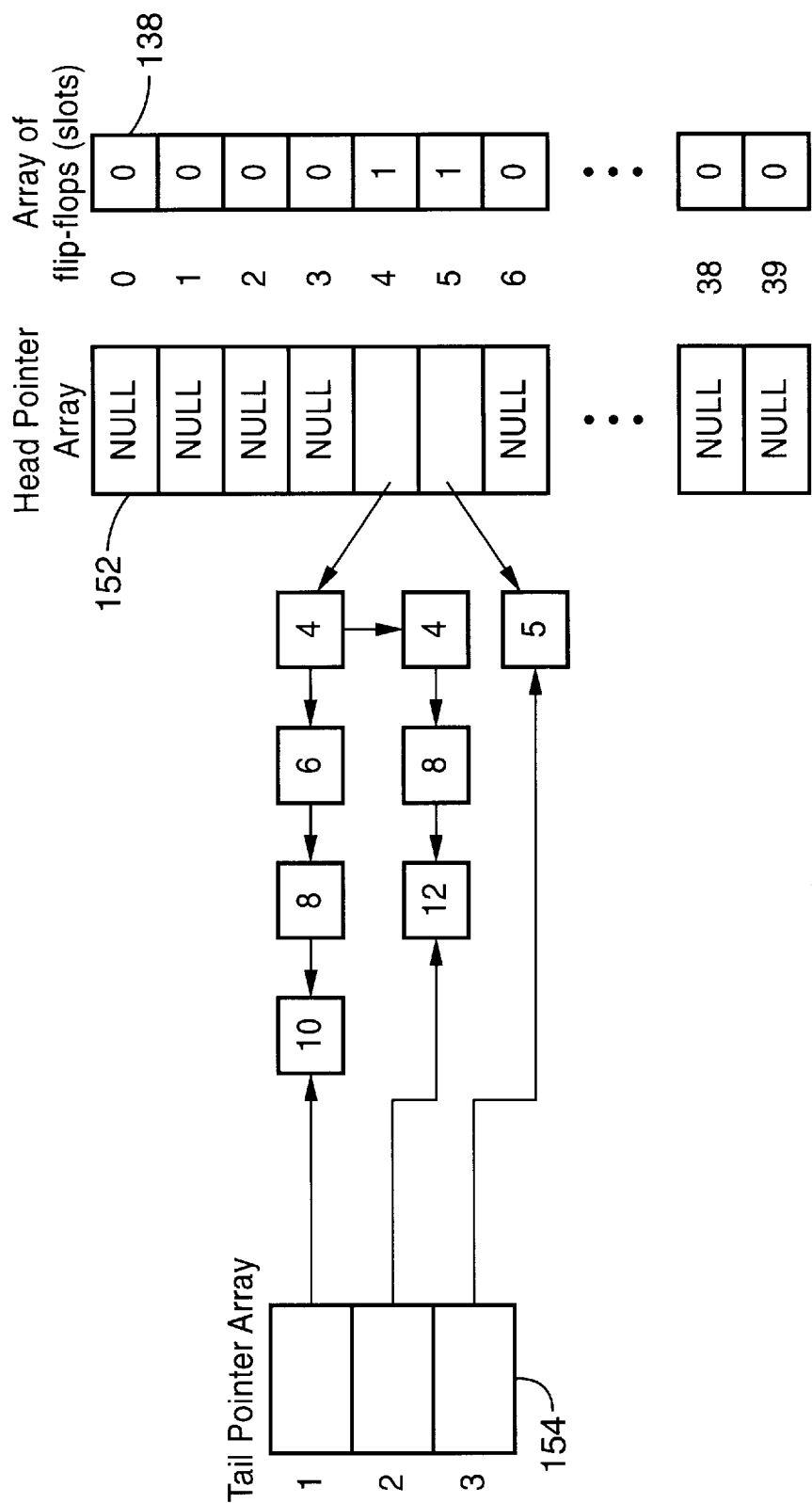
FIG. 28 illustrates an example operation of a hardware implementation of the priority queue shown in FIG. 22 after the arrival of a packet from Connection 3.

At time t=1, the packet with the minimum time-stamp will finish transmission. FIG. 27 shows the state of the system after the first packet is transmitted. The packet that was just transmitted is the first packet of Connection 1, and had a time-stamp of 2. Since there is no other packet with a time-stamp equal to 2, the corresponding head-pointer now becomes NULL and the corresponding flip-flop is set to 0 (i.e. empty). The next packet in the queue of Connection 1 now moves to the head of its queue. This next packet has a time-stamp of 4 and therefore must be added to the corresponding queue associated with the pointer at the 4th position in the head-pointer array. This can be done in constant time by making the pointer number 4 in the head-pointer array to point to that packet and creating another pointer from that packet to the packet that was previously pointed to by the pointer number 4. The resulting structure is shown in FIG. 27. Let us now assume that a packet from Connection 3 arrives at this time, that is, at time t=1. Recall that only one packet has been transmitted from the time that the system became busy. The current value of the system potential is thus equal to 1. Therefore, the packet that arrived in the queue of Connection 3 will be assigned a time-stamp equal to 1+(1/0.25)=5. Since the new packet is both the first and the last packet from Connection 3, the tail-pointer associated with Connection 3 must be made to point to this packet. In addition, the head-pointer array that corresponds to a time-stamp of 5 must point to this packet as well. The configuration of the system after the addition of the packet is presented in FIG. 28.

A basic operation required in the above embodiment of the priority queue is the selection of the first slot in the full state. A serial scan operation for this would require 2F steps in the worst case. We now describe a simple hardware circuit that allows a more time-efficient hardware implementation of the priority queue. We will refer to the module that selects the first full slot as the selector module.

Figure 29A:
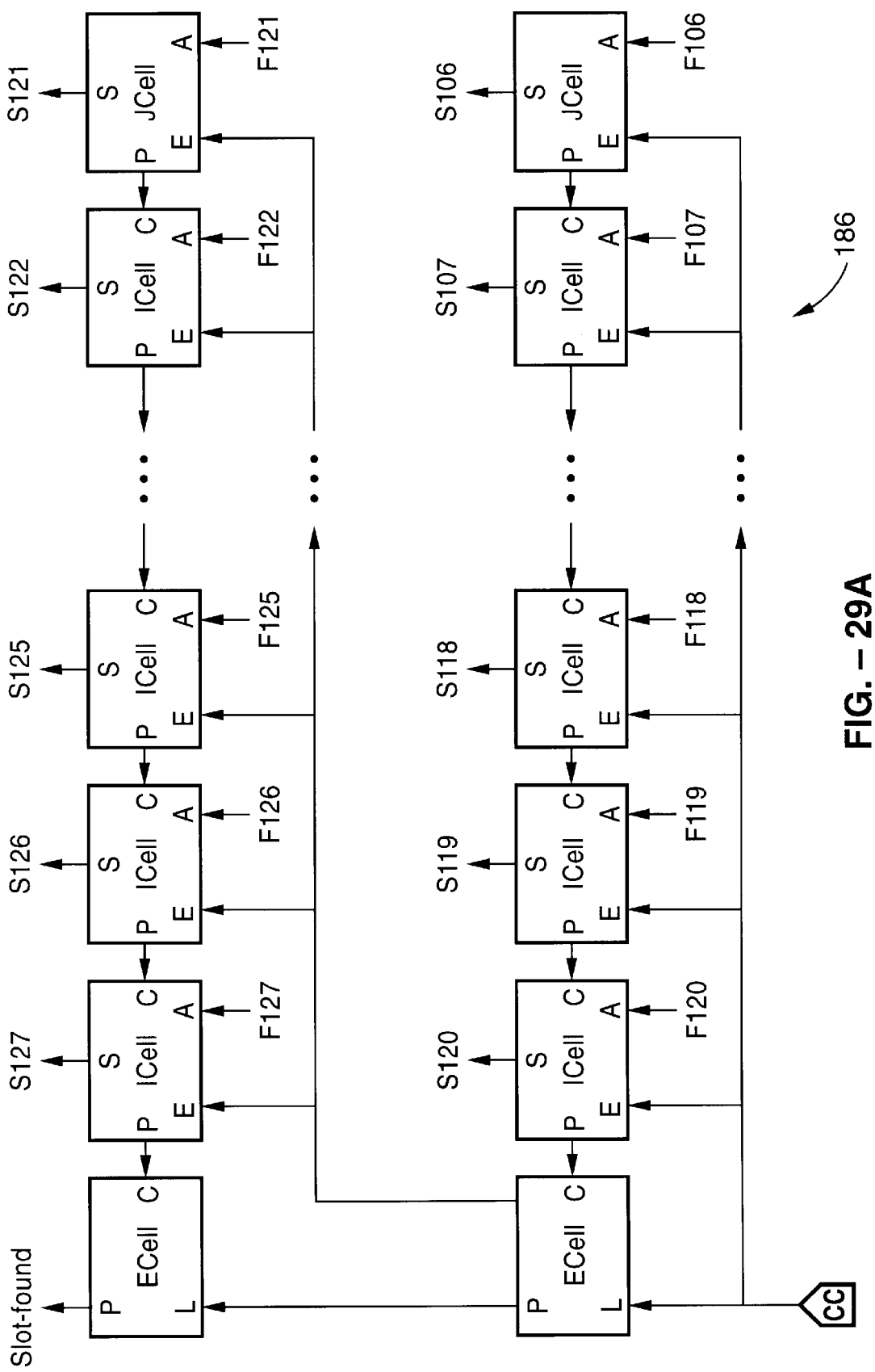
FIG. 29A and FIG. 29B is a functional block diagram of a selector module for an ATM switch in accordance with the present invention.
Figure 29B:
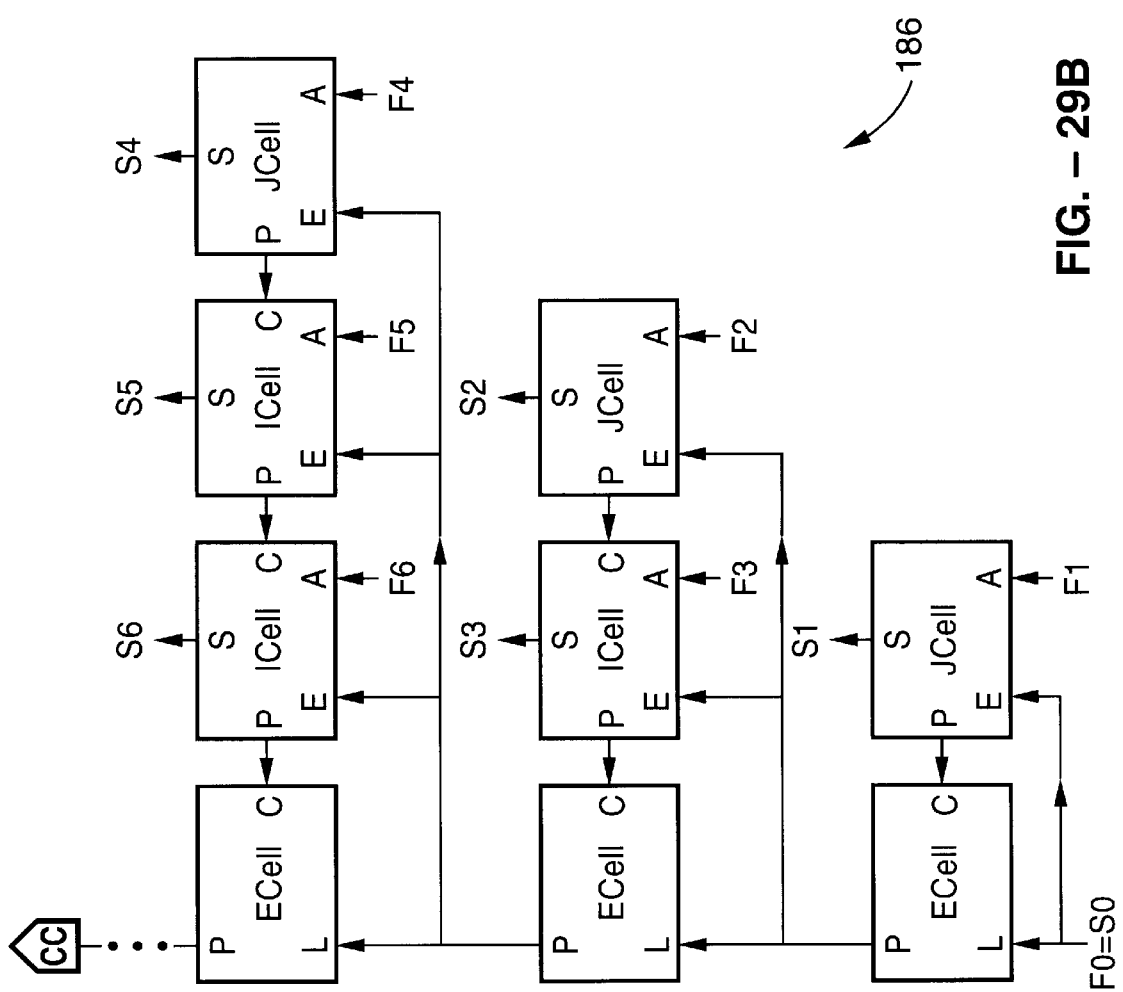

A block diagram of the selector module 186 is shown in FIG. 29A and FIG. 29B. Given the state of F consecutive slots in a frame, selector module 186 identifies the first full slot in the array. If no full slot is found, the next F consecutive slots can be tested using the same module. The selector module is constructed from a triangular array of logic elements, an illustrative example of which is shown in FIG. 29A and FIG. 29B, for F=128. The signals F0 through 127 correspond to the states of the 128 slots, with "0" representing the empty state and "1" the full state. The module generates output signals S0 through S127 such that the following conditions are satisfied:

1. If all the input signals F0 through F127 are zero, all the output signals S0 through S127 are also zero.
2. If one or more of the input signals F0 through F127 are "1", exactly one of the output signals, say $S_i$, is a "1" and the rest of the output signals are zero. The "1"-output appears at the position corresponding to the first input signal that is a "1".

Thus, the output signals S0 through S127 can be decoded using a simple binary encoder to obtain the binary representation for the slot number selected.

Three distinct types of cells are used in the implementation of selector module 186, depending on their location. These cells propagate logic signals through the array from right to left and bottom to top. The three distinct types of cells are characterized by their distinct cascading signals and the logic functions performed. The logic operations performed by each of these cells is as per the following equations, where the operator "+" denotes a logical OR operation, symbol "·" represents a logical AND, and the notation $\bar{x}$ represents the logical NOT operation.

$$J\text{-CELL}: P=E+A; S=A\cdot\bar{E}$$

$$I\text{-CELL}: P=E+A+C; S=A\cdot\overline{(C+E)}$$

$$E\text{-CELL}: P=C+L$$

The longest-delay path in this selector module passes through 17 logic cells. For the general case, it can be shown that the longest delay is of the order of the square root of F.

Selector module 186 can be used in conjunction with additional logic to implement still larger selector modules by organizing the state bits into groups. For example, if the frame consists of 1024 slots, the 1024 slots can be organized as 128 groups, each consisting of 8 state bits. The selector module configuration shown in FIG. 29A and FIG. 29B can then be used to determine the first group with a full slot among the 128 groups. The first full slot within the selected group can then be found in a second step using additional logic.

It should be noted here that a number of other hardware approaches may be used to implement this selection process. For example, a tree structure of selectors could be used. A serial architecture may be used as well.

A drawback with the above embodiment of the priority queue is the number of required memory elements, which is 4 times the number of slots per frame, that is 4×F. In addition, the head-pointer array must also be provided with the capacity to store 4×F pointers. It should be noted that the number of slots F in the frame depends on the capacity of the outgoing link and the granularity at which sessions are allowed to reserve bandwidth. As an illustrative example, if the link capacity is 300,000 cells/second and the allocation granularity is 150 cells/second, the number of slots needed is 2,000. Consequently, the number of flip-flops needed would be 2,000×4=8,000. In the following paragraphs, we describe an alternate embodiment of the priority queue that is more efficient in terms of the amount of state storage needed. This alternate embodiment requires only 2×F flip-flops and memory space for storing 3F head pointers.

Figure 30:
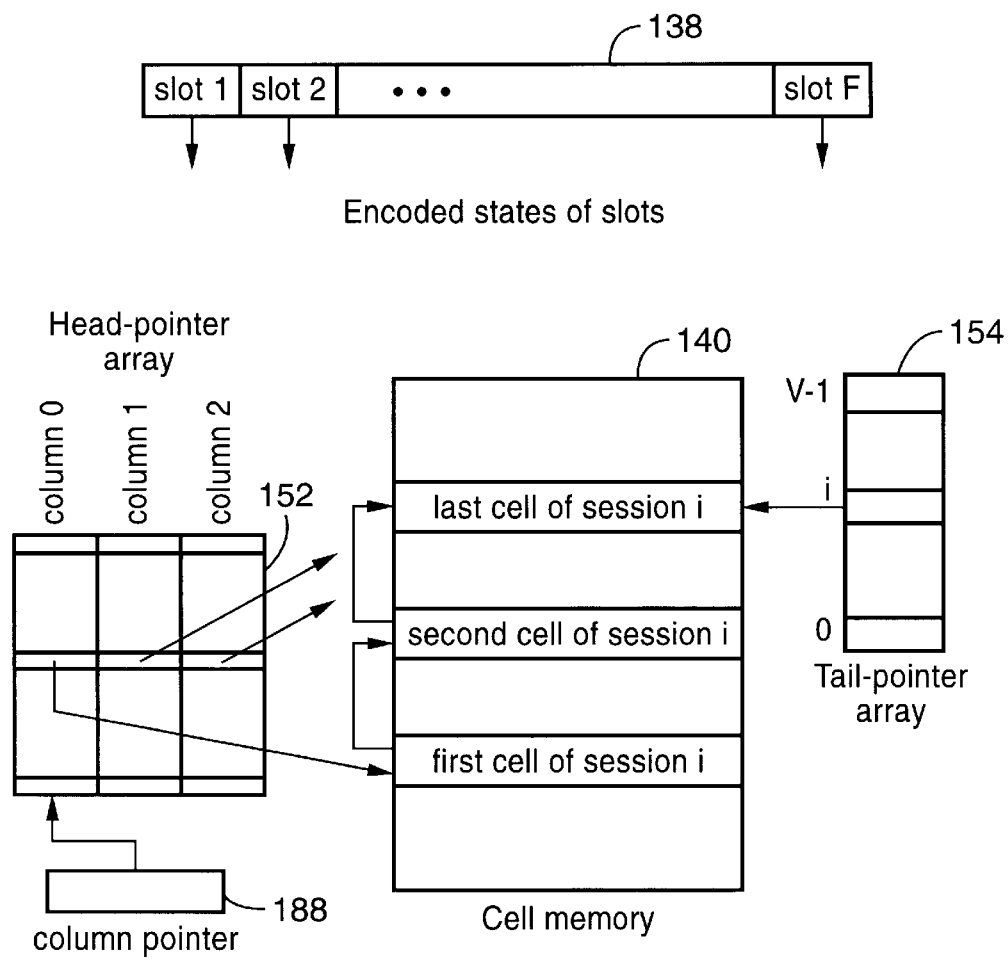
FIG. 30 is a functional block diagram of an alternate embodiment of the priority queue shown in FIG. 22 with reduced state-storage requirements.

The basic idea is to encode the information maintained in the previous implementation in a more compact form, thus resulting in a reduction in storage. The hardware elements required in this modified implementation of the priority queue are shown in FIG. 30. As in the embodiment of FIG. 22, an array 138 of memory elements 140 is used to maintain the state of each slot in the frame. In contrast to the 4F state bits in FIG. 22, however, only F memory elements are used in this embodiment. However, the memory elements used are not single flip-flops with two states, but have four valid states. Therefore, each such element can be constructed from two flip-flops by encoding the states, resulting in a total of 2F flip-flops for storing the states.

The four valid states of each of the F memory elements are as follows:

Empty: There are no cells eligible for transmission with their time-stamp value corresponding to the particular slot.

First: There is at least one queued cell with a time-stamp value corresponding to the particular slot, and it belongs to the current frame.

Second: There are one or more queued cells with a time-stamp value corresponding to the particular slot, none of them belongs to the current frame, and at least one of them belongs to the next frame.

Third: There are one or more queued cells with a time-stamp value corresponding to the particular slot, and the time-stamps of all such cells fall neither in the current frame or in the next frame.

Accordingly, three separate queues are associated with each slot, instead of the single queue of the previous embodiment. The head pointers for these queues are stored in the three separate columns of the Head-Pointer Array 152, designated as 0, 1, and 2. The pointers in a given column of the array all point to queues of cells whose time-stamps belong to the same frame. When taken row-wise, the pointers in a given row of the arrays, say row j, provide access to the three queues corresponding to slot j.

The three separate queues corresponding to a given slot maintain cells whose time-stamps fall in the current frame and the two subsequent frames, in respective order. However, the assignment of frames to the queues is not static, but is changed with every frame update. When a frame update operation occurs, the queue containing cells whose time-stamps fall in the next frame now becomes the queue of cells in the current frame; similarly, the next queue containing cells in the third frame now becomes the queue for the second frame. This update is easily achieved by providing a modulo-3 counter, designated as column pointer 188 in FIG. 30, that points to the column of pointers in the head-pointer array corresponding to the current frame in progress. When a frame update occurs, this counter is simply incremented modulo 3 which results in the pointers next column to be selected as the head pointers for queues belonging to the current frame. Incrementing the pointer modulo 3 causes the column selection to wrap around in a circular fashion. The column pointer is initialized to zero when the system is idle, so that column 0 of the head-pointer will be used initially for the first frame.

Figure 31:
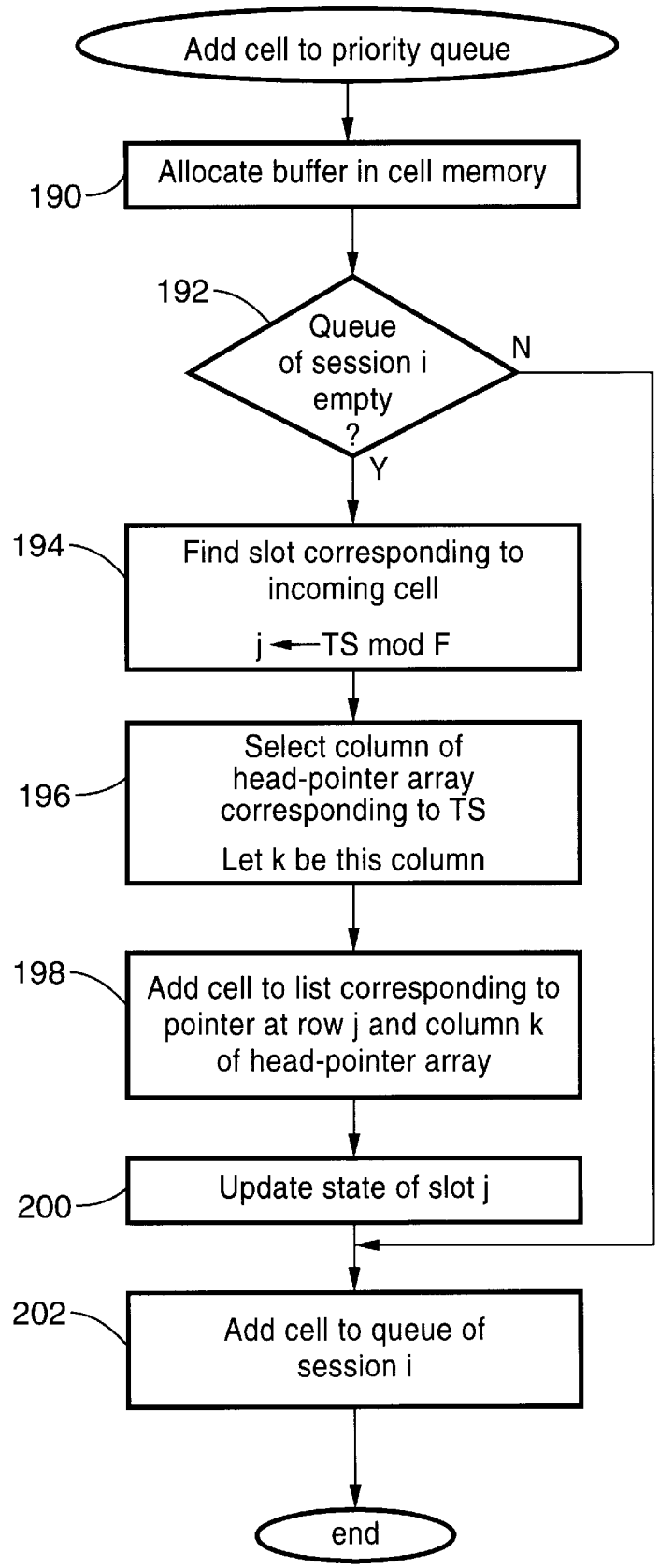
FIG. 31 is a flowchart showing steps for adding a cell to the priority queue shown in FIG. 30.

The flowchart in FIG. 31 illustrates the processing steps performed when a new cell is added to the priority queue. Since the steps are similar to those in the flowchart of FIG. 24, only the differences will be explained here. The important differences appear in Steps 194 through 200. These steps are executed when the previous cell transmitted by the same session has departed the system before the arrival of the new cell. Let TS be the computed time-stamp of the new cell. Since this is the first cell of its session present in the system, it must be added to one of the queues associated with the slots. To identify the queue in which the cell is to be added, first the slot number corresponding to the time-stamp TS is found by a modulo-F operation at Step 194. Note that, since F is a power of 2, this amounts to using the least significant $\log_2 F$ bits of the time-stamp. Let j be the slot number thus computed. This identifies row j of the head-pointer array. However, one of the three columns in row j needs to be identified before the proper list can be accessed.

To identify the column in the head-pointer array corresponding to the time-stamp TS of the incoming cell, first the frame number corresponding to TS is extracted. This is achieved simply by shifting the value of TS to the right by $\log_2 F$ bits. The frame number so obtained is compared with the current frame number in progress. If they are identical, the time-stamp falls in the current frame, and the column chosen is the one pointed by column-pointer. If the frame number corresponding to TS exceeds the current frame number by one, then the next column cyclically to the right is chosen. Finally, if the frame numbers differ by more than 1, the third column relative to the value of the column-pointer is chosen. These calculations are embodied in Step 196.

Once the row and column in the pointer array have been identified, the pointer value at this location can be used to add the incoming cell to the list associated with slot j, as described in the previous embodiment of the priority queue. This is performed in Step 198. Finally, in Step 200, the state of the slot j must be updated, taking into account the arrival of the new cell. This update is performed as per the state transition diagram of FIG. 33, which will be described in detail later.

Figure 32A:
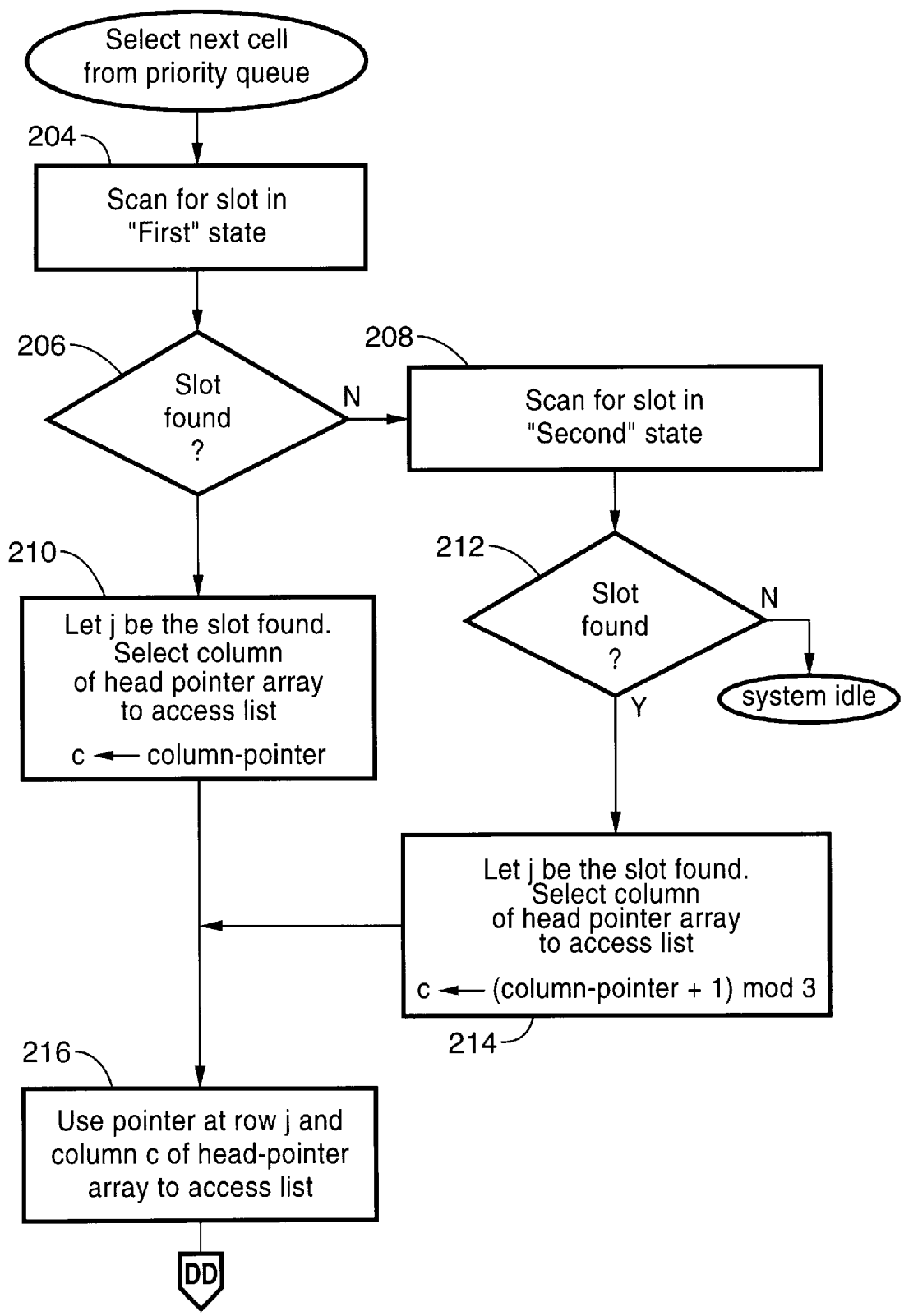
Figure 32B:
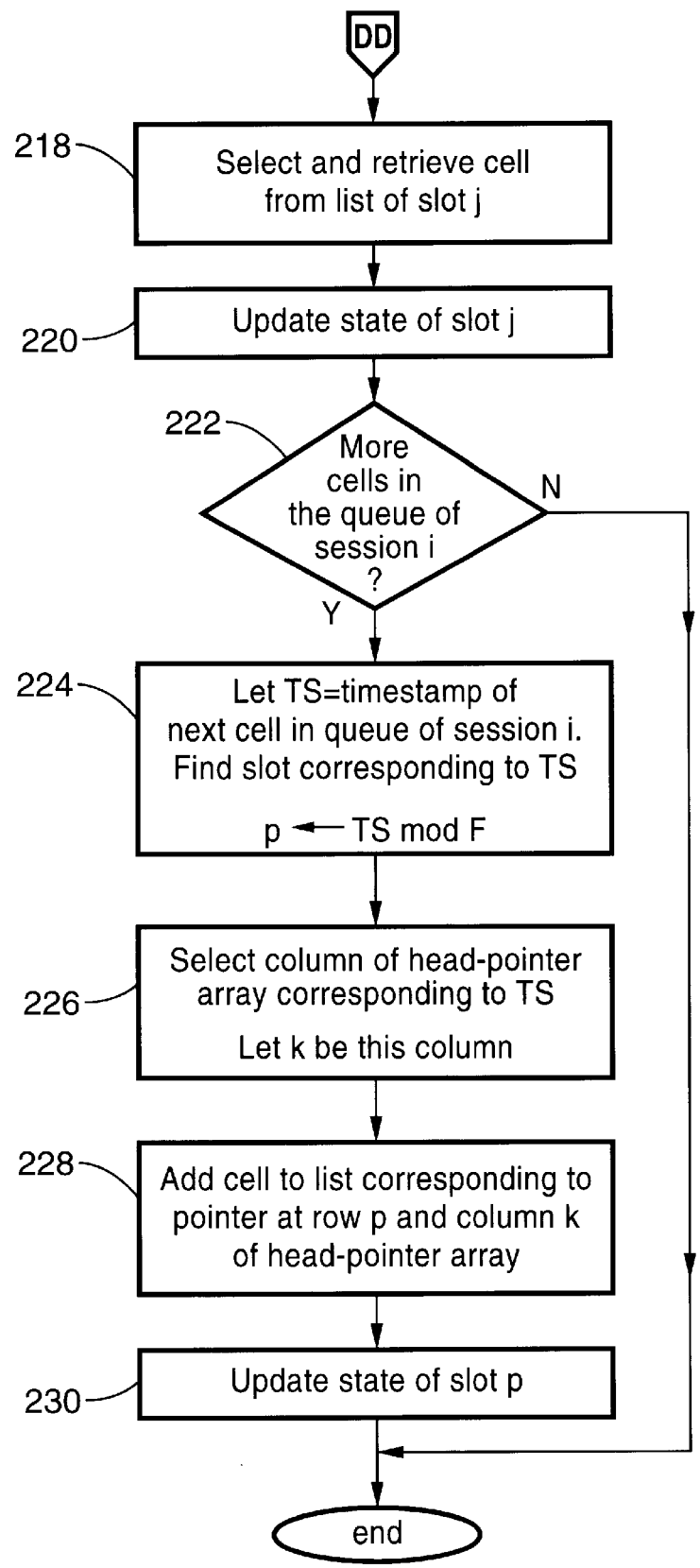

For selecting a cell from the priority queue for transmission, the steps presented in FIG. 32A and FIG. 32B are executed. These steps are similar to those in the flowchart of FIG. 25, and we discuss only the differences here. First, the states of the slots may need to be scanned twice while looking for the cell with the minimum time-stamp. In the first pass, at Step 204, all of the slots are scanned for the first slot that is in the state First. If a slot is found in that state, the queue corresponding to the first such slot, and associated with the current frame, is chosen for selection of the next cell at Steps 210 and 216, and the first cell from that queue is transmitted at Step 218.

If no slots in the state First are found, a second scan is performed, this time looking for slots in the state Second. If the system is not idle, a slot is always found in the second scan. The first such slot is identified. This slot number is then used as the row address to access the header-pointer array. The column address of the head-pointer array is now obtained by adding one, modulo 3, to the column-pointer value at Step 214. The queue pointed by the selected pointer in the head-pointer array is then used to obtain the cell for transmission at Step 216, which is then sent to the transmitter at Step 218.

After removing the cell from the selected queue, the state of the slot j corresponding to the cell must be updated. This is done as per the state transition diagram of FIG. 33, to be described later.

If the removal of the cell leaves behind no cells from its session, the processing is complete at this point. However, if another cell is queued from session i behind the cell just transmitted, this following cell, now appearing as the first cell of session i in the system, must be added to one of the queues associate with its time-stamp. This operation is performed by Steps 224 through 230. These steps are identical to Steps 194 through 200 in the flowchart of FIG. 31, performed while adding a newly arrived cell to the priority queue, and therefore do not need to be explained further.

Finally, some processing must be performed to update the state of the slots during a frame-update. This update is performed on each slot using the state transition diagram of FIG. 33. Note that the updates of all the slots can proceed in parallel as they are independent. In addition, the column-pointer is incremented, modulo 3, so that the next column in the head-pointer array will be used for the current frame.

FIG. 33 shows the state transitions that are performed on each of the memory elements corresponding to the slots. Only one instance of the state machine 232, corresponding to a particular slot, is shown. A separate but identical state machine is associated with each of the other slots. Transitions occur among the four states—Empty, First, Second, and Third—in response to events such as cell arrivals, departures and frame updates. It is straightforward to implement these state transitions by a state machine associated with memory elements. A separate instance of the state machine is provided for each slot, and are operated independently and in parallel.

(a) Transition from Empty State.

Initially the system is in the Empty state. If a cell arrives with a time-stamp value corresponding to the slot, a transition occurs out of the empty state. The new state reached depends on whether the time-stamp of the newly arrived cell falls in the current frame, the next frame, or the third frame. If the time-stamp falls in the current frame, the state machine transits to the First state. This means that there is at least one queued cell associated with the particular slot with a time-stamp value falling in the current frame. Thus, while scanning the states of the slots, the newly arrived cell would be found during the first scan. If the cell that arrived has a time-stamp falling within the next frame, then the state machine transits to the Second state. Such cells may be considered for transmission only if there are no cells waiting with a time-stamp value falling in the current frame (that is, no slots in the first state). Finally, if the cell that arrived has a state two frames ahead, the state machine transits to the Third state.

(b) Transition from First State.

If a slot is in the First state and a cell queued at that slot is removed for transmission, there are four possible cases to consider:

1. There is another cell queued at the same slot with its time-stamp value in the current frame. In this case, the state machine remains in the First state.
2. There are one or more cells queued at the same slot, none of their time-stamp values fall in the current frame, and at least one of the time-stamp values fall in the next frame. In this case, the state of the slot is set to Second.
3. There are no cells queued at that slot with time-stamps that fall in either the current or the next frame, but there is a queued cell with its time-stamp two frames ahead. The state of the slot is then set to Third.
4. There are no more cells queued at that slot. The state of the slot is set to Empty in this case.

(c) Transition from Second State.

If a slot is in the Second state and a cell arrives with its time-stamp value corresponding to the slot, there are two possible cases to consider:

1. If the time-stamp of the newly arrived cell belongs in the current frame, the state machine must then be placed in the First state.
2. If the time-stamp falls in the Second or subsequent frames, the state of the slot remains unchanged.

If a slot is in the Second state and a frame update operation takes place, the slot must transit to the First state.

If a slot is in the Second state and a cell is removed for transmission, there are three possible cases to consider:

1. If there is another cell queued at the same slot with its time-stamp value falling in the same frame as the transmitted cell, the state of the slot remains unchanged.
2. If there is one or more cells queued at the slot, with none of their time-stamp values falling in the same frame as that of the transmitted cell, the state of the slot is changed to Third.
3. If there are no more cells queued at that slot, the state of the slot is changed to Empty.

(d) Transition from Third State.

If a slot is in the Third state and a cell arrives, there are three possible cases to consider:

1. If the time-stamp of the newly arrived cell belongs in the current frame, the state of the slot is changed to First.
2. If the time-stamp of the newly arrived cell falls in the next frame, the state is changed to Second.
3. Otherwise the state of the slot remains unchanged.

If a slot is in the Third state and a cell queued at that slot is removed for transmission, there are two possible cases to consider:

1. If there is one or more cells still queued at the slot, the state remains unchanged.
2. If there are no more cells queued at that slot, the state of the slot is changed to Empty.

Finally, if a slot is in the Third state and a frame update operation takes place, the slot must transit to the Second state.

From the above, it is clear that the present invention provides for a method and apparatus that calculates and maintains a global parameter, the system potential, for keeping track of the progress of the system in a distinct and more accurate manner than the virtual time based methods described above. This system potential provides implementation complexity similar to that of Self-Clocked Fair Queueing, but still maintain the delay bounds of Weighted Fair Queueing. Furthermore, it provides for maximum fairness among all incoming connections to the system.

Those skilled in the art will appreciate that the functional blocks described herein, with the various implementations of the present invention provide examples, may represent a series of operations. The functions that these blocks represent may be implement through the use of shared or dedicated hardware, including, but not limited to, hardware capable of executing software. For example, the functions of the processors described herein may be provided by a single shared processor or single unit of hardware. Further, use of the term processor should not be construed to refer exclusively to hardware capable of executing software. Illustrative embodiments may comprise microprocessor and/or digital signal processor hardware, read-only memory (ROM) or random-access memory (RAM) for storing software performing the operations discussed below and storing the results. Very large scale integration (VLSI) hardware embodiments, as well as custom VLSI circuits may also be used to implement the functional blocks. Field-programmable gate arrays (FPGAs), or other programmable logic devices, possibly in combination with read-only memory or random-access memory, may also be provided. Software implementations are also considered to be within the scope of the present invention, and logic functions shown may be implemented using either hardware or software, or both.

Additionally, while the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. A scheduling method for receiving a plurality of data packets arriving at a network switch from a plurality of connections, each said connection having a service rate, and transmitting said data packets over a communications link, comprising the steps of:
   (a) receiving a plurality of data packets during a period of time, each said packet having a length;
   (b) calculating a system potential as each of said data packets arrives at a switch;
   (c) calculating a time-stamp for each of said data packets based on said system potential; and
   (d) storing said data packets in a priority queue and transmitting said data packets from said priority queue according to their time-stamps.

2. A method as recited in claim 1, wherein said system potential is zero when none of said data packets are being transmitted and wherein said system potential increases as said data packets are transmitted.

3. A method as recited in claim 2, wherein the time period during which said data packets are received is divided into frames of equal intervals, and wherein the step of calculating a system potential includes the steps of:
   (a) calculating the elapsed real-time since a current data packet being transmitted started transmitting, said elapsed real-time representing a time offset between the arrival time of said data packet at the switch and the time at which said data packet started transmitting;
   (b) dividing said elapsed real-time by the frame size to obtain a normalized elapsed-time; and
   (c) adding said normalized elapsed-time to the previous system potential in order to obtain a new system potential.

4. A method as recited in claim 1, wherein the step of calculating a time-stamp includes the steps of:
   (a) retrieving the prior time-stamp of a prior data packet that arrived from the same connection as an incoming data packet, said prior time-stamp being reset to zero when there are no data packets to transmit from any of the connections;
   (b) defining a starting potential for said incoming data packet as a maximum value of said prior time-stamp and said system potential; and
   (c) dividing the length of said incoming data packet by the service rate of the connection associated with said incoming data packet and adding the result of said division to said starting potential to in order to obtain said new time-stamp.

5. A method as recited in claim 4, wherein the time period during which said data packets are received is divided into frames of equal intervals, and further comprising the steps of:
   (e) marking each incoming data packet that has its starting potential and its time-stamp within different frames as an indication that said incoming data packet crosses a frame boundary; and
   (f) incrementing a counter maintained with each frame each time a packet is marked in order to maintain a record of the number of incoming data packets that cross a frame boundary.

6. A method as recited in claim 5, wherein said system potential has an integer part and a fractional part, and further comprising the steps of:
   (g) increasing said system potential by the transmission time of the most recently transmitted data packet;
   (h) obtaining a frame number corresponding to the time-stamp of the next data packet to be transmitted;
   (i) determining if said most recently transmitted data packet was marked;
   (j) if said most recently transmitted data packet was marked,
      i. decrementing the counter maintained with the current frame in progress, and
      ii. if said counter is zero, and the frame number of the next data packet to be transmitted is greater than the current frame number, performing a frame update, said frame update comprising the steps of:
         (a) incrementing said current frame number, and
         (b) if the integer part of said system potential is not equal to said current frame number, setting said integer part of said system potential to said current frame number and setting any fractional part of said system potential to zero; and
   (k) recording the current time for use in calculating the system potential.

7. A method as recited in claim 1, wherein said data packets comprise ATM cells and wherein said step of calculating a time-stamp comprises the steps of:
   (a) retrieving the prior time-stamp of a prior ATM cell that arrived from the same connection as an incoming ATM cell, said prior time-stamp being reset to zero when there are no ATM cells to transmit from any of the connections;

(b) defining a starting potential for said incoming ATM cell as a maximum value of said prior time-stamp and said system potential; and (c) adding said starting potential to the inverse of the service rate of the connection associated with said incoming ATM cell.

8. A method as recited in claim 7, wherein the time period during which said data packets are received is divided into frames of equal intervals, and further comprising the steps of:

(e) marking each incoming ATM cell that has its starting potential and its time-stamp within different frames as an indication that said incoming ATM cell crosses a frame boundary; and (f) incrementing a counter maintained with each frame each time an ATM cell is marked in order to maintain a record of the number of incoming ATM cells that cross a frame boundary.

9. A method as recited in claim 8, wherein said system potential has an integer value comprising a frame number field and an offset within the frame, wherein the starting potential corresponding to a frame number is an integer value comprising a frame number field equal to the corresponding frame number and a zero offset, and further comprising the steps of:

(g) increasing said system potential by the transmission time of the most recently transmitted ATM cell by incrementing said system potential;

(h) obtaining the frame number corresponding to the time-stamp of the next ATM cell to be transmitted;

(i) determining if said most recently transmitted ATM cell was marked; and (j) if said most recently transmitted ATM cell was marked,
 i. decrementing the counter maintained with the current frame in progress, and
 ii. if said counter is zero and the frame number corresponding to the next ATM cell to be transmitted is greater than a current frame number, performing a frame update, said frame update comprising the steps of:
  (a) incrementing said current frame number, and
  (b) if said system potential is less than the starting potential of said incremented current frame number, increasing said system potential to the starting potential corresponding to said incremented current frame number.

10. A method as recited in claim 1, wherein said data packets comprise ATM cells, wherein the time period during which said ATM cells are received is divided into frames of equal intervals, wherein said frames are divided into slots, each said slot having a corresponding time-stamp, each said slot having a number, each said slot having a state, said state including full and empty, and wherein the step of storing said ATM cells in said priority queue comprises the steps of:

(a) allocating a buffer location in said priority queue as a storage location for an arriving ATM cell;

(b) determining if any ATM cell that arrived from the same connection as said arriving ATM cell is currently in said priority queue;

(c) if said priority queue does not contain any ATM cell that arrived from the same connection as said arriving ATM cell,
 i. finding the slot number corresponding to the time-stamp value of said arriving ATM cell,
 ii. adding said arriving ATM cell to a list of cells currently maintained for a slot having said slot number, and
 iii. setting the state of said slot to full; and (d) adding said arriving ATM cell to said queue of said same connection.

11. A method as recited in claim 1, wherein the time period during which said data packets are received is divided into frames of equal intervals, wherein said frames are divided into slots, each said slot having a corresponding time-stamp, each said slot having a number, each said slot having a state, said state including full and empty, wherein said data packets comprise ATM cells, and wherein the step of transmitting said ATM cells from said priority queue comprises the steps of:

(a) providing an array of slots which indicate which of said plurality of different connections contain ATM cells for transmission;

(b) scanning for the first full slot starting from one of said slots corresponding to a current frame in progress, said first full slot indicating that one of said connections has an ATM cell for transmission;

(c) retrieving for transmission an ATM cell from a list corresponding to said first full slot;

(d) if said retrieved ATM cell was a last ATM cell in said list, setting the state of said slot to empty so that a future scan of said slots will indicate that said slot is empty; and (e) if more ATM cells from a connection corresponding to said first full slot exist,
 i. locating the next ATM cell from said connection,
 ii. obtaining the time-stamp of said next ATM cell,
 iii. determining the slot number corresponding to said obtained time-stamp, and
 iv. adding said next ATM cell to a list of said slot corresponding to said slot number.

12. A method for scheduling the transmission of data packets in a packet switch having an input port and an output port wherein individual application sessions share an outgoing communications link, comprising the steps of:

(a) receiving a plurality of data packets;

(b) dividing the period during which said data packets are received into frames of equal intervals;

(c) determining a system potential as a function of network activity, said system potential being zero when there are no packets to send on the outgoing communications link and increasing in real time as packets are transmitted;

(d) recalibrating the system potential at frame boundaries;

(e) time-stamping each packet on arrival at the output port based on the system potential and the time-stamp of previous packet of the same session;

(f) storing said packets in a priority queue, wherein the packets are ordered according to their time-stamps, and wherein the packet with the smallest time-stamp value is placed at the head of the priority queue; and (g) transmitting the packet having the smallest time-stamp.

13. A method as recited in claim 12, further comprising the steps of reserving a number of bits within the frame interval corresponding to a desired minimum bandwidth allocation.

14. A priority queue method for selecting for transmission ATM cells arriving at an ATM network switch from a plurality of different connections wherein a time-stamp value is assigned to each of said plurality of ATM cells based on a system potential, wherein said ATM cells are stored in a queue in a sequential order according to their time-stamps, wherein the time period during which said ATM cells are received is divided into frames of equal intervals, and wherein said frames are divided into F individual slots, each said slot having a corresponding time-stamp, comprising the steps of:

(a) providing a state array means for indicating the presence of queued cells with an associated time-stamp value, said state array means including a plurality of storage elements corresponding to said slots, at least one said storage element corresponding to each said time-stamp value, wherein said ATM cells are stored in said storage elements; and (b) scanning said storage elements and selecting an ATM cell having the smallest time-stamp value for transmission;

(c) wherein each said slot has an empty state when there are no ATM cells queued with a time-stamp value corresponding to the slot, wherein each said slot has a First state when there is at least one queued ATM cell with a time-stamp value corresponding to the slot and the time-stamp value of the ATM cell belongs to the current frame, wherein each said slot has a Second state when there is at least one queued ATM cell with a time-stamp value corresponding to the slot and at least one of the time-stamp values of the ATM cells belongs to the next frame, and wherein each said slot has a Third state when there is at least one queued ATM cell having a time-stamp value corresponding to the slot and the time-stamps of all such ATM cells fall neither in the current frame nor the next frame.

15. A method as recited in claim 14, wherein each said slot has a slot number, and wherein said step of scanning said storage elements and selecting an ATM cell having the smallest time-stamp value for transmission comprises the steps of:

(a) scanning said slots for the first slot having a First state and selecting for transmission the first ATM cell in said slot;

(b) if no scanned slot is found to have a First state, scanning said slots for the first slot having a Second state; and (c) if a slot is found to have either a First state or a Second state, selecting an ATM cell for transmission as a function of the slot number.

16. A method as recited in claim 15, further comprising the step of updating the state of the slot associated with said ATM cell selected for transmission.

17. A method as recited in claim 16, wherein said step of updating the state of the slot associated with said ATM cell selected for transmission comprises the steps of:

(a) if said slot associated with said ATM cell selected for transmission is in the First state,
 i. maintaining said slot in said First state if there is another ATM cell queued at the said slot with its time-stamp value in the current frame,
 ii. setting said slot to said Second state if there is at least one remaining ATM cell queued at said slot, none of said remaining ATM cells queued at said slot have time-stamp values falling in the current frame, and at least one of the remaining ATM cells has a time-stamp value falling in the next frame,
 iii. setting said slot to said Third state if there is at least one remaining ATM cell queued at said slot, and none of said ATM cells queued at said slot has a time-stamp value falling in either the current or the next frame, and
 iv. setting said slot to said Empty state if there are no remaining ATM cells queued at said slot;

(b) if said slot associated with said ATM cell selected for transmission is in the Second state and an ATM cell arrives with its time-stamp corresponding to said slot,
 i. setting said slot to said First state if the time-stamp value of the arriving ATM cell falls in the current frame, and
 ii. maintaining said slot in said Second state if the time-stamp value of the arriving ATM cell falls in the second or a subsequent frame;

(c) if said slot associated with said ATM cell selected for transmission is in said Second state, setting said slot to said First state after a frame update operation;

(d) if said slot associated with said ATM cell selected for transmission is in the Second state and an ATM cell is removed for transmission,
 i. maintaining said slot in said Second state if there is another cell queued at the same slot with its time-stamp value falling in the same frame as the ATM cell removed for transmission,
 ii. setting said slot to said Third state if there is one or more ATM cells queued at the slot, with none of their time-stamp values falling in the same frame as that of the ATM cell removed for transmission, and
 iii. setting said slot to said Empty state If there are no more ATM cells queued at that slot;

(e) if said slot associated with said ATM cell selected for transmission is in said Third state, and an ATM cell arrives,
 i. setting said slot to said First state if the time-stamp of the newly arrived cell belongs in the current frame, and
 ii. setting said slot to said Second state if the time-stamp of the newly arrived cell falls in the next frame;

(f) if said slot associated with said ATM cell selected for transmission is in said Third state and an ATM cell queued at said slot is removed for transmission,
 i. maintaining said slot in said Third state if there is one or more ATM cells still queued at the slot, and
 ii. setting said slot to said Empty state if there are no more ATM cells queued at that slot; and (g) if said slot associated with said ATM cell selected for transmission is in said Third state, setting said slot to said Second state after a frame update operation.

18. A scheduling apparatus for receiving a plurality of data packets arriving at a network switch from a plurality of connections, each said connection having a service rate, and transmitting said data packets over a communications link, comprising the steps of:

(a) means for receiving a plurality of data packets during a period of time, each said packet having a length;

(b) means for calculating a system potential as each of said data packets arrives at a switch;

(c) means for calculating a time-stamp for each of said data packets based on said system potential; and (d) means for storing said data packets in a priority queue and transmitting said data packets from said priority queue according to their time-stamps.

19. An apparatus as recited in claim 18, wherein said system potential is zero when none of said data packets are being transmitted and wherein said system potential increases as said data packets are transmitted.

20. An apparatus as recited in claim 19, wherein the time period during which said data packets are received is divided into frames of equal intervals, and wherein said means for calculating a system potential comprises:
- (a) means for calculating the elapsed real-time since a current data packet being transmitted started transmitting, said elapsed real-time representing a time offset between the arrival time of said data packet at the switch and the time at which said data packet started transmitting;
- (b) means for dividing said elapsed real-time by the frame size to obtain a normalized elapsed-time; and
- (c) means for adding said normalized elapsed-time to the previous system potential in order to obtain a new system potential.

21. An apparatus as recited in claim 18, wherein said means for calculating a time-stamp comprises:
- (a) means for retrieving the prior time-stamp of a prior data packet that arrived from the same connection as an incoming data packet, said prior time-stamp being reset to zero when there are no data packets to transmit from any of the connections;
- (b) means for defining a starting potential for said incoming data packet as a maximum value of said prior time-stamp and said system potential; and
- (c) means for dividing the length of said incoming data packet by the service rate of the connection associated with said incoming data packet and adding the result of said division to said starting potential to in order to obtain said new time-stamp.

22. An apparatus as recited in claim 21, wherein the time period during which said data packets are received is divided into frames of equal intervals, and further comprising:
- (a) means for marking each incoming data packet that has its starting potential and its time-stamp within different frames as an indication that said incoming data packet crosses a frame boundary; and
- (b) means for incrementing a counter maintained with each frame each time a packet is marked in order to maintain a record of the number of incoming data packets that cross a frame boundary.

23. An apparatus as recited in claim 22, wherein said system potential has an integer part and a fractional part, and further comprising:
- (a) means for increasing said system potential by the transmission time of the most recently transmitted data packet;
- (b) means for obtaining a frame number corresponding to the time-stamp of the next data packet to be transmitted;
- (c) means for determining if said most recently transmitted data packet was marked;
- (d) means for, if said most recently transmitted data packet was marked,
  i. decrementing the counter maintained with the current frame in progress, and
  ii. if said counter is zero, and the frame number of the next data packet to be transmitted is greater than the current frame number,
    (a) incrementing said current frame number, and
    (b) if the integer part of said system potential is not equal to said current frame number, setting said integer part of said system potential to said current frame number and setting any fractional part of said system potential to zero; and
- (e) means for recording the current time for use in calculating the system potential.

24. An apparatus as recited in claim 18, wherein said data packets comprise ATM cells and wherein said means for calculating a time-stamp comprises:
- (a) means for retrieving the prior time-stamp of a prior ATM cell that arrived from the same connection as an incoming ATM cell, said prior time-stamp being reset to zero when there are no ATM cells to transmit from any of the connections;
- (b) means for defining a starting potential for said incoming ATM cell as a maximum value of said prior time-stamp and said system potential; and
- (c) means for adding said starting potential to the inverse of the service rate of the connection associated with said incoming ATM cell.

25. An apparatus as recited in claim 24, wherein the time period during which said data packets are received is divided into frames of equal intervals, and further comprising:
- (a) means for marking each incoming ATM cell that has its starting potential and its time-stamp within different frames as an indication that said incoming ATM cell crosses a frame boundary; and
- (b) means for incrementing a counter maintained with each frame each time an ATM cell is marked in order to maintain a record of the number of incoming ATM cells that cross a frame boundary.

26. An apparatus as recited in claim 25, wherein said system potential has an integer value comprising a frame number field and an offset within the frame, wherein the starting potential corresponding to a frame number is an integer value comprising a frame number field equal to the corresponding frame number and a zero offset, and further comprising:
- (a) means for increasing said system potential by the transmission time of the most recently transmitted ATM cell by incrementing said system potential;
- (b) means for obtaining the frame number corresponding to the time-stamp of the next ATM cell to be transmitted;
- (c) means for determining if said most recently transmitted ATM cell was marked; and
- (d) means for, if said most recently transmitted ATM cell was marked,
  i. decrementing the counter maintained with the current frame in progress, and
  ii. if said counter is zero and the frame number corresponding to the next ATM cell to be transmitted is greater than a current frame number,
    (a) incrementing said current frame number, and
    (b) if said system potential is less than the starting potential of said incremented current frame number, increasing said system potential to the starting potential corresponding to said incremented current frame number.

27. An apparatus as recited in claim 18, wherein said data packets comprise ATM cells, wherein the time period during which said ATM cells are received is divided into frames of equal intervals, wherein said frames are divided into slots, each said slot having a corresponding time-stamp, each said slot having a number, each said slot having a state, said state including full and empty, and wherein said means for storing said ATM cells in said priority queue comprises:
- (a) means for allocating a buffer location in said priority queue as a storage location for an arriving ATM cell;
- (b) means for determining if any ATM cell that arrived from the same connection as said arriving ATM cell is currently in said priority queue;

(c) means for, if said priority queue does not contain any ATM cell that arrived from the same connection as said arriving ATM cell,
   i. finding the slot number corresponding to the time-stamp value of said arriving ATM cell,
   ii. adding said arriving ATM cell to a list of cells currently maintained for a slot having said slot number, and
   iii. setting the state of said slot to full; and
(d) means for adding said arriving ATM cell to said queue of said same connection.

28. An apparatus as recited in claim 18, wherein the time period during which said data packets are received is divided into frames of equal intervals, wherein said frames are divided into slots, each said slot having a corresponding time-stamp, each said slot having a number, each said slot having a state, said state including full and empty, wherein said data packets comprise ATM cells, and wherein said means for transmitting said ATM cells from said priority queue comprises:
   (a) slot array means for indicating which of said plurality of different connections contain ATM cells for transmission;
   (b) means for scanning for the first full slot starting from one of said slots corresponding to a current frame in progress, said first full slot indicating that one of said connections has an ATM cell for transmission;
   (c) means for retrieving for transmission an ATM cell from a list corresponding to said first full slot;
   (d) means for, if said retrieved ATM cell was a last ATM cell in said list, setting the state of said slot to empty so that a future scan of said slots will indicate that said slot is empty; and
   (e) means for, if more ATM cells from a connection corresponding to said first full slot exist,
      i. locating the next ATM cell from said connection,
      ii. obtaining the time-stamp of said next ATM cell,
      iii. determining the slot number corresponding to said obtained time-stamp, and
      iv. adding said next ATM cell to a list of said slot corresponding to said slot number.

29. An apparatus for scheduling the transmission of data packets in a packet switch having an input port and an output port wherein individual application sessions share an outgoing communications link, comprising:
   (a) means for receiving a plurality of data packets;
   (b) means for dividing the period during which said data packets are received into frames of equal intervals;
   (c) means for determining a system potential as a function of network activity, said system potential being zero when there are no packets to send on the outgoing communications link and increasing in real time as packets are transmitted;
   (d) means for recalibrating the system potential at frame boundaries;
   (e) means for time-stamping each packet on arrival at the output port based on the system potential and the time-stamp of previous packet of the same session;
   (f) means for storing said packets in a priority queue, wherein the packets are ordered according to their time-stamps, and wherein the packet with the smallest time-stamp value is placed at the head of the priority queue; and
   (g) means for transmitting the packet having the smallest time-stamp.

30. A method as recited in claim 29, further comprising means for reserving a number of bits within the frame interval corresponding to a desired minimum bandwidth allocation.

31. A priority queue apparatus for selecting for transmission ATM cells arriving at an ATM network switch from a plurality of different connections wherein a time-stamp value is assigned to each of said plurality of ATM cells based on a system potential, wherein said ATM cells are stored in a queue in a sequential order according to their time-stamps, wherein the time period during which said ATM cells are received is divided into frames of equal intervals, and wherein said frames are divided into F individual slots, each said slot having a corresponding time-stamp, comprising:
   (a) state array means for indicating the presence of queued cells with an associated time-stamp value, said state array means including a plurality of storage elements corresponding to said slots, at least one said storage element corresponding to each said time-stamp value, wherein said ATM cells are stored in said storage elements;
   (b) means for scanning said storage elements and selecting an ATM cell having the smallest time-stamp value for transmission; and
   (c) means for adding an ATM cell to said state array means;
   (d) wherein each said slot has an empty state when there are no ATM cells queued with a time-stamp value corresponding to the slot, wherein each said slot has a First state when there is at least one queued ATM cell with a time-stamp value corresponding to the slot and the time-stamp value of the ATM cell belongs to the current frame, wherein each said slot has a Second state when there is at least one queued ATM cell with a time-stamp value corresponding to the slot and at least one of the time-stamp values of the ATM cells belongs to the next frame, and wherein each said slot has a Third state when there is at least one queued ATM cell having a time-stamp value corresponding to the slot and the time-stamps of all such ATM cells fall neither in the current frame nor the next frame.

32. An apparatus as recited in claim 31, wherein said means for scanning said storage elements and selecting an ATM cell having the smallest time-stamp value for transmission comprises:
   (a) means for scanning said slots for the first slot having a First state and selecting for transmission the first ATM cell in said slot;
   (b) means for, if no scanned slot is found to have a First state, scanning said slots for the first slot having a Second state; and
   (c) means for, if a slot is found to have either a First state or a Second state, selecting an ATM cell for transmission as a function of the slot number.

33. An apparatus as recited in claim 32, further comprising state transition means for updating the state of the slot associated with said ATM cell selected for transmission.

34. An apparatus as recited in claim 33, wherein said state transition means comprises:
   (a) means for, if said slot associated with said ATM cell selected for transmission is in the First state,
      i. maintaining said slot in said First state if there is another ATM cell queued at the said slot with its time-stamp value in the current frame,
      ii. setting said slot to said Second state if there is at least one remaining ATM cell queued at said slot, none of said remaining ATM cells queued at said slot have time-stamp values falling in the current frame, and at least one of the remaining ATM cells has a time-stamp value falling in the next frame,
  iii. setting said slot to said Third state if there is at least one remaining ATM cell queued at said slot, and none of said ATM cells queued at said slot has a time-stamp value falling in either the current or the next frame, and
  iv. setting said slot to said Empty state if there are no remaining ATM cells queued at said slot;
(b) means for, if said slot associated with said ATM cell selected for transmission is in the Second state and an ATM cell arrives with its time-stamp corresponding to said slot,
  i. setting said slot to said First state if the time-stamp value of the arriving ATM cell falls in the current frame, and
  ii. maintaining said slot in said Second state if the time-stamp value of the arriving ATM cell falls in the second or a subsequent frame;
(c) means for, if said slot associated with said ATM cell selected for transmission is in said Second state, setting said slot to said First state after a frame update operation;
(d) means for, if said slot associated with said ATM cell selected for transmission is in the Second state and an ATM cell is removed for transmission,
  i. maintaining said slot in said Second state if there is another cell queued at the same slot with its time-stamp value falling in the same frame as the ATM cell removed for transmission,
  ii. setting said slot to said Third state if there is one or more ATM cells queued at the slot, with none of their time-stamp values falling in the same frame as that of the ATM cell removed for transmission, and
  iii. setting said slot to said Empty state If there are no more ATM cells queued at that slot;
(e) means for, if said slot associated with said ATM cell selected for transmission is in said Third state, and an ATM cell arrives,
  i. setting said slot to said First state if the time-stamp of the newly arrived cell belongs in the current frame, and
  ii. setting said slot to said Second state if the time-stamp of the newly arrived cell falls in the next frame;
(f) means for, if said slot associated with said ATM cell selected for transmission is in said Third state and an ATM cell queued at said slot is removed for transmission,
  i. maintaining said slot in said Third state if there is one or more ATM cells still queued at the slot, and
  ii. setting said slot to said Empty state if there are no more ATM cells queued at that slot; and
(g) means for, if said slot associated with said ATM cell selected for transmission is in said Third state, setting said slot to said Second state after a frame update operation.

35. An apparatus as recited in claim 31, further comprising tail pointer array means for identifying the last ATM cell of said connection added to said state array means.

36. A priority queue method for selecting for transmission ATM cells arriving at an ATM network switch from a plurality of different connections wherein a time-stamp value is assigned to each of said plurality of ATM cells based on a system potential, wherein said ATM cells are stored in a queue in a sequential order according to their time-stamps, wherein the time period during which said ATM cells are received is divided into frames of equal intervals, and wherein said frames are divided into F individual slots, each said slot having a corresponding time-stamp, comprising the steps of:
  (a) providing a state array means for indicating the presence of queued cells with an associated time-stamp value, said state array means including a plurality of storage elements corresponding to said slots, at least one said storage element corresponding to each said time-stamp value, wherein said ATM cells are stored in said storage elements, wherein each said slot has an empty state where there is no ATM cell queued with a time-stamp value corresponding to the slot, and wherein each said slot has a full state when there is an ATM cell queued with a tine-stamp value corresponding to the slot; and
  (b) scanning said storage elements and selecting for transmission an ATM cell in the first slot having a full state.

37. A priority queue apparatus for selecting for transmission ATM cells arriving at an ATM network switch from a plurality of different connections wherein a time-stamp value is assigned to each of said plurality of ATM cells based on a system potential, wherein said ATM cells are stored in a queue in a sequential order according to their time-stamps, wherein the time period during which said ATM cells are received is divided into frames of equal intervals, and wherein said frames are divided into F individual slots, each said slot having a corresponding time-stamp, comprising:
  (a) state array means for indicating the presence of queued cells with an associated time-stamp value, said state array means including a plurality of storage elements corresponding to said slots, at least one said storage element corresponding to each said time-stamp value, wherein said ATM cells are stored in said storage elements, wherein each said slot has an empty state where there is no ATM cell queued with a time-stamp value corresponding to the slot, and wherein each said slot has a full state when there is an ATM cell queued with a time-stamp value corresponding to the slot;
  (b) selector module means for scanning said storage elements and selecting for transmission an ATM cell in the first slot having a full state; and
  (c) means for adding an ATM cell to said state array means.

* * * * *